(12) United States Patent
Lewis et al.

(10) Patent No.: US 6,602,041 B2
(45) Date of Patent: Aug. 5, 2003

(54) VEHICLE FLIP-OUT RAMP

(75) Inventors: Cleatus Lewis, Modesto, CA (US);
Alan R. Cohn, Lockeford, CA (US);
Donald Morris, San Carlos, CA (US)

(73) Assignee: Lift-U, Division of Hogan Mfg., Inc., Escalon, CA (US)

( * ) Notice: Subject to any disclaimer, the term of this patent is extended or adjusted under 35 U.S.C. 154(b) by 0 days.

(21) Appl. No.: 09/747,024

(22) Filed: Dec. 20, 2000

(65) Prior Publication Data

US 2001/0048870 A1 Dec. 6, 2001

Related U.S. Application Data

(60) Provisional application No. 60/172,779, filed on Dec. 20, 1999, provisional application No. 60/183,110, filed on Feb. 17, 2000, provisional application No. 60/206,651, filed on May 24, 2000, and provisional application No. 60/235,248, filed on Sep. 25, 2000.

(51) Int. Cl.[7] .................................................. B60P 1/43
(52) U.S. Cl. ...................................... 414/537; 414/921
(58) Field of Search .............................. 414/537, 921; 14/71.3; 16/280, 308

(56) References Cited

U.S. PATENT DOCUMENTS

| | | | |
|---|---|---|---|
| 3,651,965 A | * 3/1972 | Simonelli et al. | 414/537 |
| 4,084,713 A | 4/1978 | Rohrs et al. | |
| 4,627,784 A | 12/1986 | Collins | |
| 4,657,233 A | * 4/1987 | Vroom | 414/537 |
| 4,665,579 A | * 5/1987 | Bennett et al. | 14/71.3 |
| 4,691,956 A | * 9/1987 | Hodge | 296/51 |
| 4,792,274 A | * 12/1988 | Cockram | 414/537 |
| 5,085,555 A | 2/1992 | Vartanian | |
| 5,145,310 A | * 9/1992 | Calzone | 414/537 |
| 5,306,113 A | * 4/1994 | Mann | 414/537 |
| 5,358,301 A | * 10/1994 | Konchan et al. | 16/308 |
| 5,391,041 A | 2/1995 | Stanbury et al. | |
| 5,871,329 A | * 2/1999 | Tidrick et al. | 414/537 |
| 5,988,724 A | * 11/1999 | Wolda | 16/308 |
| 6,095,747 A | * 8/2000 | Cohn | 414/921 |
| 6,179,545 B1 | * 1/2001 | Petersen, Jr. et al. | 414/537 |
| 6,343,908 B1 | * 2/2002 | Oudsten et al. | 414/537 |

FOREIGN PATENT DOCUMENTS

DE      297 07 803 U1    10/1997

* cited by examiner

*Primary Examiner*—James W. Keenan
(74) *Attorney, Agent, or Firm*—Christensen O'Connor Johnson Kindness PLLC

(57) ABSTRACT

A wheelchair ramp assembly (20) is disclosed. The wheelchair ramp assembly includes a frame attachable to a vehicle having a floor, a platform coupled to a portion of the frame, a ramp having a weight, and a reciprocating mechanism disposed between the ramp and the platform coupled to a portion of the frame, a ramp having a weight, and a reciprocating mechanism disposed between the ramp and the platform for reciprocating the ramp between a deployed position and a stowed position in response to a force. The reciprocating mechanism counterbalancing the weight of the ramp during actuation of the ramp between the deployed and stowed positions to reduce the force required to reciprocate the ramp between the deployed and stowed positions.

45 Claims, 57 Drawing Sheets

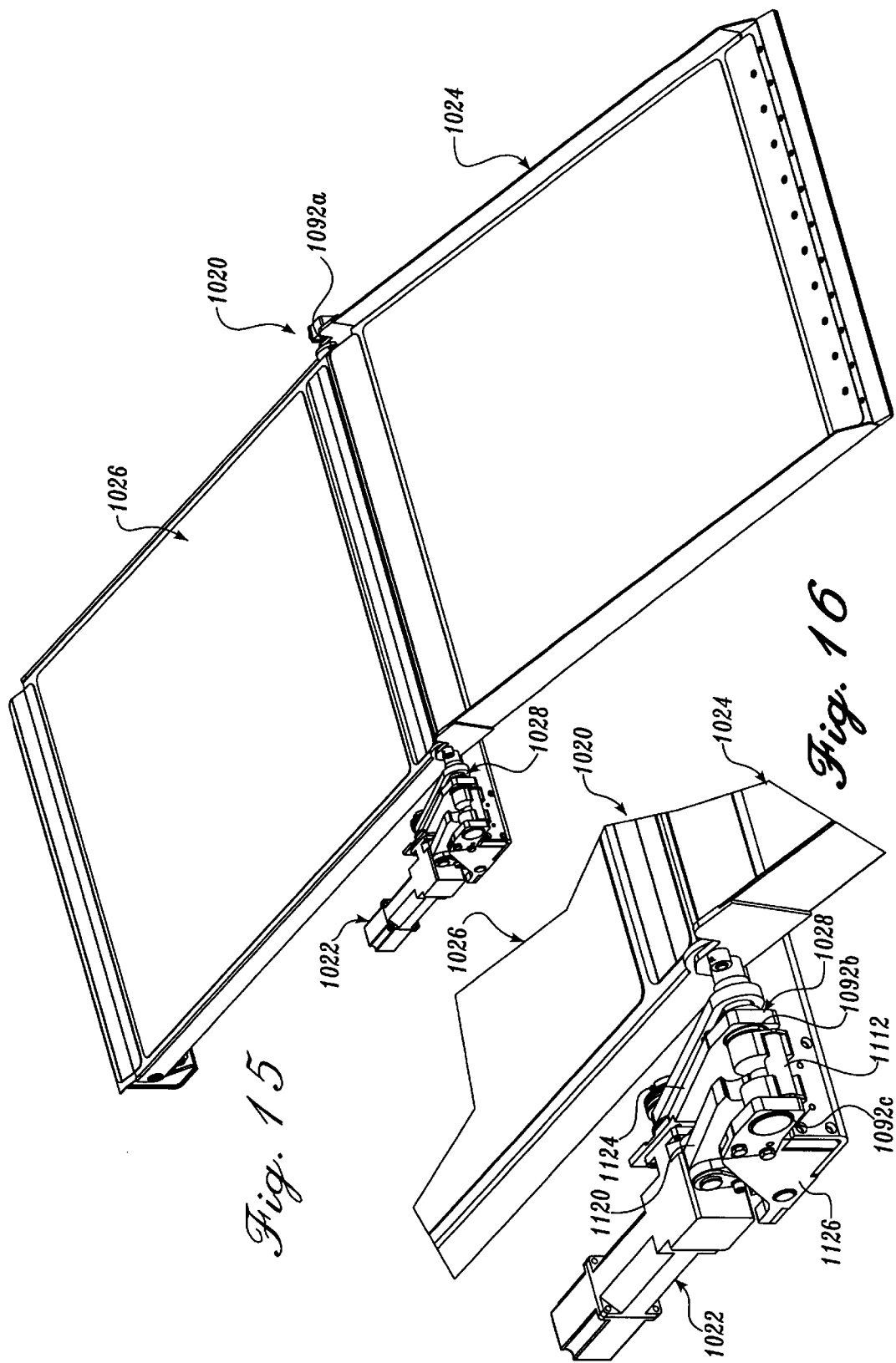

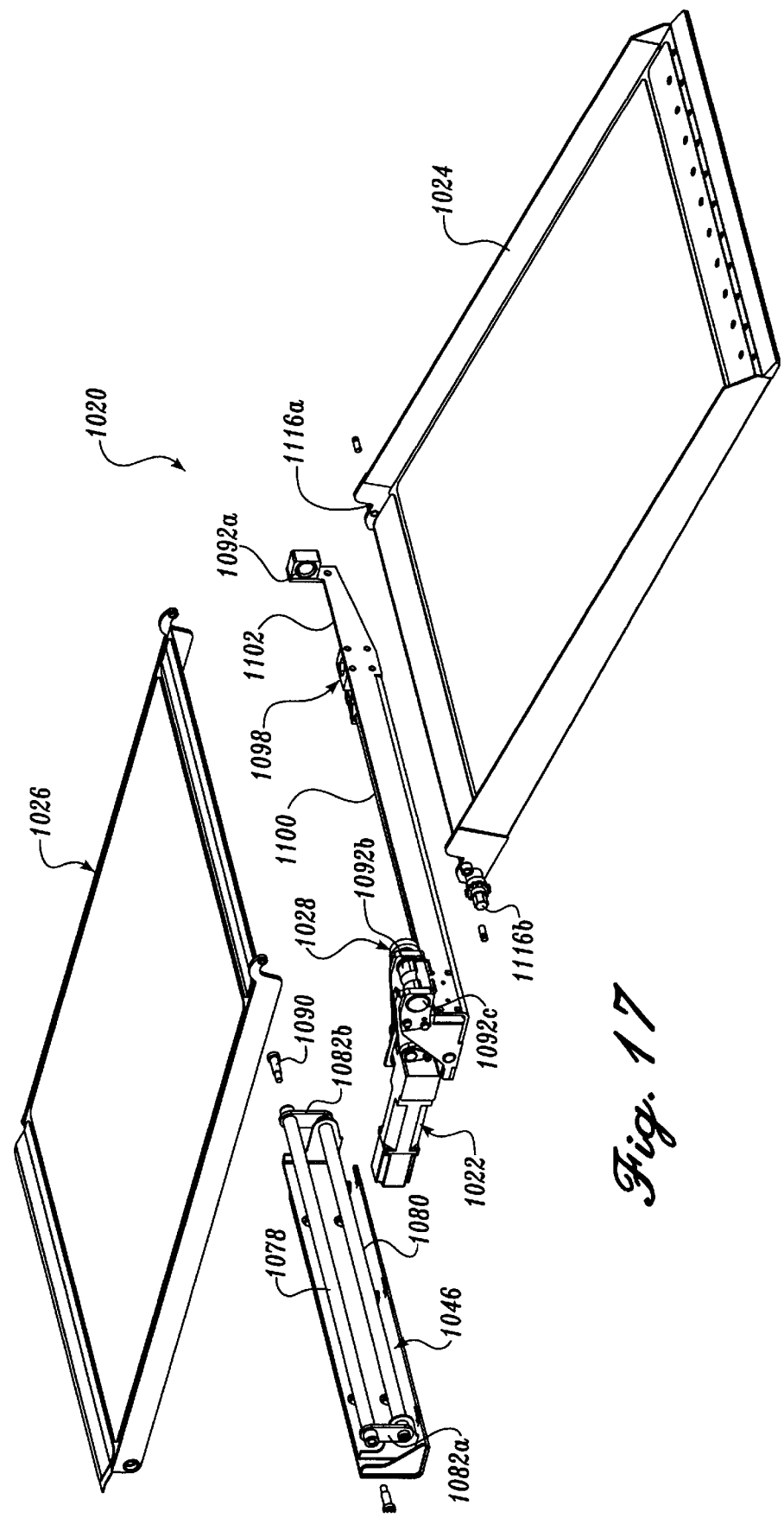

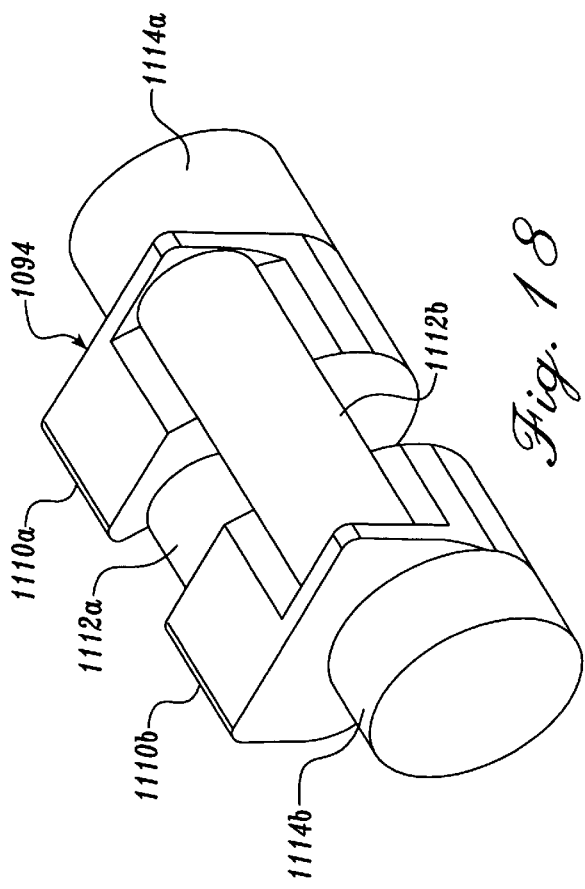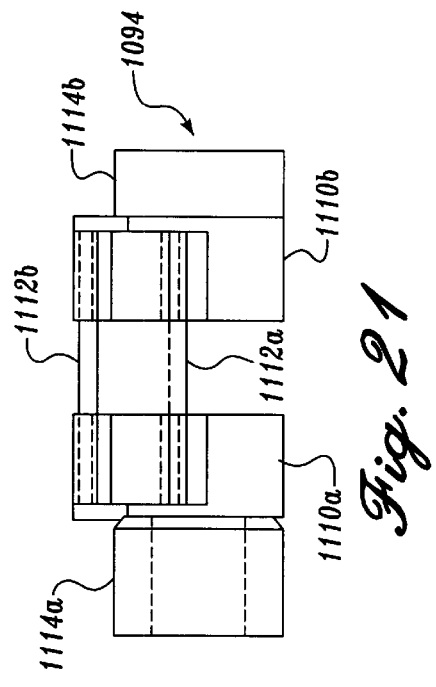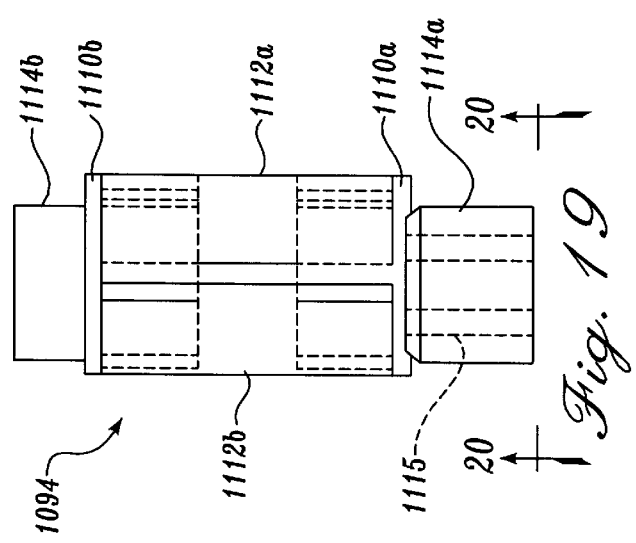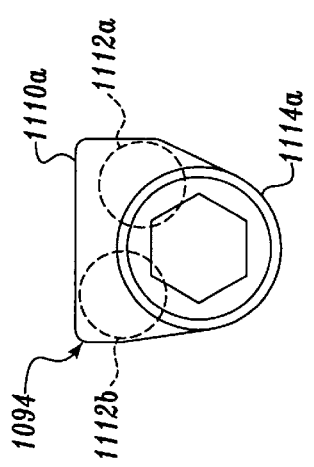

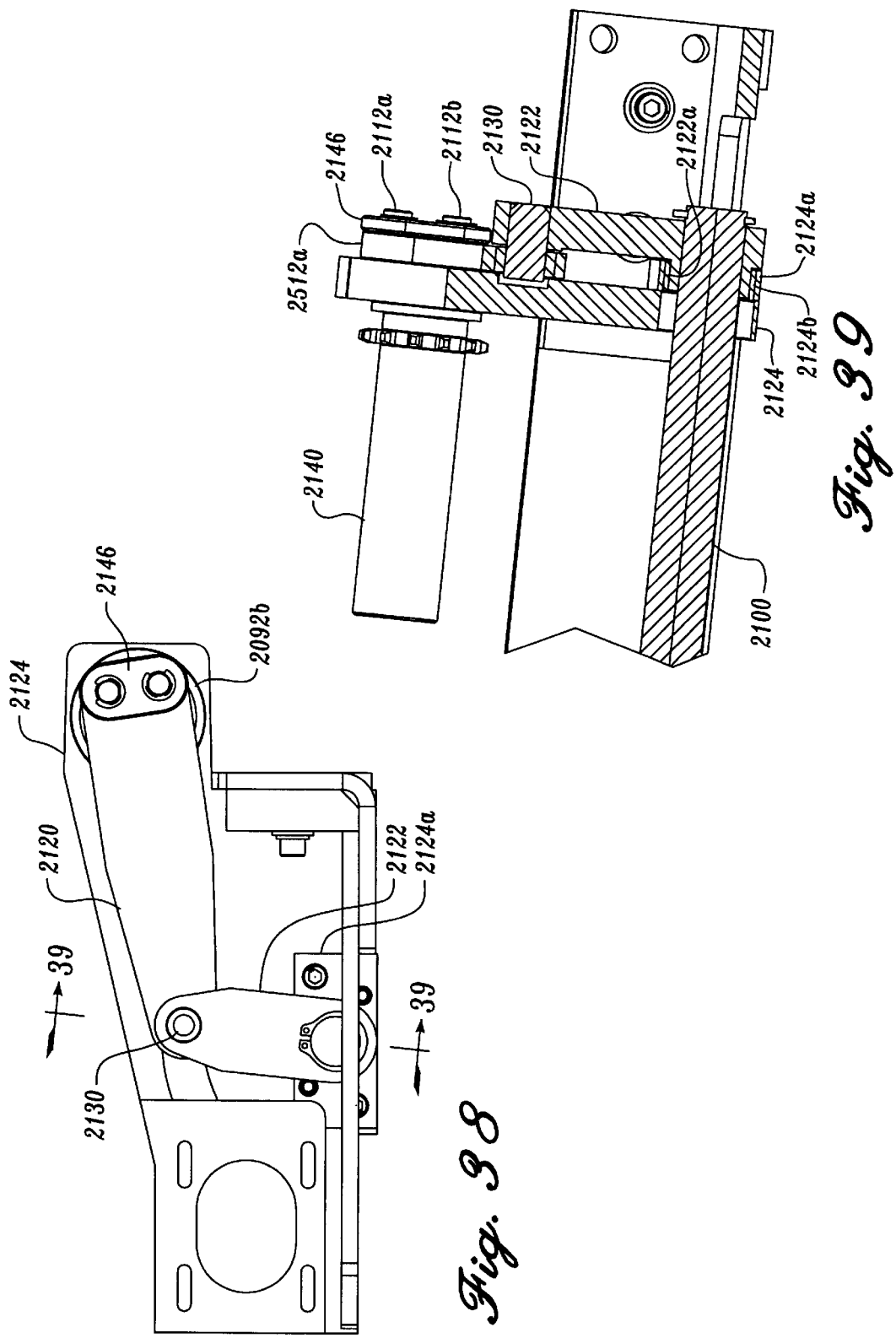

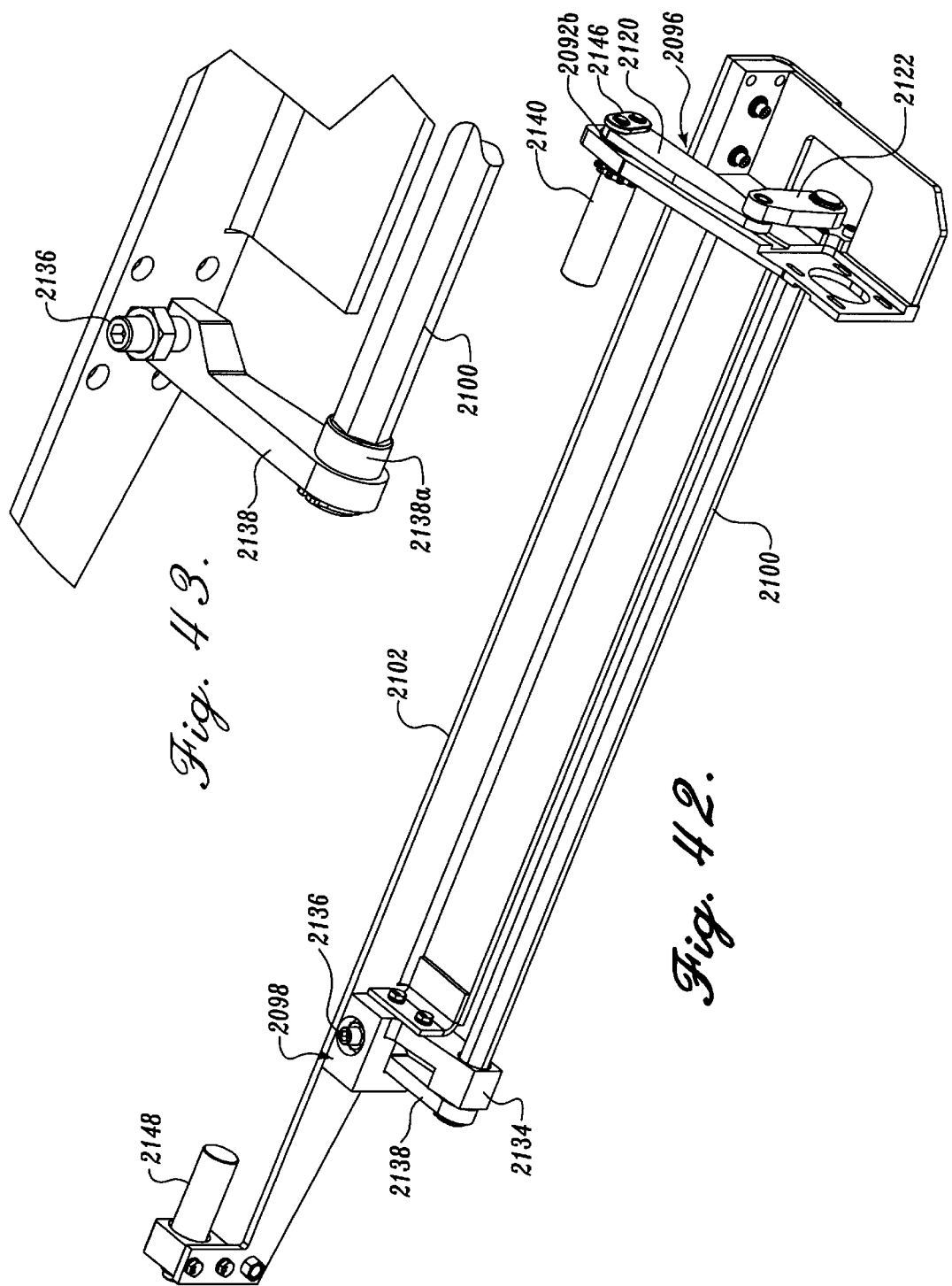

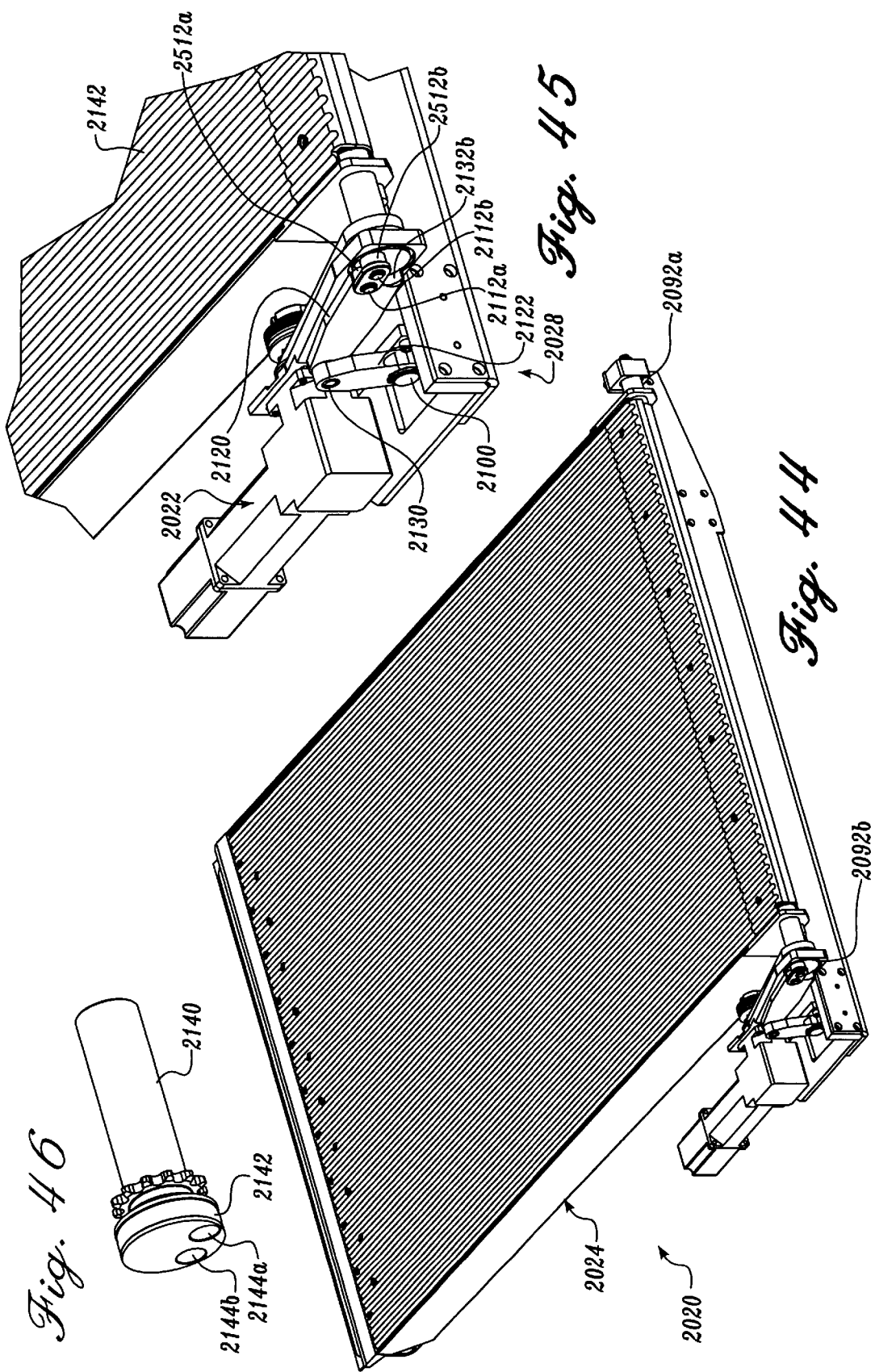

VEHICLE FLIP-OUT RAMP

PRIORITY CLAIM

Priority is claimed under 35 U.S.C. §119(e) from U.S. Provisional Patent Application Ser. No. 60/172,779, filed Dec. 20, 1999; U.S. Provisional Patent Application Ser. No. 60/183,110, filed Feb. 17, 2000; U.S. Provisional Patent Application Ser. No. 60/206,651, filed May 24, 2000; and U.S. Provisional patent Application Ser. No. 60/235,248, filed Sep. 25, 2000, all of which are hereby expressly incorporated by reference.

FIELD OF THE INVENTION

The present invention relates generally to wheelchair lifts and, more particularly, to a flip-out ramp for a vehicle.

BACKGROUND OF THE INVENTION

The Americans With Disabilities Act (ADA) requires the removal of physical obstacles to those who are physically challenged. The stated objective of this legislation has increased public awareness and concern over the requirements of the physically challenged. Consequentially, there has been more emphasis in providing systems that assist such a person to access a motor vehicle, such as a bus or mini-van.

A common manner of providing the physically challenged with access to motor vehicles is a ramp. Various ramp operating systems for motor vehicles are known in the art. Some slide out from underneath the floor of the vehicle and tilt down. Others are stowed in a vertical position and are pivoted about a hinge, while still others are supported by booms and cable assemblies. The present invention is generally directed to a "flip-out" type of ramp. Such a ramp is normally stowed in a horizontal position within a recess in the vehicle floor, and is pivoted upward and outwards to a downward sloping extended position. In the extended position, the ramp is adjustable to varying curb heights.

Flip-out ramps on vehicles confront a variety of technical problems. Longer ramps are desirable because the resulting slope is lower and more accessible by wheelchair-bound passengers. Longer ramps are, however, heavier and require more torque about the hinge to be reciprocated between deployed and stowed positions. To satisfy this torque requirement, such flip-out ramps use large electric motors, pneumatic devices, or hydraulic actuators to deploy and stow the ramp. Many of such systems cannot be moved manually in the event of failure of the power source unless the drive mechanism is first disengaged. Some existing flip-out ramps can be deployed or stowed manually, but they are difficult to operate because one must first overcome the resistance of the drive mechanism. Moreover, some flip-out ramps create a dangerous situation in the event of a power failure because they could deploy and crush objects in the downward path.

As noted above, many existing flip-out ramps are equipped with hydraulic, electric or pneumatic actuating devices. Such devices are obtrusive and make access to and from a vehicle difficult when the ramp is stowed. Moreover, many of such flip-out ramps have no energy storage capabilities to aid the lifting of the ramp and, thereby, preserve the life of the drive motor or even allow a smaller drive to be employed. Finally, operating systems for such flip-out ramps must have large power sources to overcome the torque placed on the hinge by the necessarily long moment arm of the flip-out ramp.

In view of the foregoing, there is a need for a compact and efficient operating system for a vehicle flip-out ramp.

SUMMARY OF THE INVENTION

In accordance with the present invention, a wheelchair ramp assembly is provided. The wheelchair ramp assembly includes a frame attachable to a vehicle having a floor, a platform coupled to a portion of the frame, a ramp having a weight, and a reciprocating mechanism disposed between the ramp and platform. The reciprocating mechanism reciprocates the ramp between a deployed position and a stowed position in response to a force. The reciprocating mechanism counterbalances the weight of the ramp during actuation of the ramp between the deployed and stowed positions to reduce the force required to reciprocate the ramp between the deployed and stowed positions.

In accordance with certain aspects of this embodiment, the reciprocating mechanism includes a torsion assembly having a torsion rod extending between a rotating end and a fixed end of the reciprocating mechanism. As the ramp is reciprocated between the deployed and stowed positions, the weight of the ramp causes the torsion rod to twist about the fixed end and resist the weight of the ramp.

In accordance with still other aspects, the reciprocating mechanism includes an actuating arm rotatably attached to the torsion assembly and first and second bearing surfaces cooperatively coupled to the ramp, wherein the first and second bearing surfaces move in a predetermined path as the ramp reciprocates between the deployed and stowed positions to contact a portion of the actuating arm and cause the torsion rod to twist.

In accordance with still yet other aspects, the wheelchair assembly includes a preload assembly coupled to the torsion assembly, wherein the preload assembly twists the torsion rod from a neutral position to assist in reciprocating the ramp between the deployed and stowed positions.

BRIEF DESCRIPTION OF THE DRAWINGS

The foregoing aspects and many of the attendant advantages of this invention will become better understood by reference to the following detailed description, when taken in conjunction with the accompanying drawings, wherein:

FIG. 15 is a perspective view of a flip-out ramp formed in accordance with the present invention and showing a first alternate embodiment of the counter-balance assembly;

FIG. 16 is a partial perspective view of a flip-out ramp formed in accordance with the present invention and showing a more detailed view of the motor drive assembly and linkage assembly of the counter-balance assembly of FIG. 15;

FIG. 17 is an exploded view of the flip-out ramp assembly of FIG. 15 showing the major components of the flip-out ramp assembly;

FIG. 18 is a perspective view of a torsion pin weldment for the counter-balance assembly;

FIG. 19 is a top planar view of the torsion pin weldment of FIG. 18;

FIG. 20 is a side planar view of the torsion pin weldment of FIG. 19 taken through Section 20—20;

FIG. 21 is an end planar view of the torsion pin weldment of FIG. 18;

FIG. 38 is a side planar view of the counter-balance assembly of FIG. 37 and taken through Section 38—38;

FIG. 39 is a partial cross-sectional end planar view of the counter-balance assembly of FIG. 38 and taken through Section 39—39;

FIG. 42 is a perspective view of the counter-balance assembly of FIG. 36, where the counter-balance assembly is rotated 180° from the view shown in FIG. 36;

FIG. 43 is a partial view of the counter-balance assembly of FIG. 42 with portions thereof removed for clarity;

FIG. 44 is a perspective view of a flip-out ramp assembly formed in accordance with the second alternate of the counter-balance assembly of FIG. 36;

FIG. 45 is a partial view of the flip-out ramp assembly of FIG. 44 showing the counter-balance assembly of FIG. 36;

FIG. 46 is a perspective view of a rear stub shaft of a ramp assembly of the present invention with the second alternate counter-balance assembly of FIG. 36;

DETAILED DESCRIPTION OF THE PREFERRED EMBODIMENT

Figure 1:
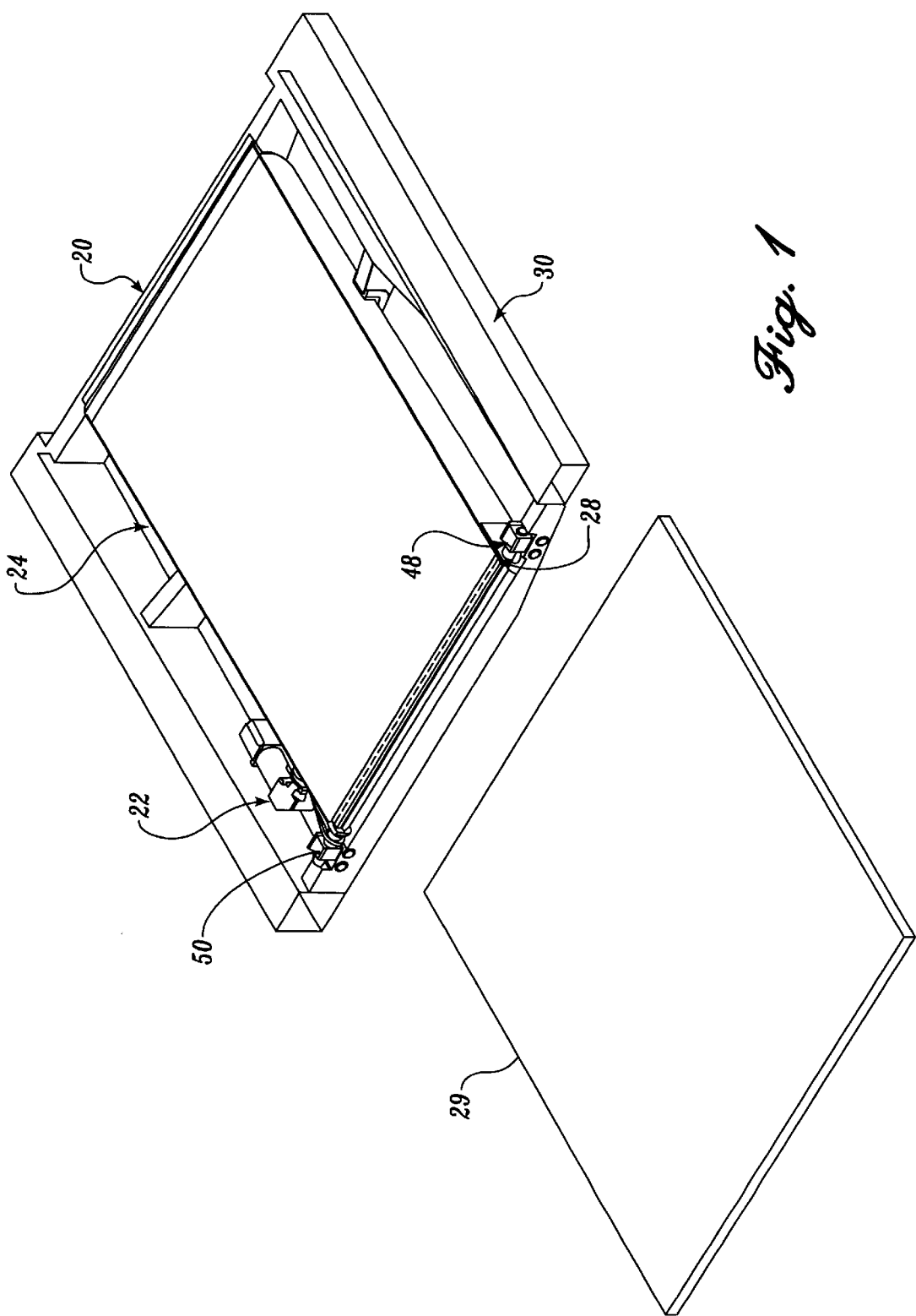
FIG. 1 is a perspective view of a flip-out ramp constructed in accordance with one embodiment of the present invention with the flip-out ramp shown in the stowed position.
Figure 2:
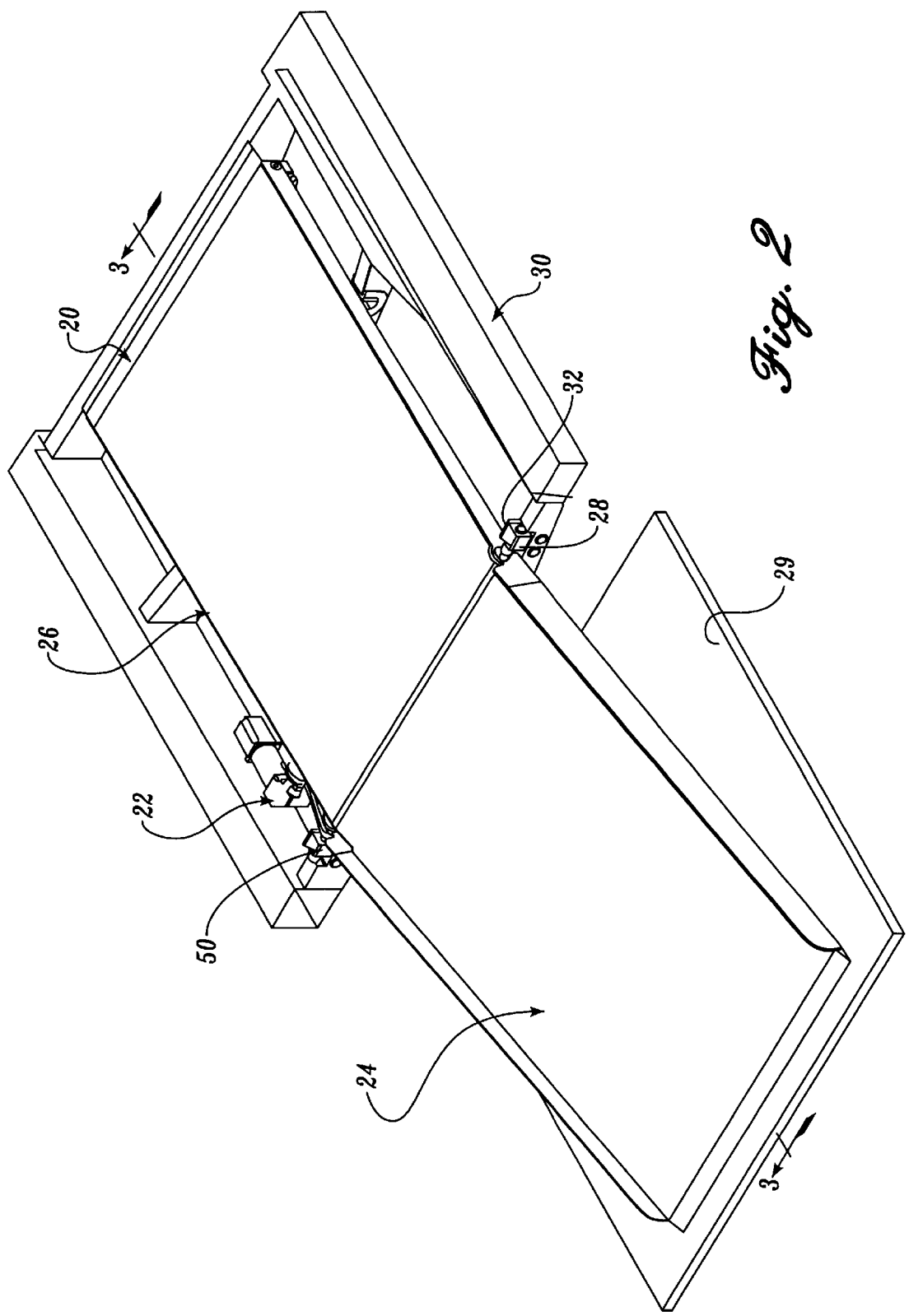
FIG. 2 is a perspective view of a flip-out ramp formed in accordance with one embodiment of the present invention with the flip-out ramp shown in the deployed position.

FIGS. 1 and 2 illustrate one embodiment of a flip-out ramp assembly 20 (hereinafter "ramp assembly 20") constructed in accordance with the present invention. The ramp assembly 20 includes a drive assembly 22, a ramp 24, a moving floor 26, and a counter-balance assembly 28. The ramp assembly 20 is adapted to be mounted to frame structure 30 of a vehicle (not shown), such as a bus, by mounting bracket 32. The ramp assembly 20 is reciprocal between a stowed position, as seen in FIG. 1, and a deployed position, as seen in FIG. 2. In the stowed position, the ramp 24 and moving floor 26 are stacked upon each other in a bi-fold manner, such that the lower surface of the ramp 24 is flush with the floor (not shown) of the vehicle. In the deployed position, the ramp extends outward and contacts a surface 29, such as a curb or road side.

Figure 3:
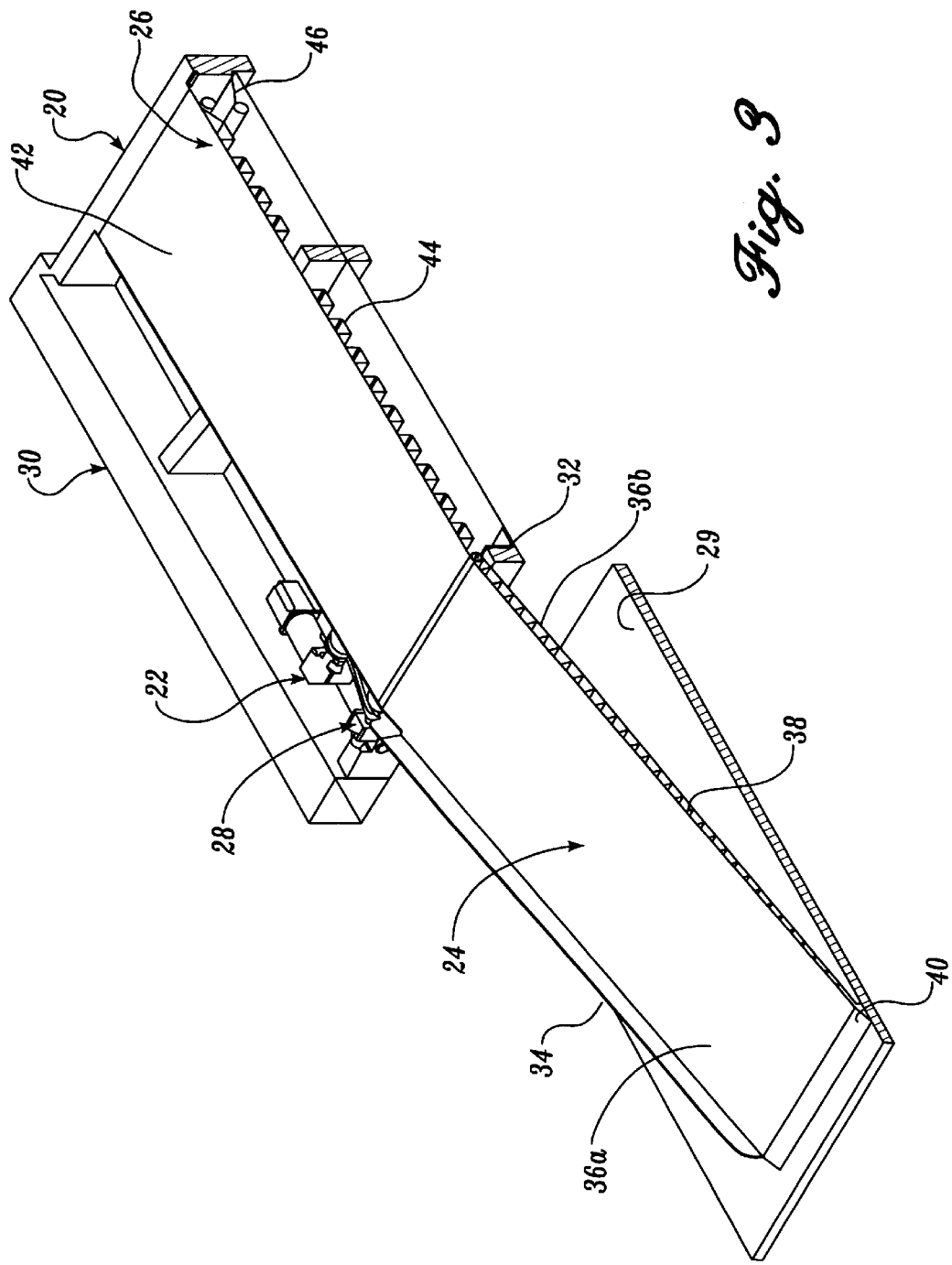
FIG. 3 is a cross-sectional perspective view of a flip-out ramp formed in accordance with one embodiment of the present invention with the flip-out ramp shown in the deployed position.
Figure 4:
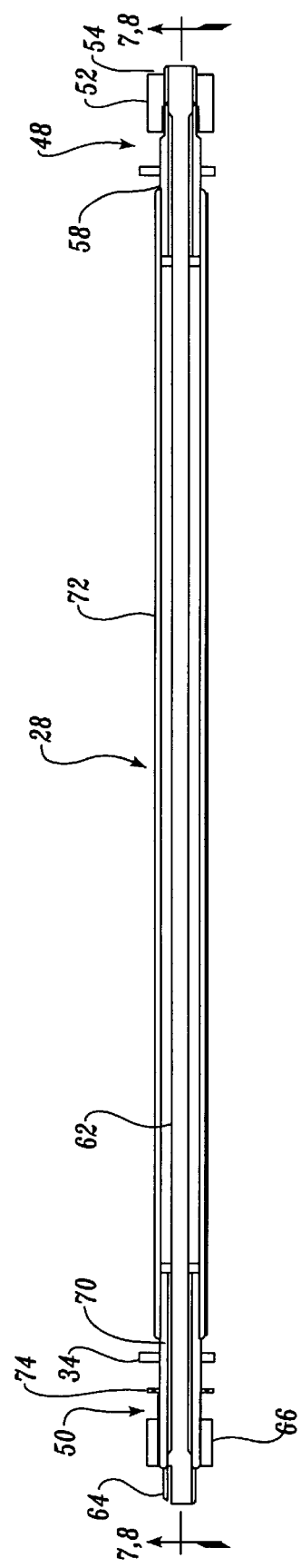
FIG. 4 is a cross-sectional planar view of a counterbalance assembly for a flip-out ramp formed in accordance with one embodiment of the present invention.
Figure 5:
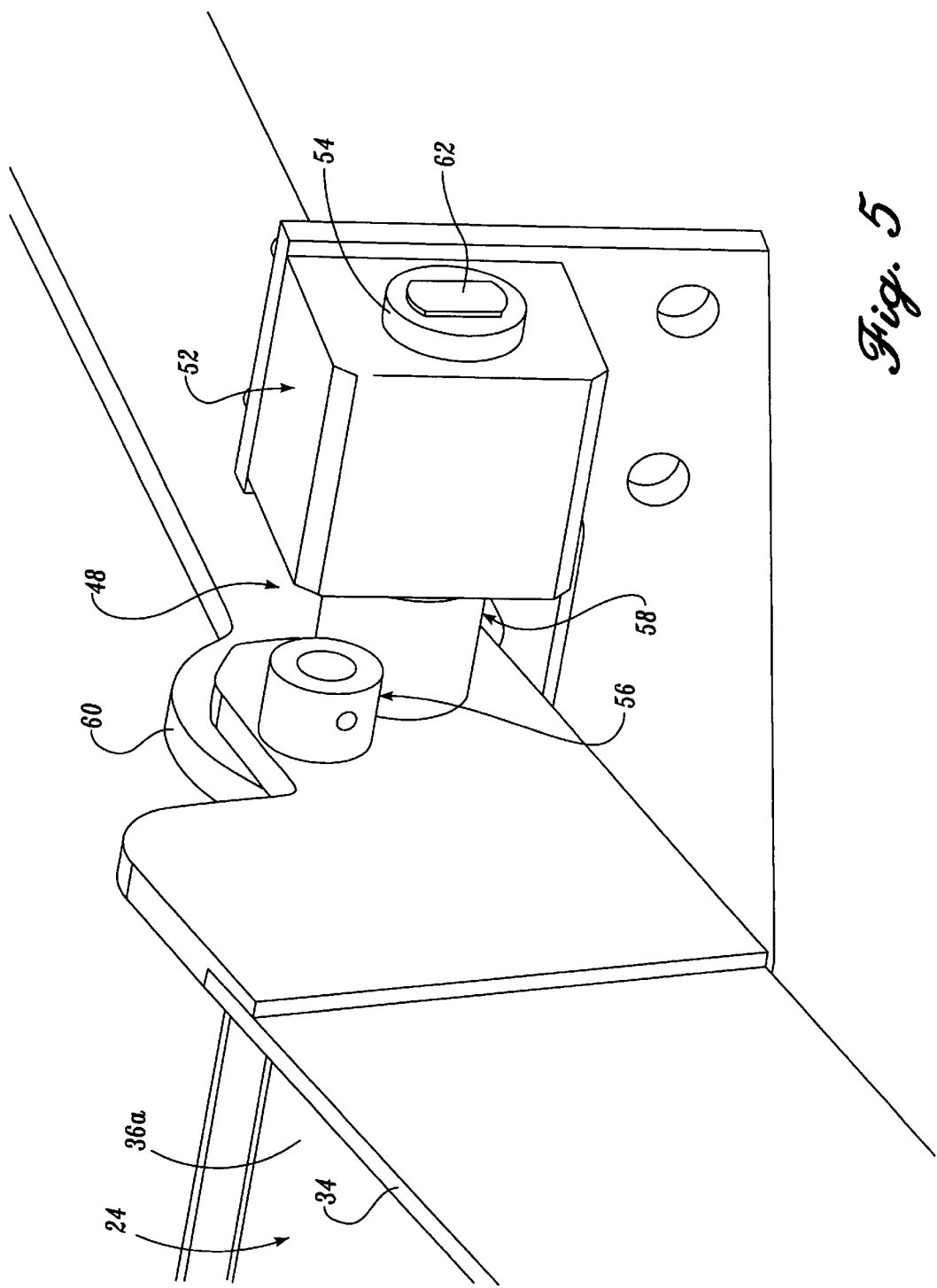
FIG. 5 is a perspective view of a flip-out ramp formed in accordance with one embodiment of the present invention showing a fixed attachment point of the flip-out ramp to a mounting structure.

As seen best by referring to FIG. 3, the ramp 24 is hingedly attached to the moving floor 26 by the counter-balance assembly 28. The ramp 24 includes side curbs 34. The side curbs 34 extend upwardly from each side of the ramp 24. Each side curb 34 enhances structural strength of the ramp 24 and provides a bumper for the sides of the ramp 24, thereby increasing the safety of the ramp assembly 20. The ramp 24 is constructed from well-known materials, such as stainless steel, and, in one embodiment, includes upper and lower panels 36a and 36b spaced by a core 38. The core 38 is suitably corrugated stainless steel extending between opposing sides of the upper and lower panels 36a and 36b. The outboard edge of the ramp 24 includes a tapered nose portion 40. The ramp 24 is wedged shape in cross section from the nose portion 40 to the inboard portion which is attached to the counter-balance assembly 28.

The moving floor assembly 26 is similarly constructed to the ramp 24 and includes an upper panel 42 and a corrugated panel 44 welded to the upper panel 42 to increase stiffness and reduce weight of the structure. The inboard edge of the moving floor 26 is attached to the frame structure 30 by a pivot link assembly 46. The other end of the moving floor 26 is pivotally attached to the side curb 34, as is described in greater detail below. When mounted to the vehicle frame structure 30, the vehicle floor (not shown) is substantially flush and is in close proximity with the upper panel 42 of the moving floor 26 when the ramp 24 is in the deployed position to provide smooth transition between the moving floor 26 and the vehicle floor.

As noted above, when the ramp assembly 20 is in the stowed position, the lower panel 36B of the ramp 24 is substantially co-planar with the floor (not shown) of the vehicle, thereby providing a smooth transition between the floor of the vehicle and the ramp assembly 20. Because of the wedge contour of the ramp 24 and corresponding shape of the moving floor 26, when articulated into the stowed position, the ramp 24 is nested with the moving floor 26. In particular, the upper panel 36a of the ramp 24 is adjacent the upper panel 42 of the moving floor 26, such that the floor surface (which is the lower panel 36b of the ramp 24) of the ramp 24 is flush with the vehicle floor.

Referring now to FIGS. 4–8, the counter-balance assembly 28 will be described in greater detail. The counter-balance assembly 28 includes a fixed end 48 and a rotating end 50. The fixed end 48 includes a bearing block 52, a key insert 54, and a torsion tube shaft 58. The moving floor 26 is pinned to the ramp 24 at the boss and pin structure 56. As seen best in FIG. 5, the moving floor 26 includes a lug 60 extending from one end and the lug 60 is pinned to the side curb 34 by a boss and pin structure 56. Movement of the ramp 24 is tied to the moving floor 26, such that the moving floor 26 moves with corresponding movement of the ramp 24 between stowed and deployed positions, as is described in greater detail below. Received within the key insert 54 is one end of a torsion rod 62, thereby locking the fixed end 48 of the counter-balance assembly 28 to the bearing block 52 to resist rotation of the torsion rod 62, as is described in greater detail below.

Figure 6:
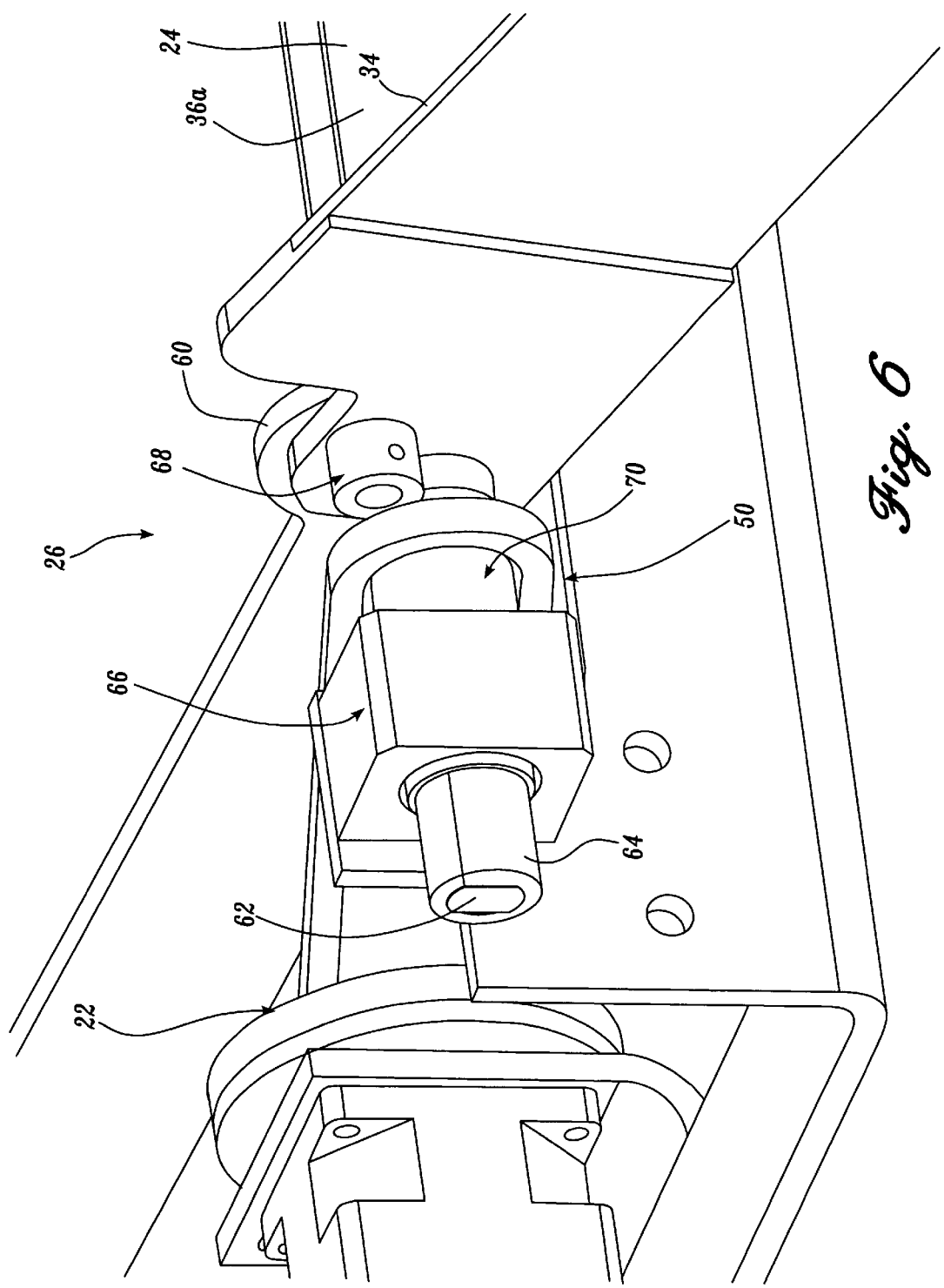
FIG. 6 is a perspective view of a flip-out ramp formed in accordance with one embodiment of the present invention showing a rotating attachment point of the flip-out ramp to a mounting structure.
Figure 7:
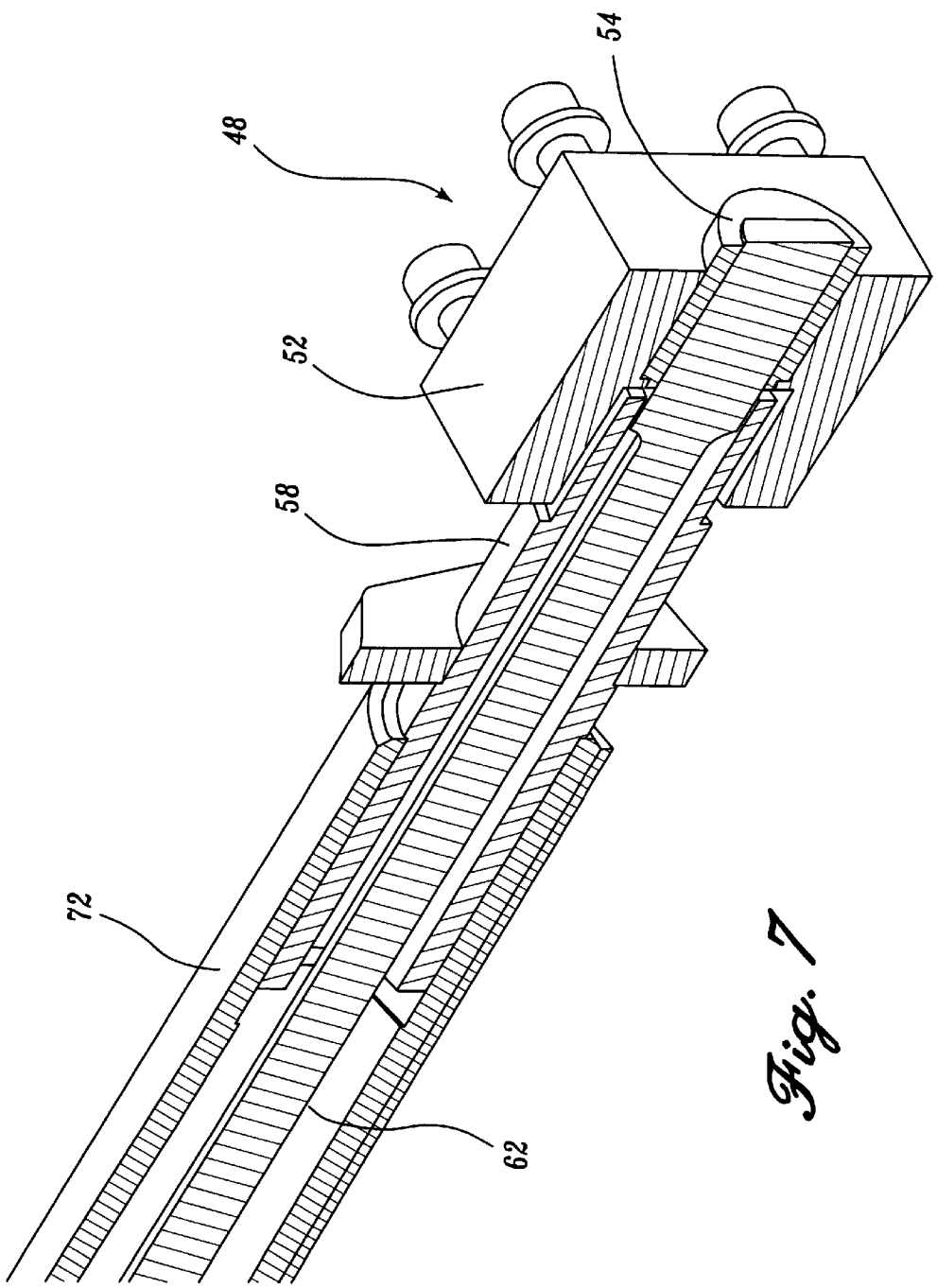
FIG. 7 is a perspective cross-sectional view of a fixed attachment end of a counter-balance assembly for a flip-out ramp formed in accordance with one embodiment of the present invention.
Figure 8:
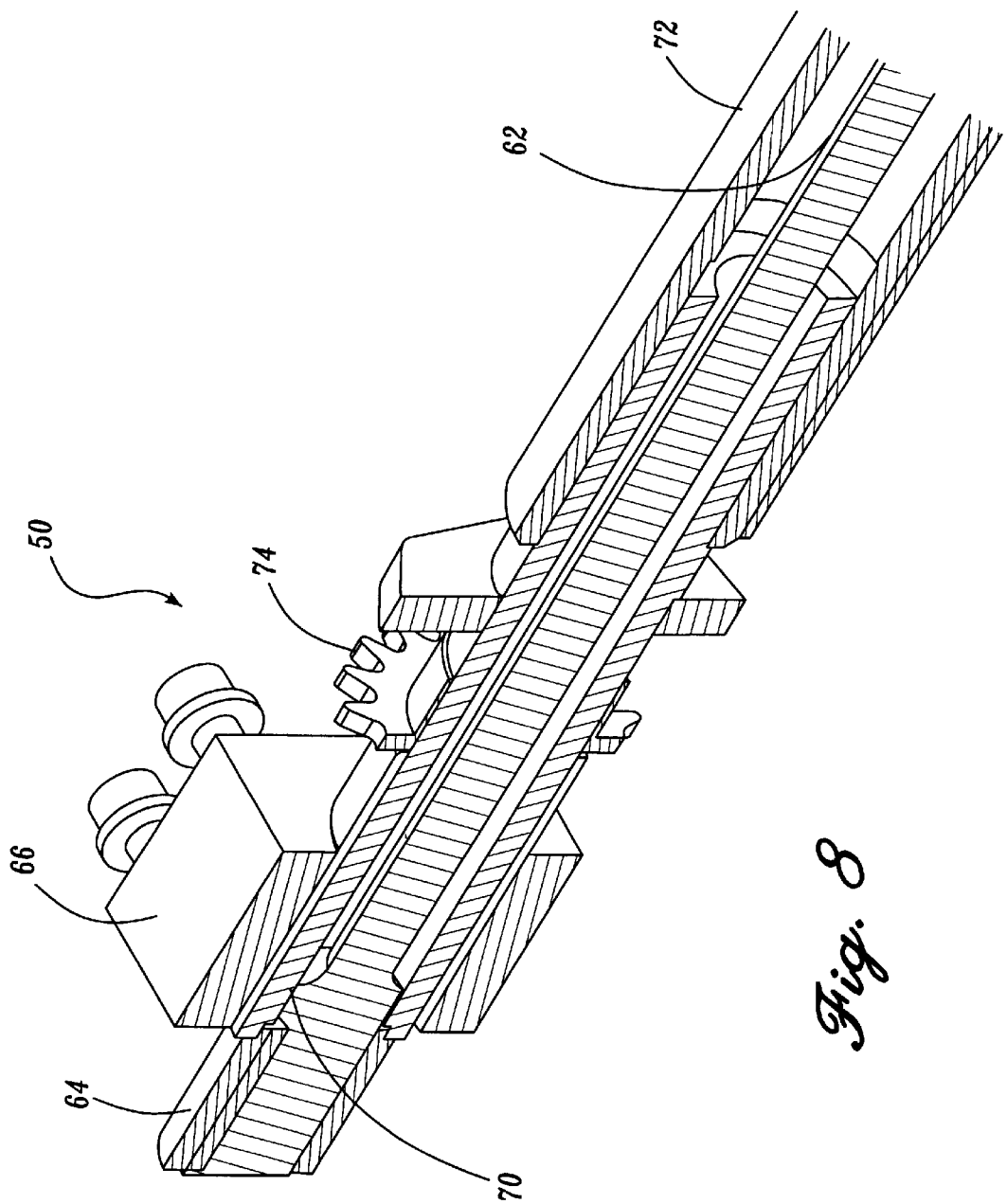
FIG. 8 is a perspective cross-sectional view of a rotating attachment end of a counter-balance assembly for a flip-out ramp formed in accordance with one embodiment of the present invention.

Referring now to FIG. 6, the rotating end 50 of the counter-balance assembly 28 will now be described in greater detail. The rotating end 50 includes a key insert 64, a bearing block 66, and a boss and pin structure 68. The rotating end 50 is similar to the fixed end 48 described above, with the exception that the key insert 64 of the rotating end 50 is attached to a torsion tube shaft 70 which, in turn, is attached to the ramp 24 and rotates with the ramp 24, as is described in greater detail below.

Still referring to FIGS. 4–8, the counter-balance assembly 28 includes a torsion tube 72 extending between the fixed and rotating ends 48 and 50. The rotating end 50 also includes a sprocket 74 fixed to the torsion tube shaft 70, such that when the drive assembly 22 is attached to the sprocket 74, the torsion rod 62 is twisted within the counter-balance assembly 28.

In operation, one end of the torsion rod 62 is fixed to the torsion tube shaft 70 by the key insert 64, such that as the drive assembly 22 causes the ramp 24 to rotate, the rotating end 50 of the torsion rod 62 twists to counter-balance the weight of the ramp 24. This reduces the load to drive the ramp 24 between stowed and deployed positions, thereby reducing motor drive requirements as well as improved weight and cost savings. Also, the counter-balance assembly 28 reduces the force required to manually operate the ramp 24 between stowed and deployed positions. The counter-balance assembly 28 preloads the ramp 24 in the stowed or deployed positions and is maintained in any position between the deployed and stowed positions by the combined resistance of the drive assembly 22, including the gear motor and/or system friction. The neutral position for the counter-balance assembly 28 is when the ramp 24 is nearly vertical, such that in either the stowed or deployed positions, the counter-balance assembly 28 is loaded because the torsion rod 62 is twisted from its normal shape or condition. This results in reduced load and forces required to reciprocate the ramp 24 between its stowed and deployed positions.

Figure 9:
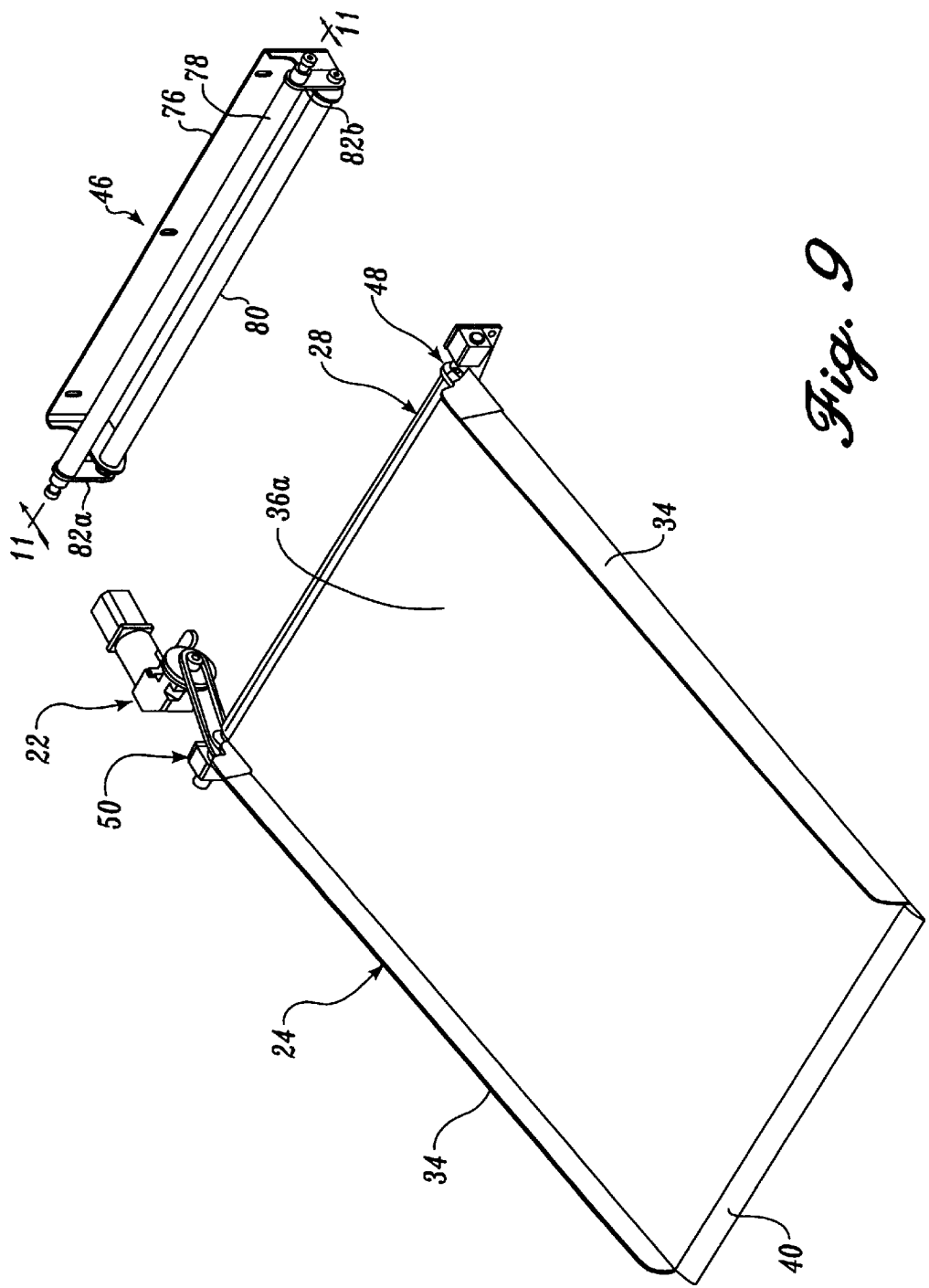
FIG. 9 is a perspective view of a ramp, drive motor assembly and pivot link assembly for a flip-out ramp formed in accordance with one embodiment of the present invention with structure removed for clarity.
Figure 10:
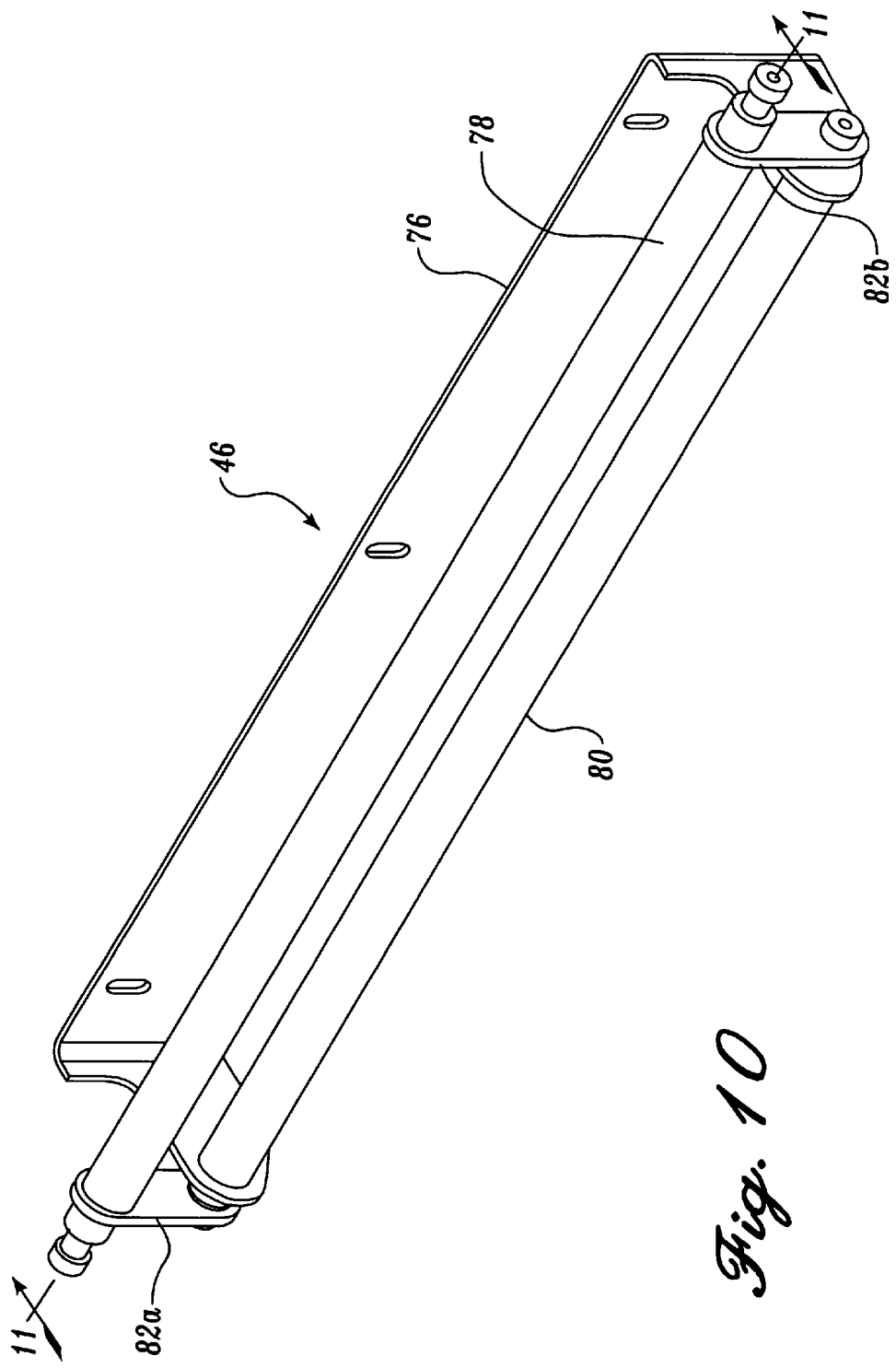
FIG. 10 is a perspective view of a pivot link assembly for a flip-out ramp formed in accordance with one embodiment of the present invention.
Figure 11:
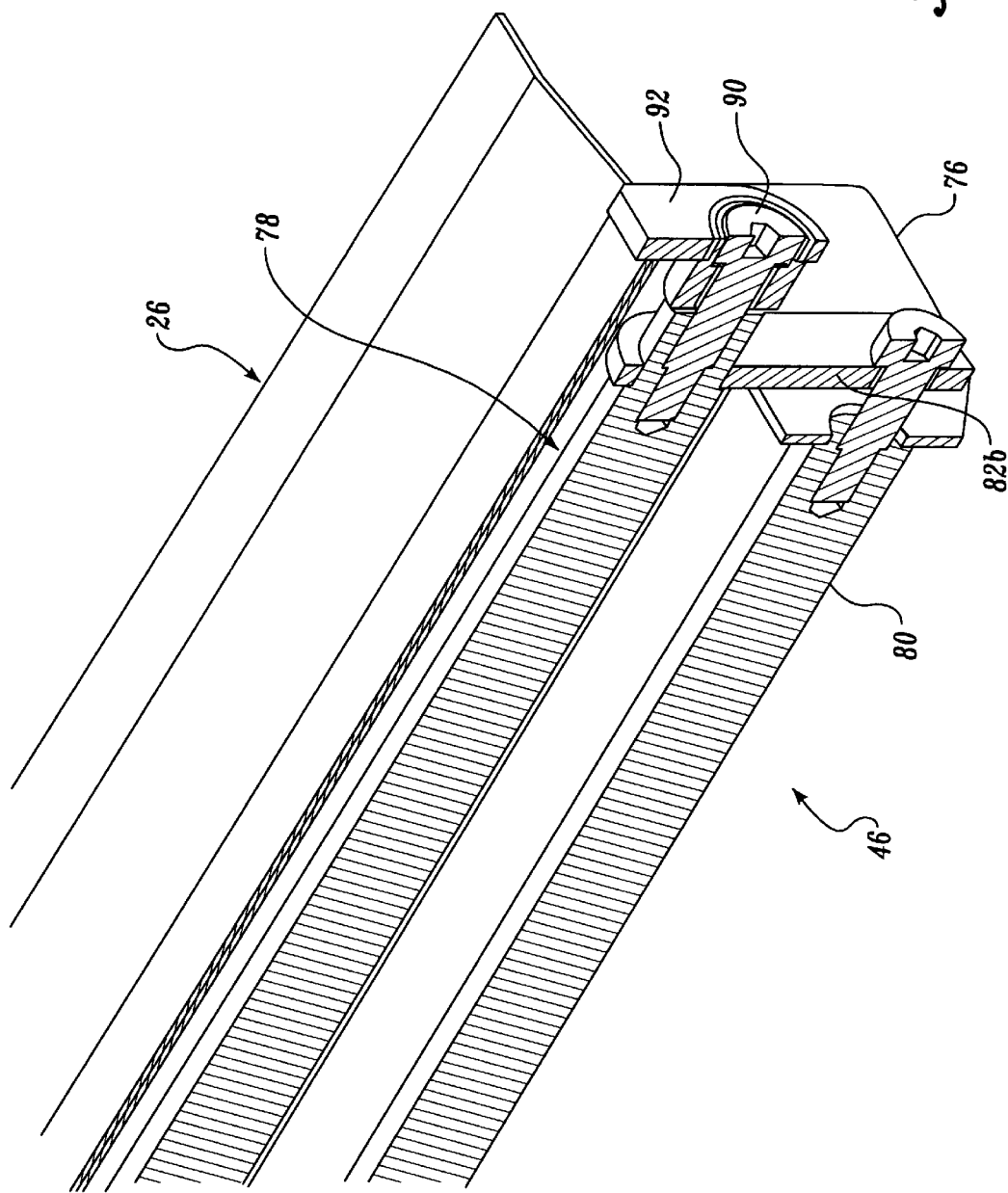
FIG. 11 is a cross-sectional perspective view of a pivot link assembly for a flip-out ramp formed in accordance with one embodiment of the present invention and showing one end of the pivot link assembly.

Referring now to FIGS. 9–11, the pivot link assembly 46 will be described in greater detail. The pivot link assembly 46 includes a bracket 76, a pivot rod 78, a spacer 80, and first and second links 82a and 82b. The bracket 76 is adapted to be fastened to frame structure 30 by well known fasteners, such as bolts and screws. The pivot rod 78 is attached by a well known fastener, such as a weld, to one end of the first and second pivot links 82a and 82b. The other end of the first and second pivot links 82a and 82b are pivotably attached opposite ends of the spacer 80. The inboard end of the moving floor 26 is pivotally attached to the pivot rod 78 by a well known fastener 90, such as a pin or shoulder screw, extending through a side plate 92 of the moving floor 26 and into the pivot rod 78.

Figure 12:
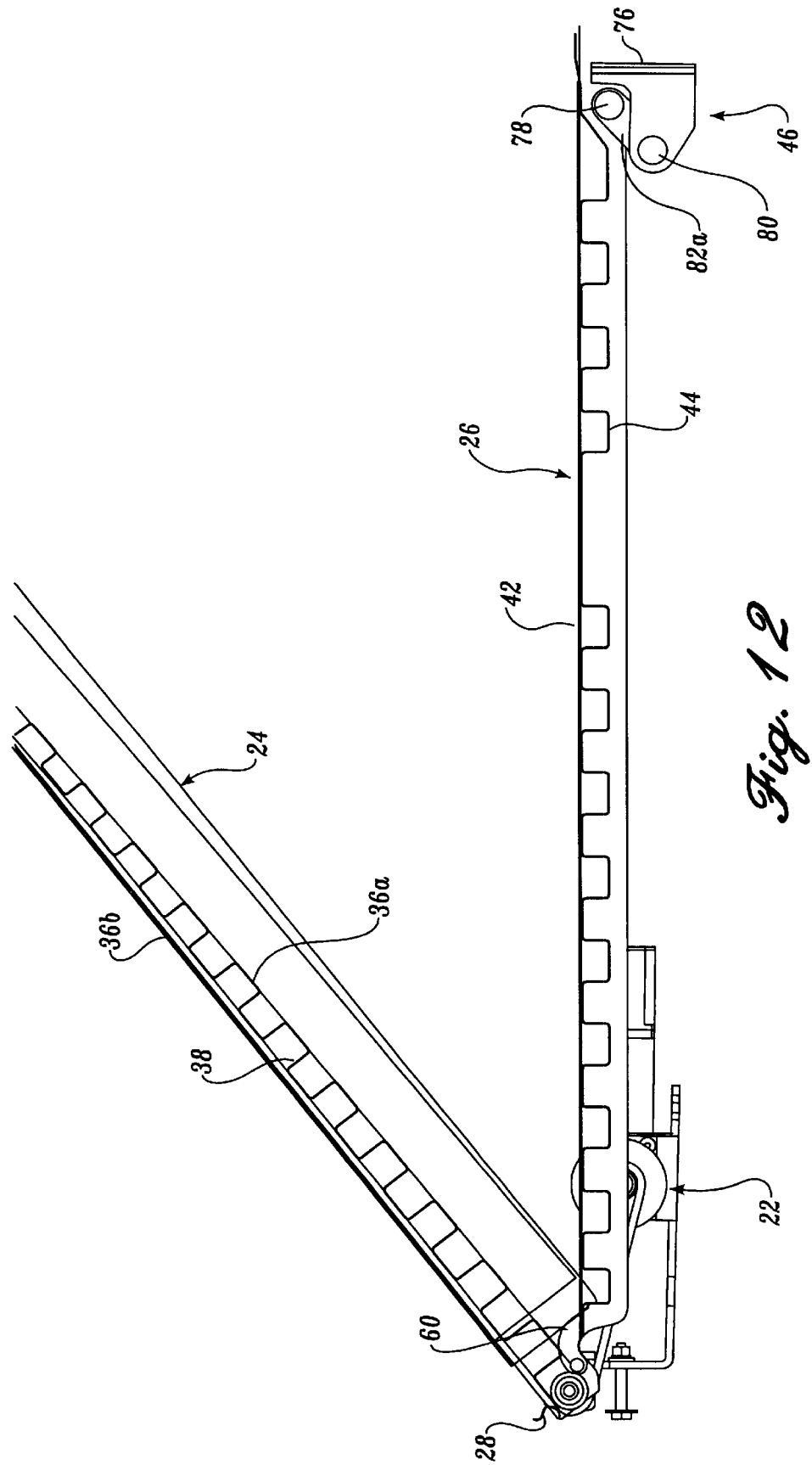
FIG. 12 is a cross-sectional side planar view of a flip-out ramp formed in accordance with one embodiment of the present invention showing the flip-out ramp in a partially deployed position.
Figure 13:
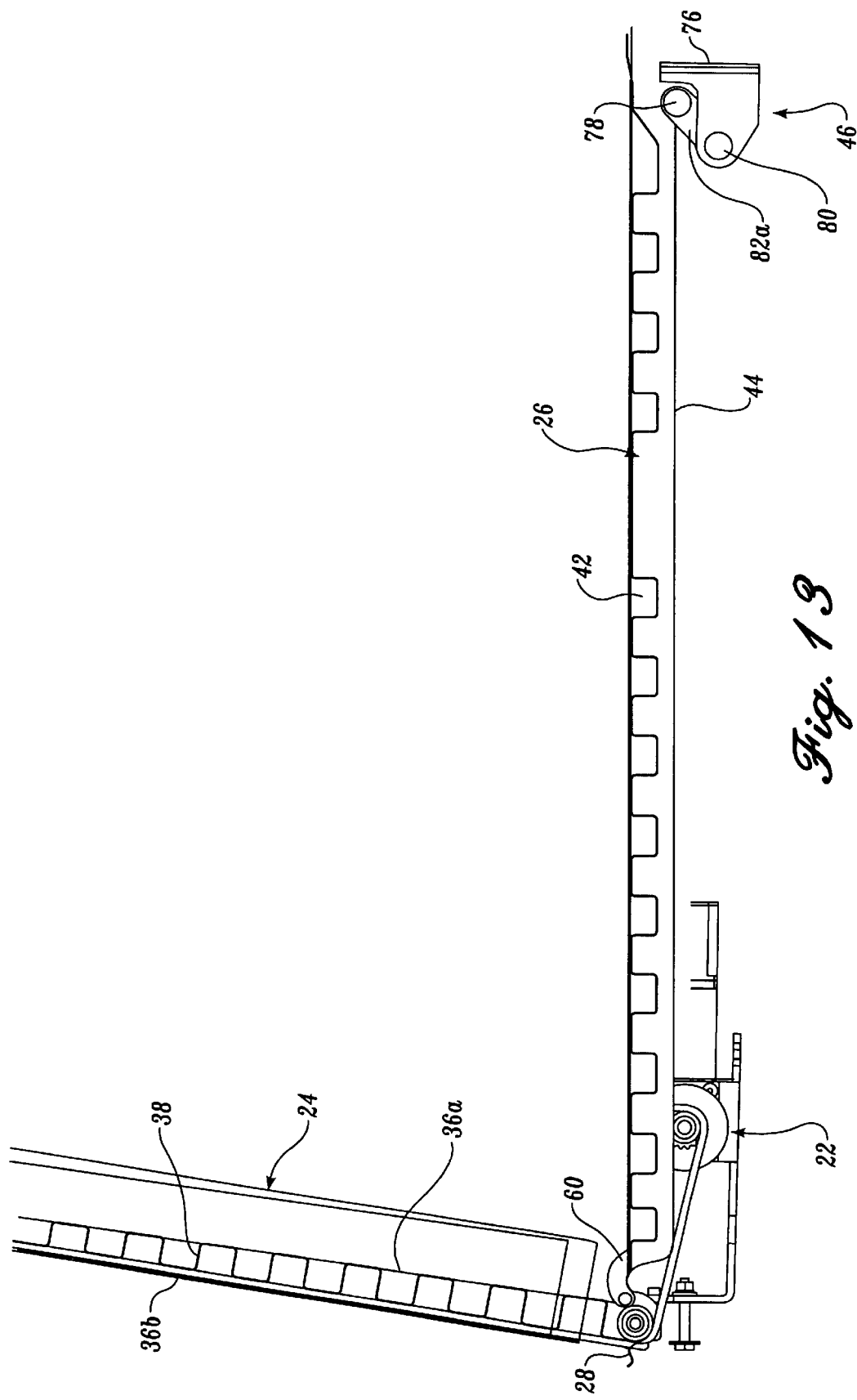
FIG. 13 is a cross-sectional side planar view of a flip-out ramp formed in accordance with one embodiment of the present invention showing the flip-out ramp in a substantially neutral position.
Figure 14:
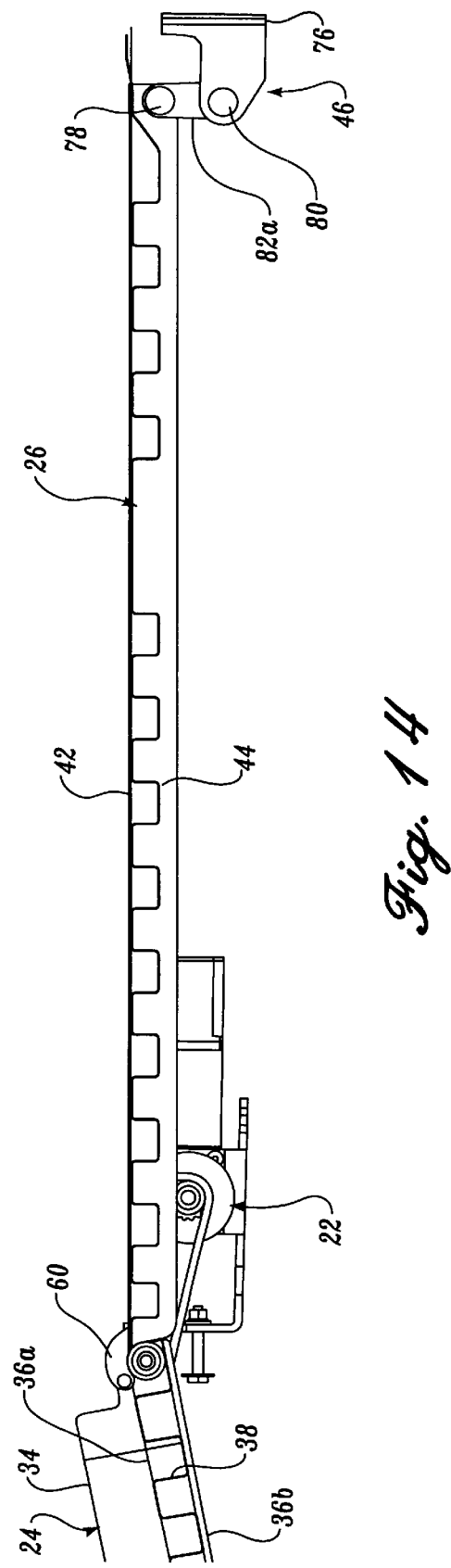
FIG. 14 is a cross-sectional side planar view of a flip-out ramp formed in accordance with one embodiment of the present invention and showing the flip-out ramp in the fully deployed position.
Figure 22:
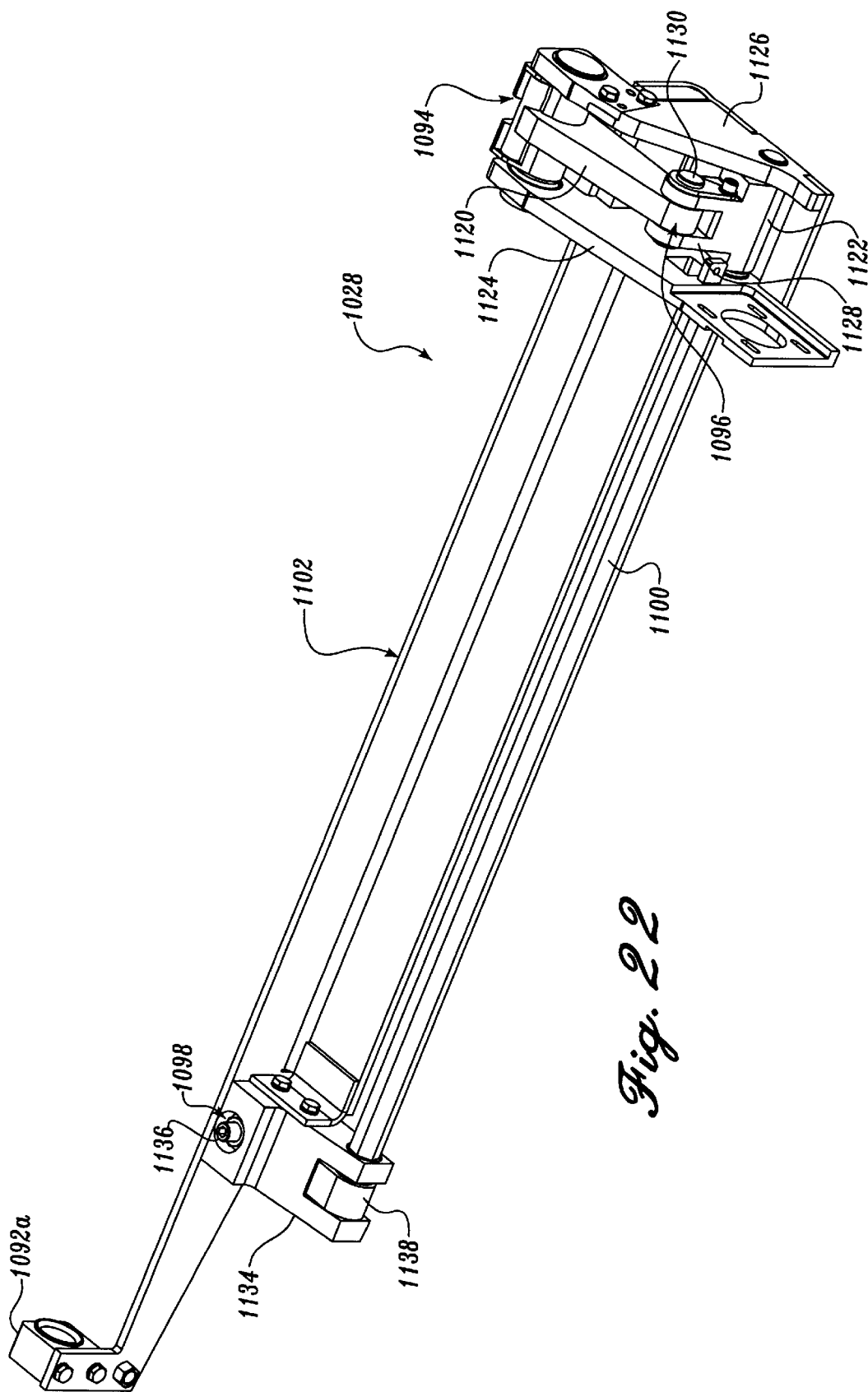
FIG. 22 is a perspective view of the first alternate embodiment of the counter-balance assembly for the ramp assembly of FIG. 15 with portions of the ramp removed for clarity.
Figure 23:
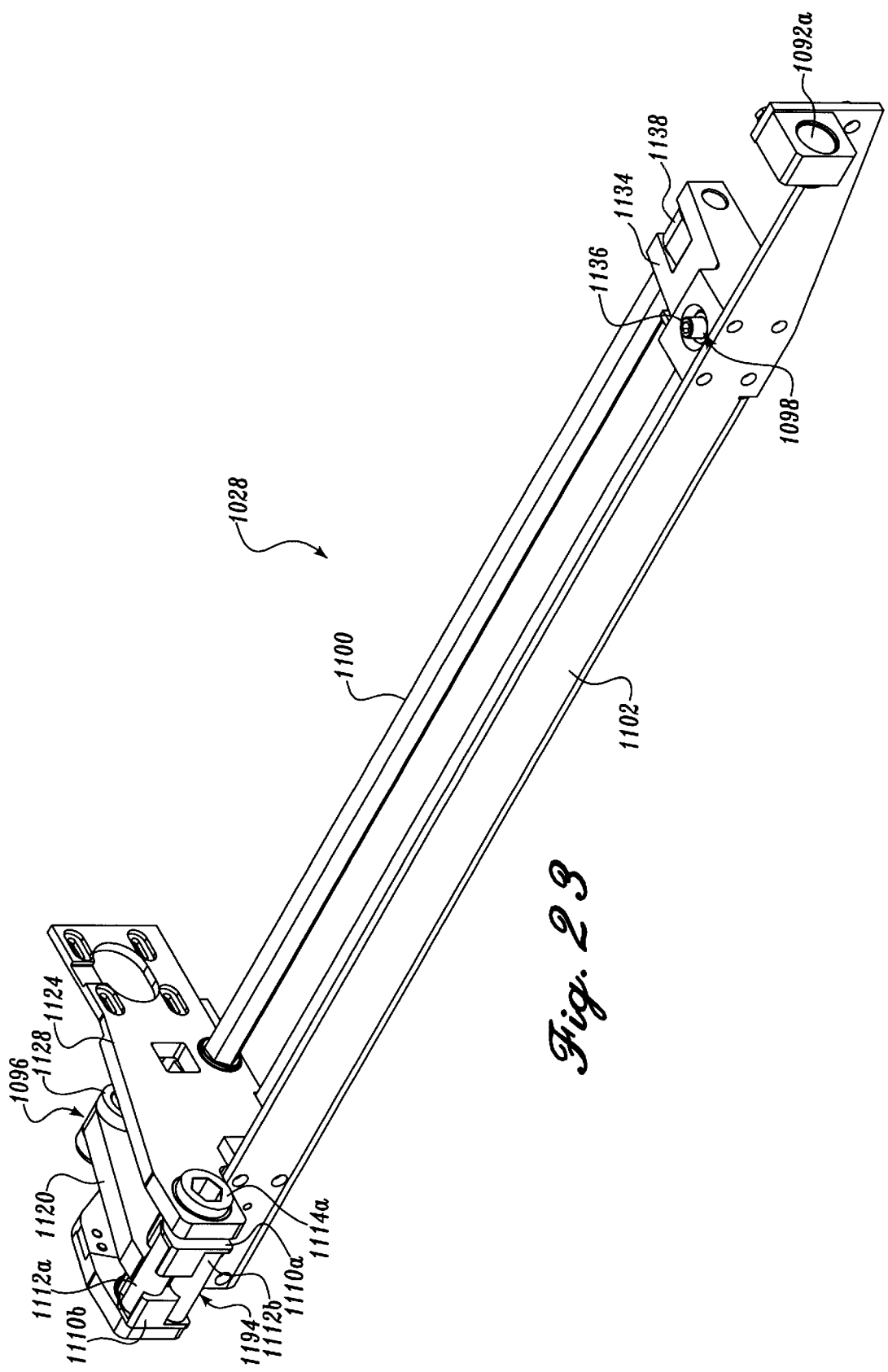
FIG. 23 is a perspective view of the counter-balance assembly of FIG. 22, wherein the counter-balance assembly is rotated 180° from the view shown in FIG. 22.
Figure 24:
FIG. 24 is a side planar view of the counter-balance assembly of FIG. 22.
Figure 25:
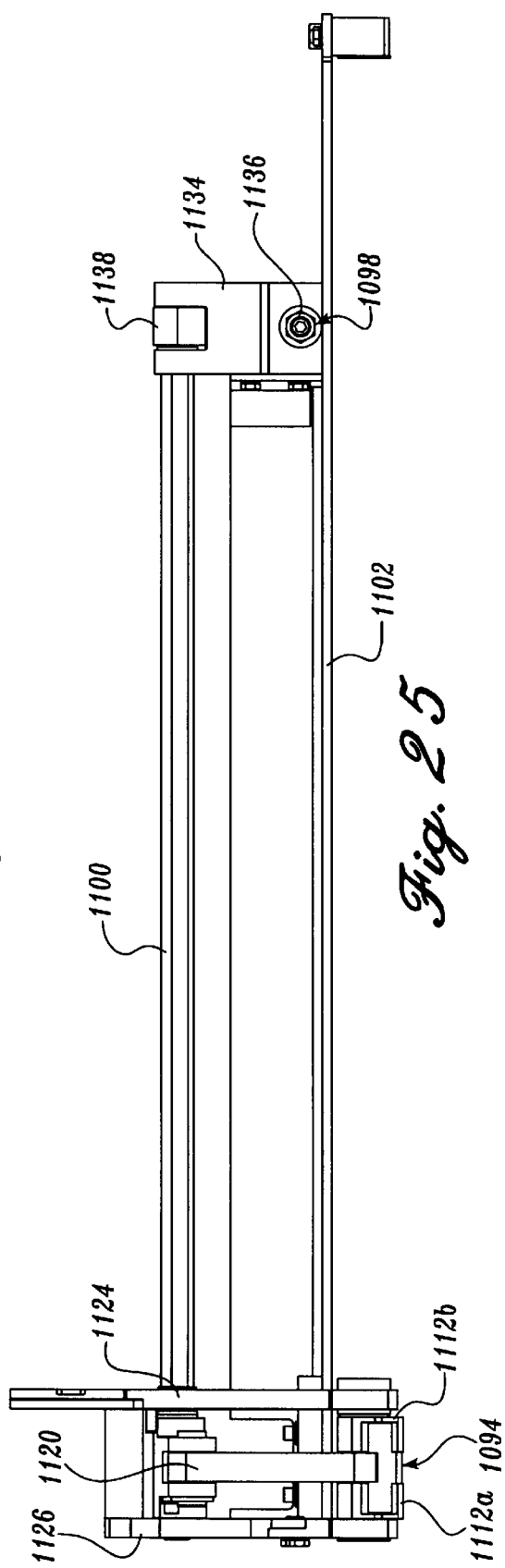
FIG. 25 is a top planar view of the counter-balance assembly of FIG. 24.

Operation of the moving floor 26 may be best understood by referring to FIGS. 12–14. As the ramp 24 begins its actuation sequence from the stowed to the deployed position, the ramp 24 pivots about the counterbalance assembly 28. The moving floor 26 pivots about the spacer 80 and it also translates slightly outboard from its stowed position. Because the moving floor 26 is attached to the pivot link assembly 46 by the links 82a and 82b, and attached to side curb 34 at boss 56, the moving floor acts as a coupler of a four bar linkage. Further, as the ramp 24 continues to the deployed position, the moving floor is raised upwardly to a position substantially flush with the floor of the vehicle by the pivot link assembly 46. Thus, as the ramp assembly 20 reciprocates between its deployed and stowed position, the moving floor 26 both rotates and translates into and out of flush position with the floor of the vehicle.

Referring now to FIGS. 15–30, a first alternate embodiment of a flip-out ramp 1020 formed in accordance with the present invention will now be described in greater detail. The flip-out ramp assembly 1020 is identical in materials and operation as the embodiment described above, with the exception that a new counter-balance assembly 1028 is included. As may be best seen by referring to FIG. 17, this embodiment of the flip-out ramp assembly 1020 includes three bearing points 1092a, 1092b, and 1092c. The counter-balance assembly 1028 includes a torsion pin weldment assembly 1094, a counter-balance linkage assembly 1096, an adjustment assembly 1098, and a torsion bar 1100.

The torsion pin weldment assembly 1094 may be best understood by referring to FIGS. 18–21. The torsion pin weldment assembly 1094 includes first and second support brackets 1110a and 1110b, first and second cam pins 1112a and 1112b, and first and second stub shafts 1114a and 1114b. The first and second cam pins 1112a and 1112b extend laterally between the first and second support brackets 1110a and 1110b. The second stub shaft 1114b may be integrally formed with and extends laterally from the second support bracket 1110b. The first stub shaft 1114a includes a hex shaped cavity 1115 extending partially therethrough and is sized to receive a correspondingly shaped hex stub 1116b (FIG. 17) extending laterally from the ramp 1024. As a result, the ramp 1024 is keyed to the rotation of the torsion pin weldment assembly 1094.

Referring now to FIGS. 22–26, the counter-balance linkage assembly 1096 will now be described in greater detail. The counter-balance linkage assembly 1096 includes an arm 1120, a torsion arm 1122, a motor mount plate 1124, and a support plate 1126. The first and second stub shafts 1114a and 1114b of the torsion pin weldment assembly 1094 described above extends between opposed surfaces of the motor mount plate 1124 and a portion of the support plate 1126, which also includes bearings 1092b and 1092c sized to receive corresponding stub shafts 1114a and 1114b. The cam pins 1112a and 1112b of the torsion pin weldment assembly 1094 are positioned to engage a portion of the arm 1120, as described in greater detail below.

The torsion arm 1122 includes a clevis 1128 extending upwardly from the base of the torsion arm 1122. The clevis 1128 is sized to receive one end of the arm 1120 therebetween. The arm 1120 is rotatably attached within the clevis 1128 by a pin 1130 extending laterally through the clevis 1128 and the corresponding end of the arm 1120. The free end of the arm 1120 is camed to included first and second saddles 1132a and 1132b.

Figure 26:
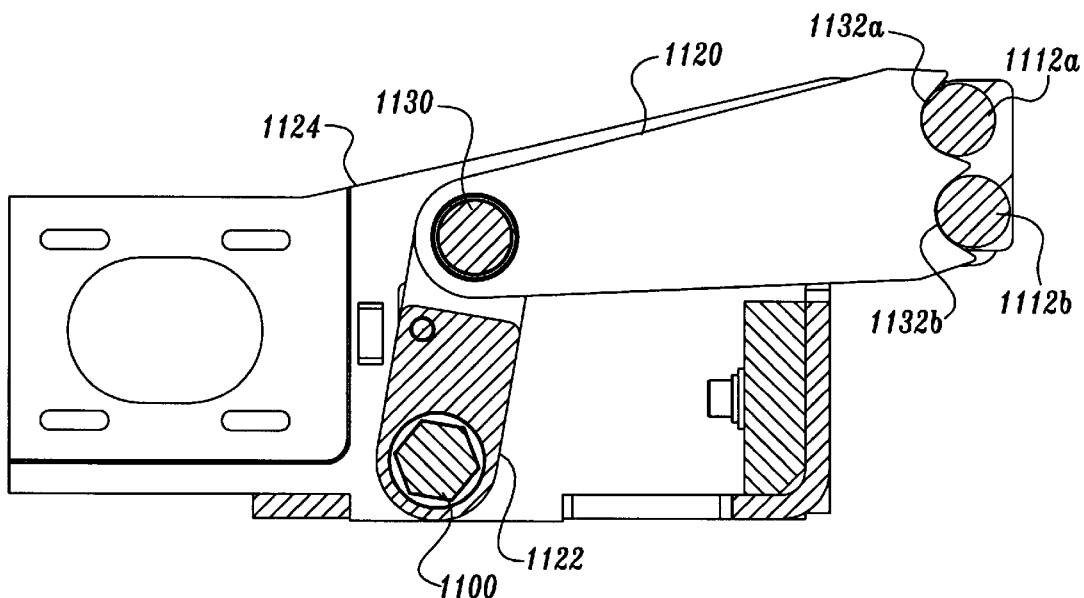
FIG. 26 is a partial cross-sectional side planar view of the counter-balance assembly of FIG. 24 taken through Section 26—26.

As best seen by referring to FIG. 26, the first and second saddles 1132a and 1132b are sized to selectively receive the first and second cam pins 1112a and 1112b during actuation of the ramp platform 1024. The cam pins 1112a and 1112b are orientated such that when the ramp is rotated through its range of motion, each cam pin separately engages one of the two saddles 1132a and 1132b. One cam pin functions from the stowed ramp position to the vertical position. The other cam pin functions from the vertical position to the fully deployed ramp position. Typically, only one pin at a time correspondingly engages one of the two saddles 1132a and 1132b, thereby causing the torsion arm 1122 to rotate and, thus, load the torsion rod 1100. The cam pins may simultaneously engage the saddles 1132a and 1132b when the ramp angle is nearly vertical, as seen in FIG. 26.

As may be best seen by referring back to FIG. 22, one end of the torsion bar 1100 is supported by the motor mount support plate 1124 and support plate 1126, and is keyed to the torsion arm 1122. The other end of the torsion bar 1100 is supported by a support block 1134 and is keyed to a tapered lever 1138 of an adjusting assembly 1098. The adjusting assembly 1098 allows preload or deadband adjustment of the counter-balance assembly 1028.

Figure 27:
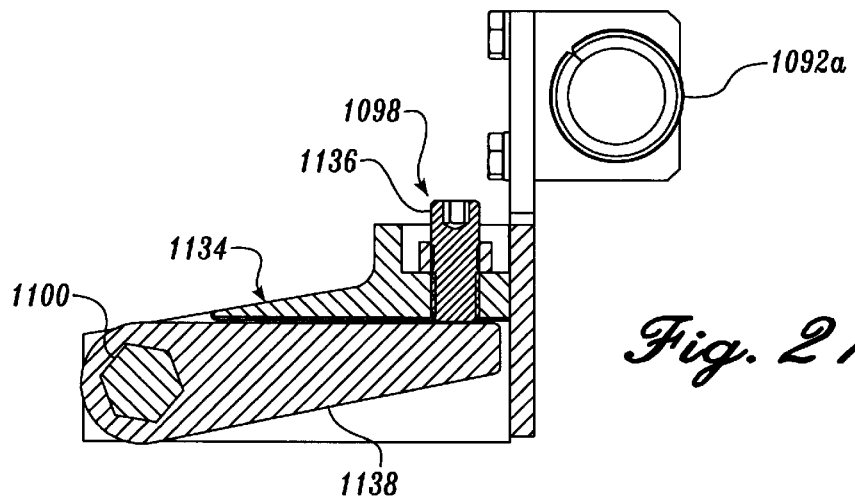
FIG. 27 is a cross-sectional side planar view of the counter-balance assembly of FIG. 24 taken through Section 27—27.

As best seen by referring to FIG. 27, the adjustment assembly 1098 includes a set screw 1136 and the tapered lever 1138. One end of the tapered lever 1138 is keyed to the torsion bar 1100 and is adapted to limit rotation of one end of the torsion bar 1100. The other end of the tapered lever 1138 is seated against the lower end of the set screw 1136. Adjustment of the set screw 1136 controls the preload or deadband stiffness of the torsion bar 1100.

Also seen in FIG. 27 is first bearing 1092a which is sized and adapted to receive a corresponding stub shaft 1116a (FIG. 17) extending laterally from one end of the ramp 1024.

Figure 28:
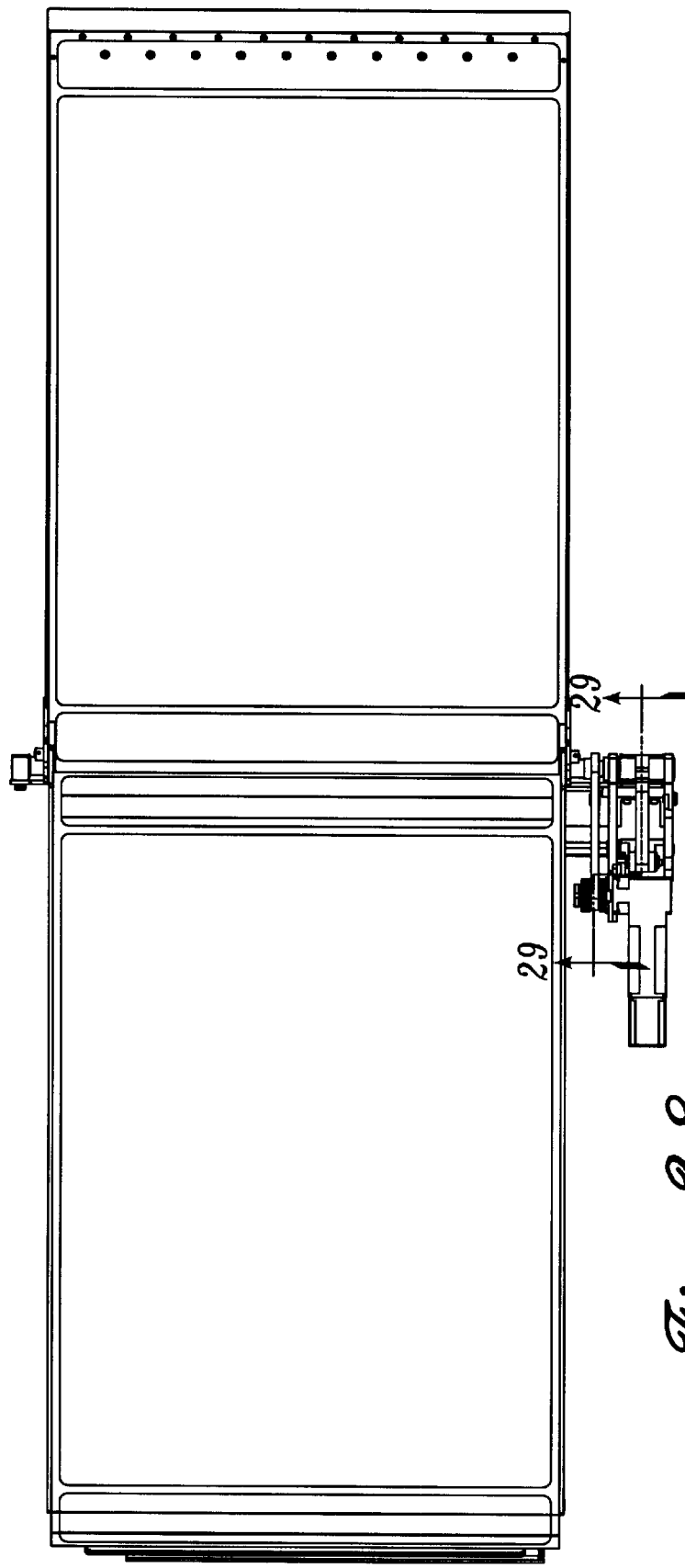
FIG. 28 is a top planar view of the flip-out ramp assembly, showing the flip-out ramp assembly in the fully deployed position.
Figure 29:
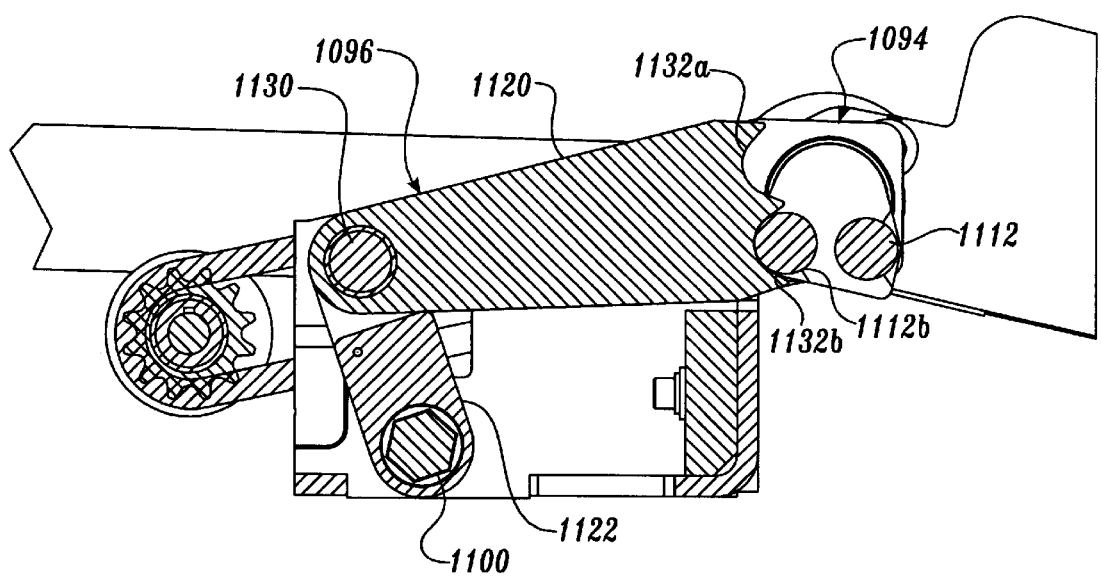
FIG. 29 is a partial cross-sectional side planar view of the flip-out ramp of FIG. 28, showing the counter-balance assembly and taken through Section 29—29 of FIG. 28.

The ramp assembly 1020 in the fully deployed position may be best understood by referring to FIGS. 28–29. As seen in FIG. 29, only one of the two cam pins (1112b) of the torsion pin weldment assembly 1094 is seated within the saddle 1132b of the arm 1120.

Figure 30:
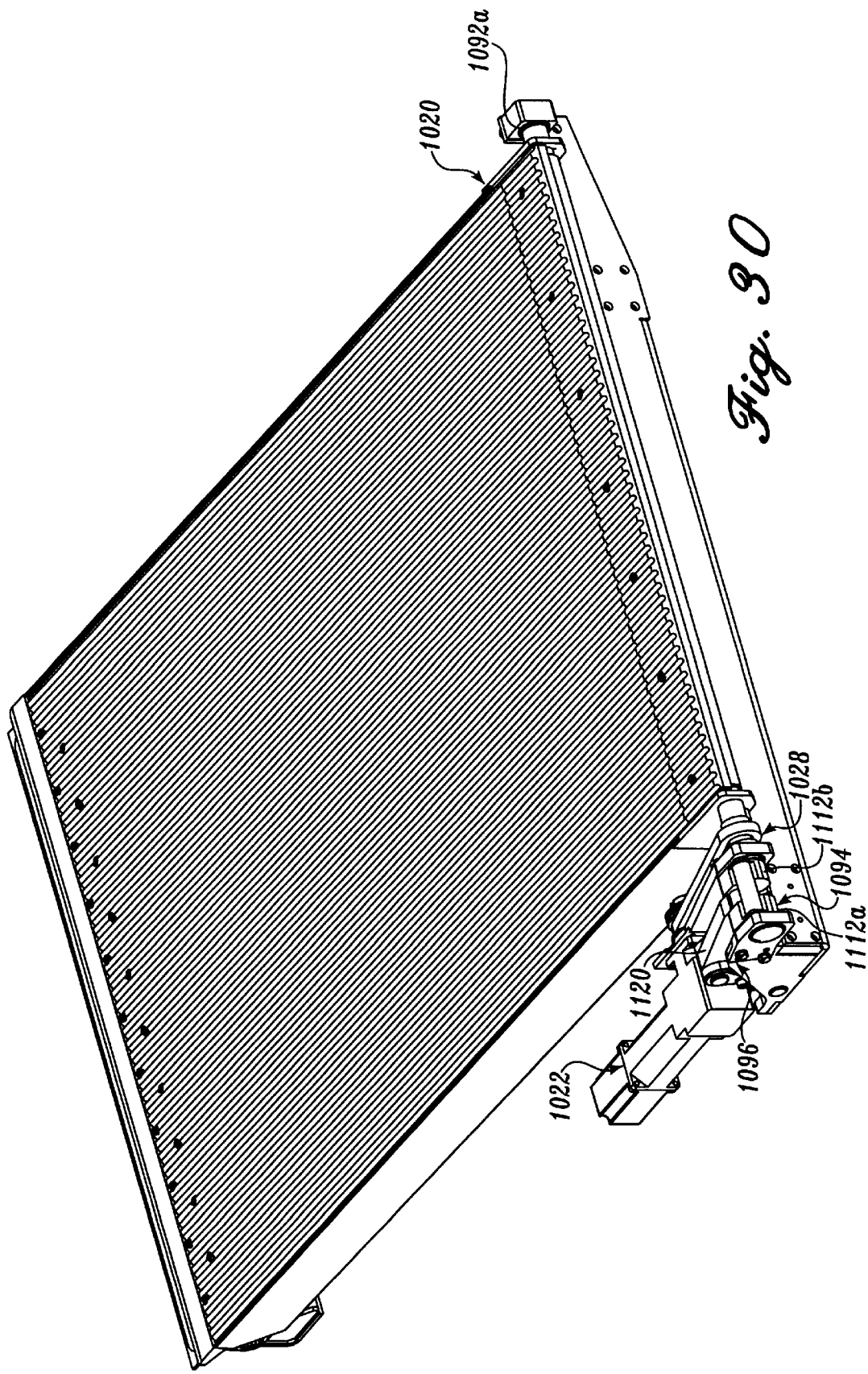
FIG. 30 is a perspective view of a flip-out ramp of FIG. 15 with the flip-out ramp shown in the stowed position.
Figure 31:
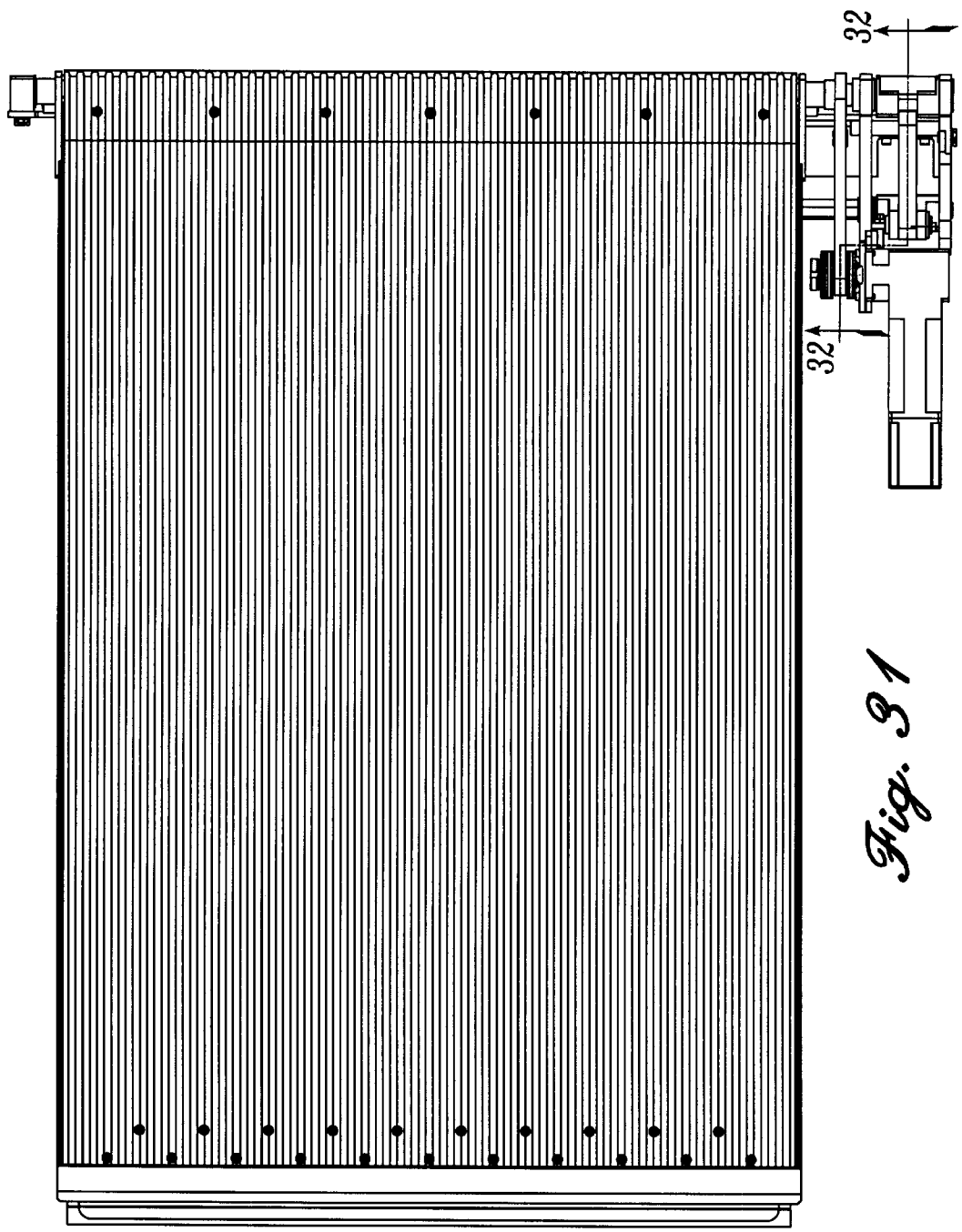
FIG. 31 is a top planar view of the flip-out ramp of FIG. 30.
Figure 32:
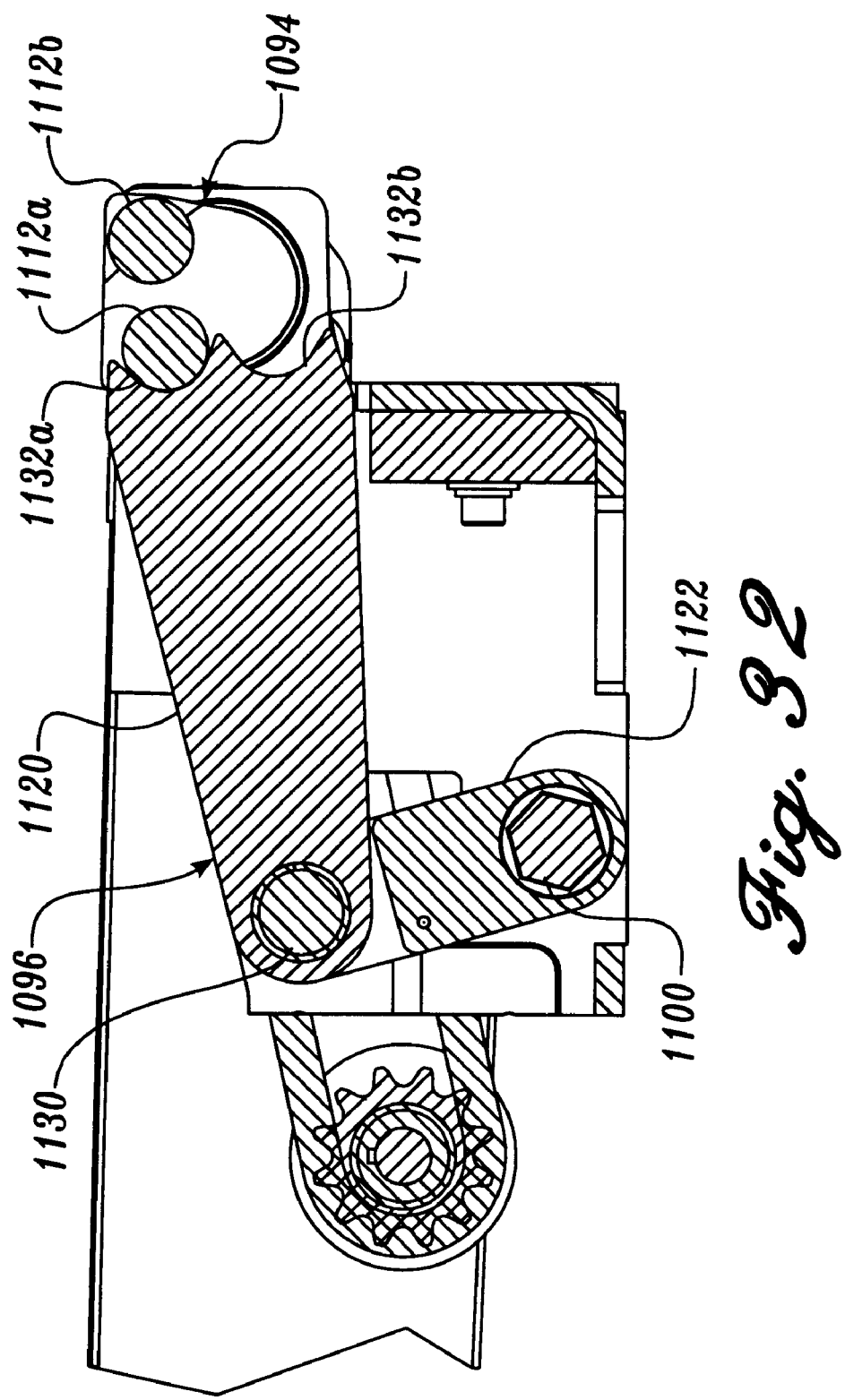
FIG. 32 is a partial cross-sectional side planar view of the flip-out ramp of FIG. 31 taken through Section 32—32.

The ramp assembly 1020 in the fully stowed position may be best understood by referring to FIGS. 30–32. In the fully stowed position, and as may be best seen by referring to FIG. 32, cam pin 1112a is seated in the first saddle 1132a of arm 1120.

Figure 33:
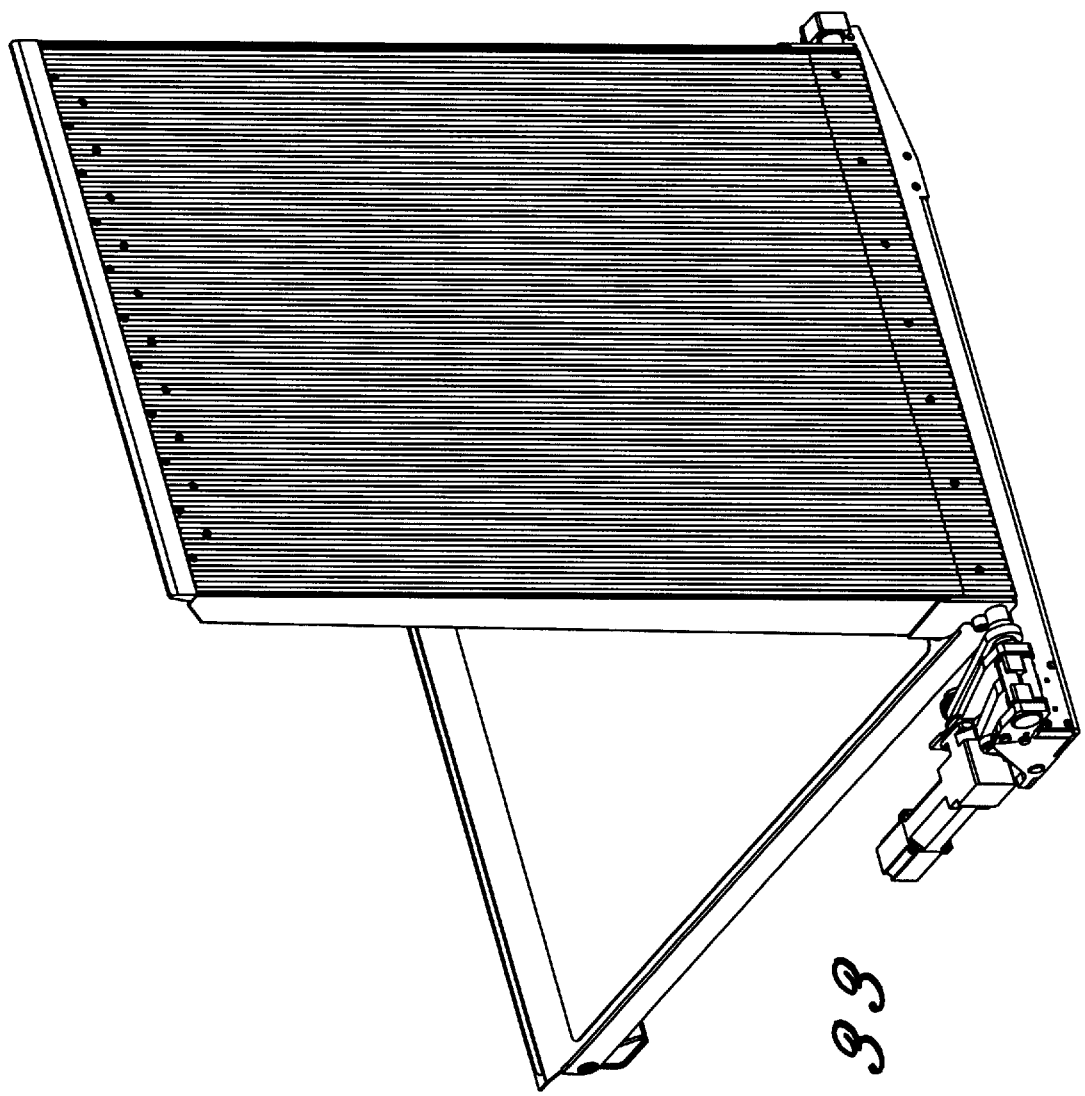
FIG. 33 is a perspective view of the flip-out ramp of FIG. 15 with the flip-out ramp shown in a substantially 90° deployment position.
Figure 34:
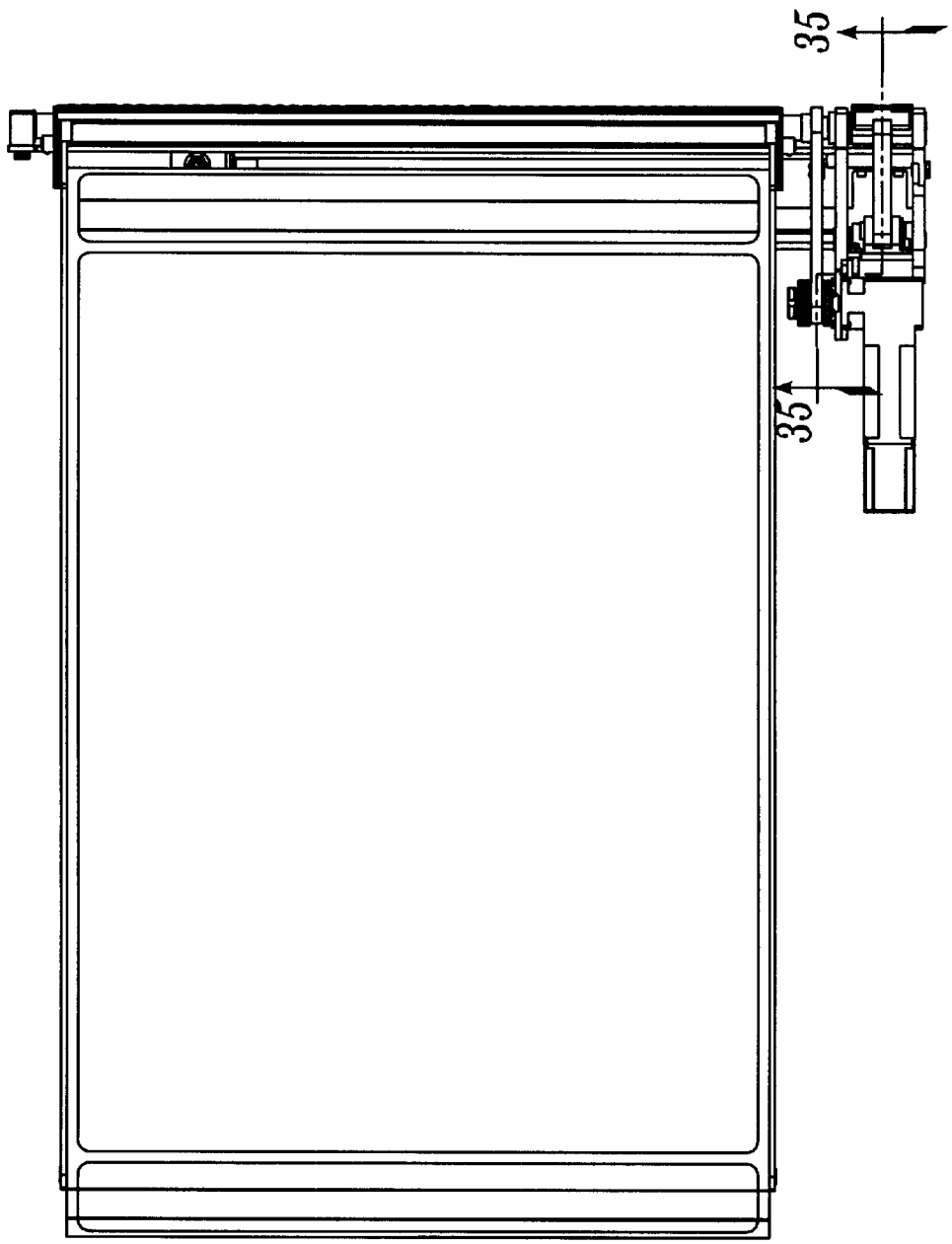
FIG. 34 is a top planar view of the flip-out ramp assembly of FIG. 33.
Figure 35:
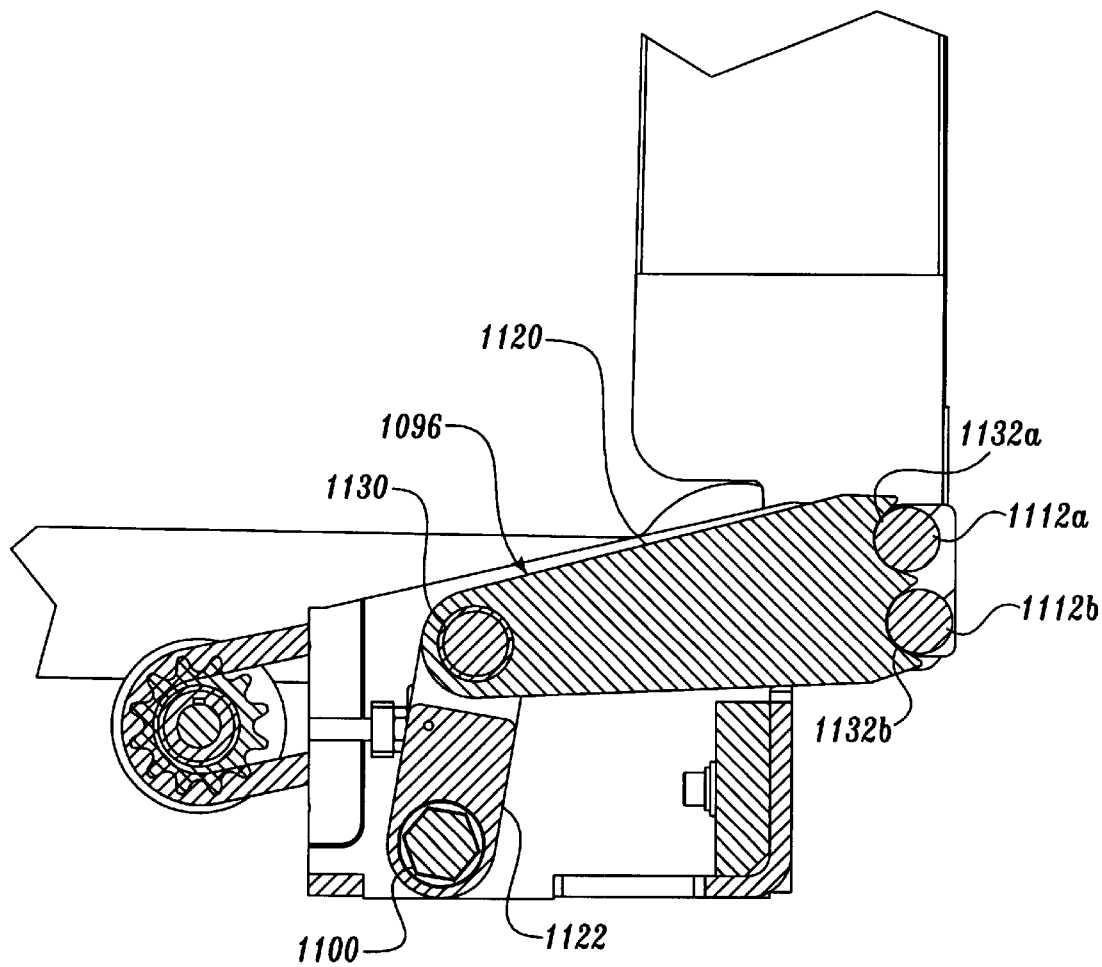
FIG. 35 is a partial cross-sectional side planar view of the flip-out ramp assembly of FIG. 34 taken through Section 35—35.
Figure 36:
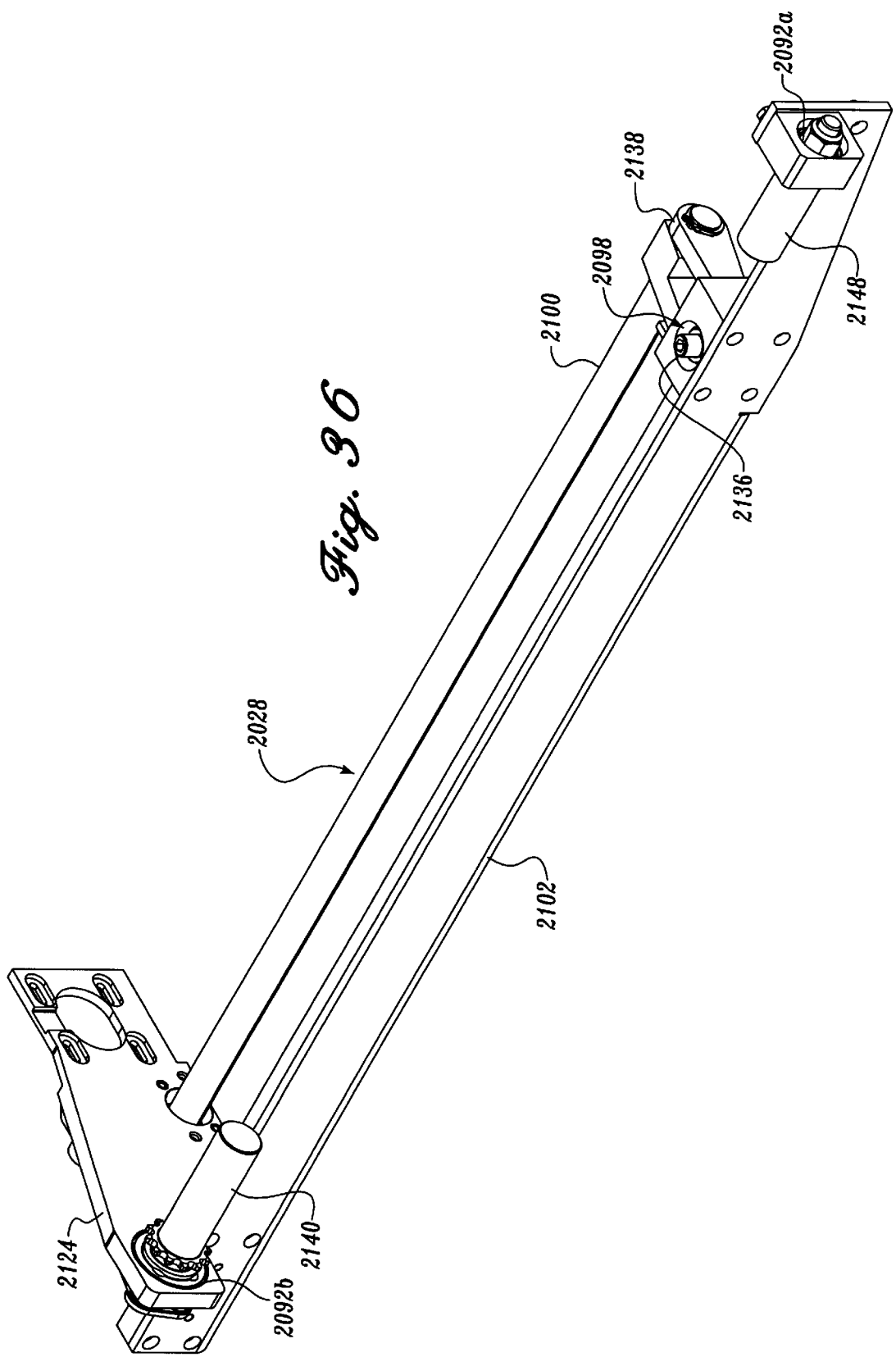
FIG. 36 is a perspective view of a second alternate embodiment of a counter-balance assembly for a flip-out ramp formed in accordance with the present invention with portions of the flip-out ramp assembly removed for clarity.
Figure 37:
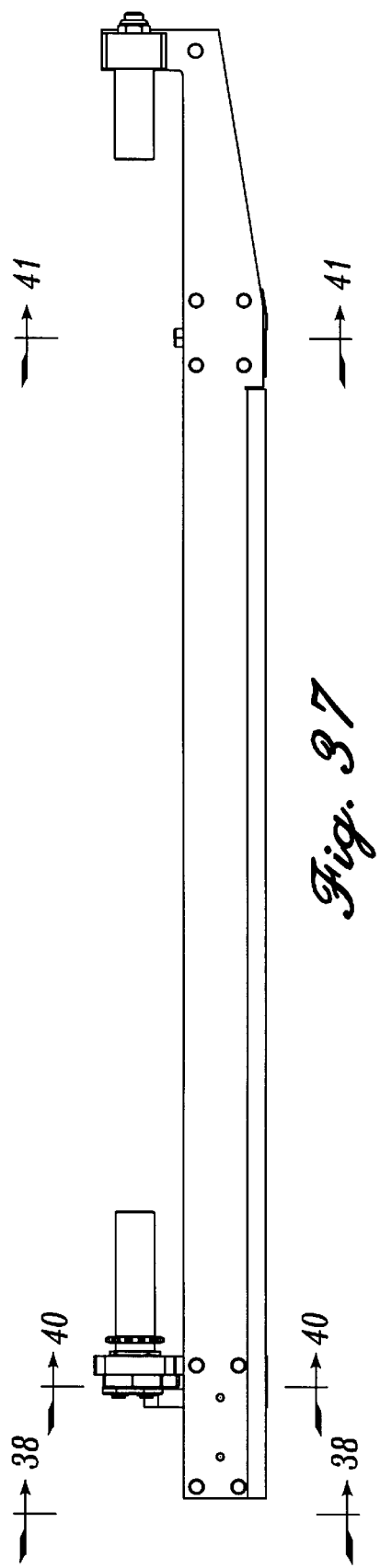
FIG. 37 is an end planar view of the counter-balance assembly of FIG. 36.
Figure 40:
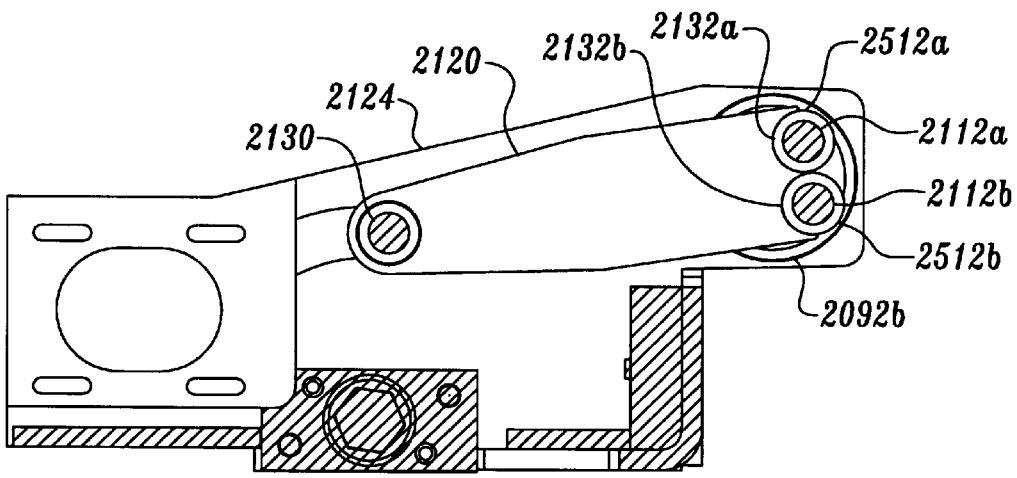
FIG. 40 is a cross-sectional side planar view of the counter-balance assembly of FIG. 37 and taken through Section 40—40.
Figure 41:
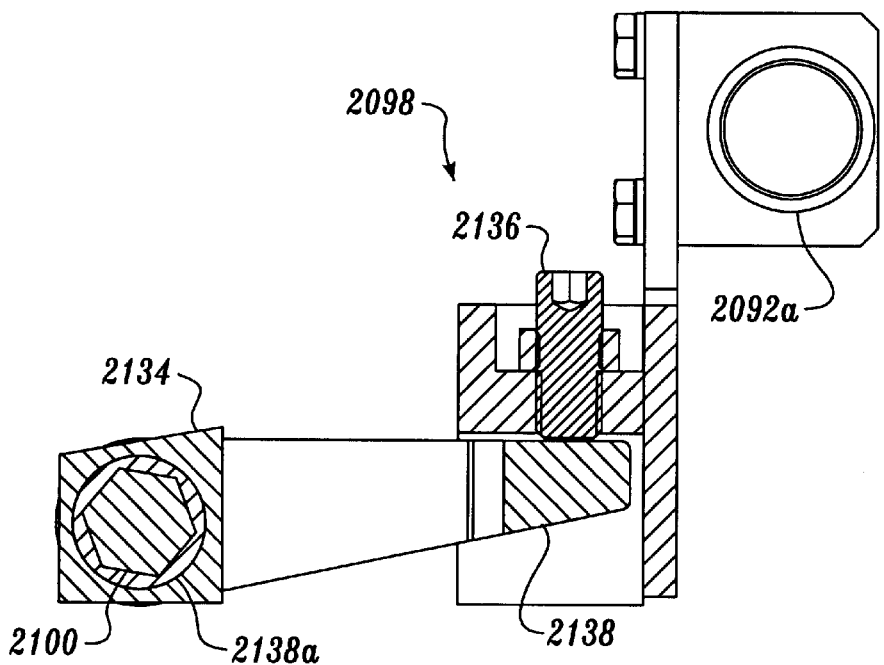
FIG. 41 is a cross-sectional side planar view of the counter-balance assembly of FIG. 37 and taken through Section 41—41.
Figure 47:
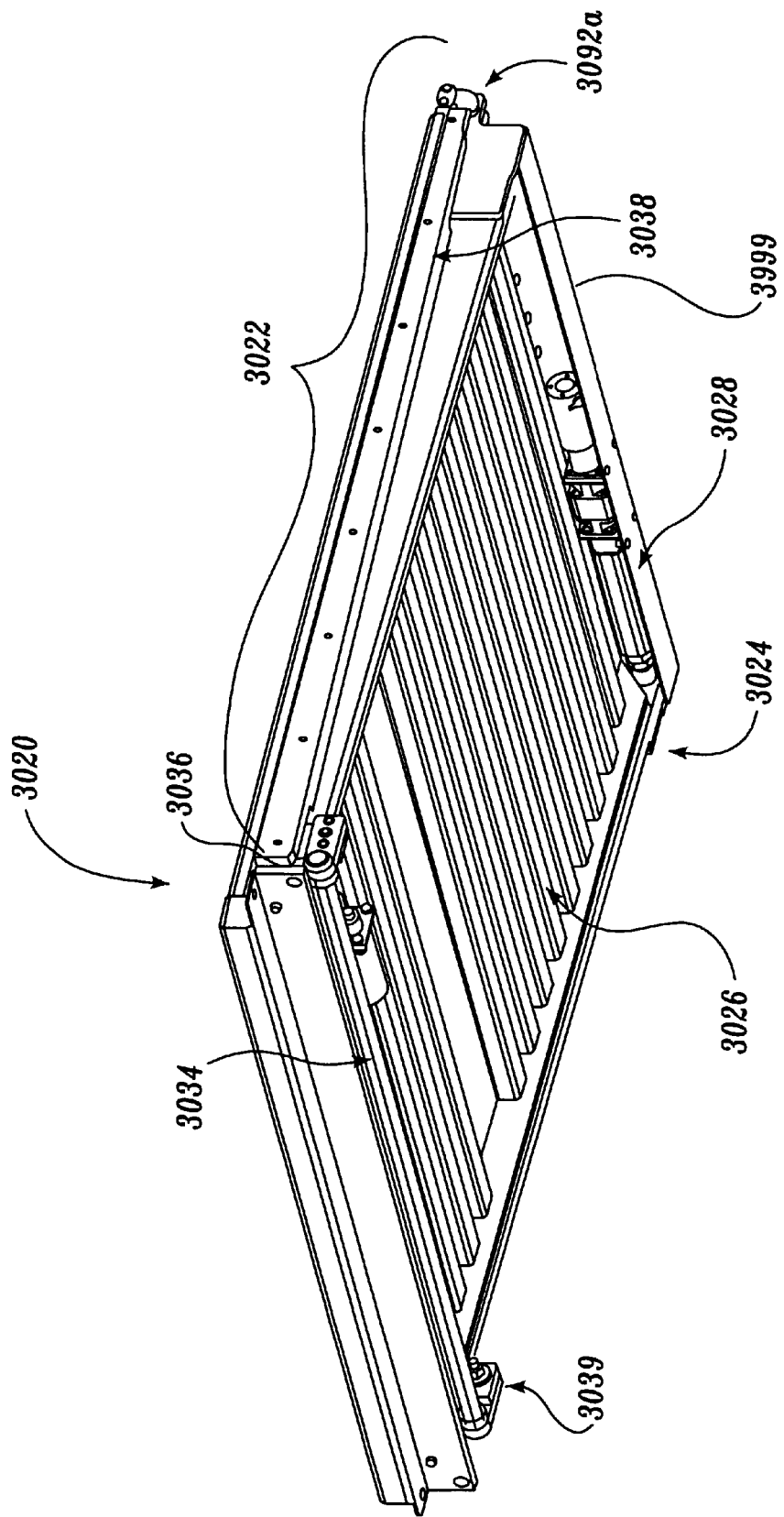
FIG. 47 is a perspective view of a flip out ramp formed in accordance with one embodiment of the present invention showing the flip out ramp in the closed position.

The ramp assembly 1020 in the near vertical position may be best understood by referring to FIGS. 33–35. As may be best seen by referring to FIG. 35, in the near vertical 90° position, both cam pins 1112a and 1112b are seated within the first and second saddles 1132a and 1132b of the arm 1120.

Referring now to FIGS. 36–46, another embodiment of a flip-out ramp 2020 of the current invention will now be described in greater detail. This embodiment is identical in materials and operation to the invention described above with the exception that a counterbalance assembly 2028 constructed in accordance with this embodiment of flip-out ramp assembly 2020 includes only two bearing points 2092a and 2092b instead of three bearing points.

As may be best seen by referring to FIGS. 42–46, the counter-balance linkage assembly 2096 includes an arm 2120 and a torsion arm 2122. In this embodiment, the rear stub shaft 2140 of the ramp assembly 2024 replaces the hex stub shaft 1116b of the first alternate embodiment. The rear shaft 2140 includes a spherical surface 2142 located on one end of the rear stub shaft 2140. The outer face of the rear stub shaft 2140 includes a pair of cavities 2144a and 2144b. Each cavity 2144a and 2144b are sized to receive a corresponding cam pin 2112a and 2112b. As an alternative, each cam pin may be integral with the rear stub shaft 2140.

Each cam pin 2112a and 2112b is fixed to rear stub shaft 2140 by welding or other means. Each cam pin 2112a and 2112b supports a bearing 2512. The bearings 2512a and 2512b engage saddles 2132a and 2132b of arm 2120. Torque rod 2100 is keyed to torque arm 2122 at one end and is keyed to tapered lever 2138 at the other end. Support block 2134 supports tapered lever 2138 on surface 2138a. Motor mount plate 2124 supports bearing block 2124a. Bearing 2124b is housed in bearing block 2124a (FIG. 39). Torsion arm 2122 is pivotally supported by bearing 2124b at surface 2122a. Thus, torsion arm 2122 is pivotally attached to motor mount plate 2124.

The counter-balance assembly 2028 includes a second stub shaft 2148 extending from the first bearing member 2192a. The rear stub shaft 2140 and stub shaft 2148, located in ramp platform 2024, are sized to be received within corresponding bearings 2092b and 2092a. Operation is the same as first alternate embodiment. Corresponding numbers start with 2xxx in place of 1xxx.

Referring now to FIGS. 47–68, a third alternate embodiment of the current invention will now be described in greater detail. Like the second alternate embodiment, the third alternate embodiment has two bearing points 3092a and 3092b. The flip-out ramp 3020 formed in accordance with the third embodiment of the present invention is similar in materials and operation to the alternate embodiments described above with the following exceptions. First, elements of the counterbalance linkage assembly 3022 have been repositioned or redesigned. Second, a new drive assembly 3024 (FIG. 52) has been provided. The moving floor 26 and 1026 of the previous embodiments has been replaced with a rising floor 3026. A clutch assembly 3028 has been added. A unitized frame 3999 has been added. Finally, a stow latch assembly 3030 has been added. For conciseness, only the foregoing exceptions will be described in greater detail.

Referring to FIGS. 47–50, the counterbalance linkage assembly 3022 will now be described in greater detail. The counterbalance linkage assembly 3022 includes a torsion bar 3034, a torsion arm 3036, an actuating arm 3038, and an adjustment assembly 3039. The torsion bar 3034 is similar in operation and materials to the torsion bar 1100 (FIG. 22) described in the previous embodiments except that it has been moved from the outboard side (curb side) of the flip-out ramp assembly 3020 to the inboard side (road side). Specifically, the location of the torsion bar 3034 has been moved from the side of the ramp nearest the curb to a location towards the longitudinally extending centerline of the vehicle.

The actuating arm 3038 is similar in operation and materials to the actuating arm 1120 (FIGS. 22–26) described in the previous embodiments except that it has been lengthened. As set forth above for the arm 1120, the actuating arm 3038 is suitably rotatably attached to torsion arm 3036 by a pin 3039 extending laterally through the corresponding end of the actuating arm 3038. The free end of the actuating arm 3038 is camed to include first and second saddles 3040a and 3040b.

Figure 48:
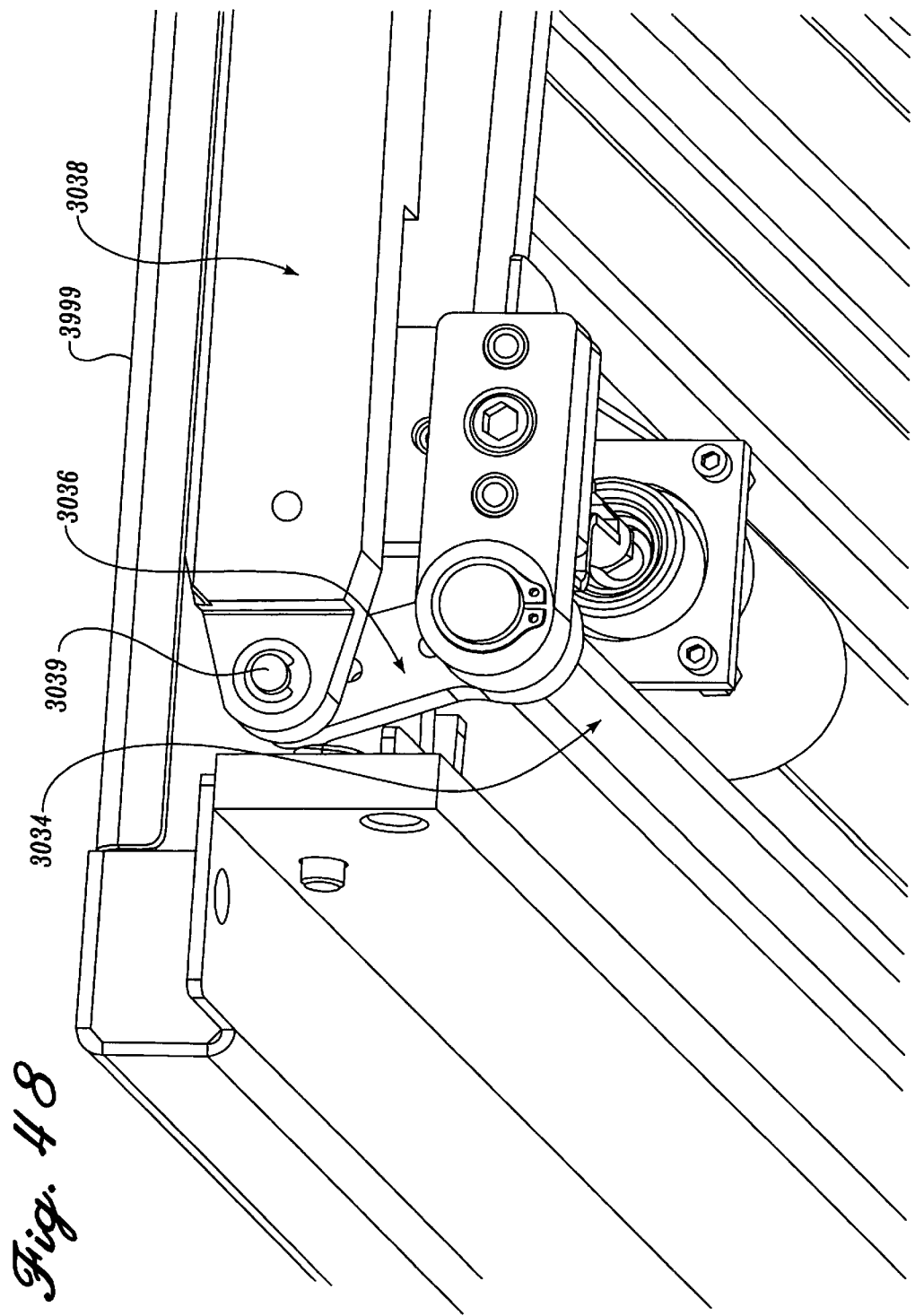
FIG. 48 is a perspective view of a counterbalance assembly for a flip out ramp formed in accordance with one embodiment of the present invention.

The torsion arm 3036 has been moved with the repositioned torsion bar 3034. The torsion arm 3036 is similar to materials and operation to the torsion arm 1122 (FIGS. 22–26) of the first alternate embodiment and the torsion arm 2122 (FIGS. 42–46) of the second alternate embodiment. As best seen in FIG. 48, the linkage and operation of the torsion arm 3036 and the actuating arm 3038 has not changed in this third alternate embodiment. The torsion arm 3036 extends between the torsion bar 3034 and the actuating arm 3038. One end of the torsion arm 3036 is pinned to a corresponding end of the actuating arm 3038 by a well known pin 3039. The other end of the torsion arm 3036 is keyed to an end of the torsion bar 3034.

Figure 49:
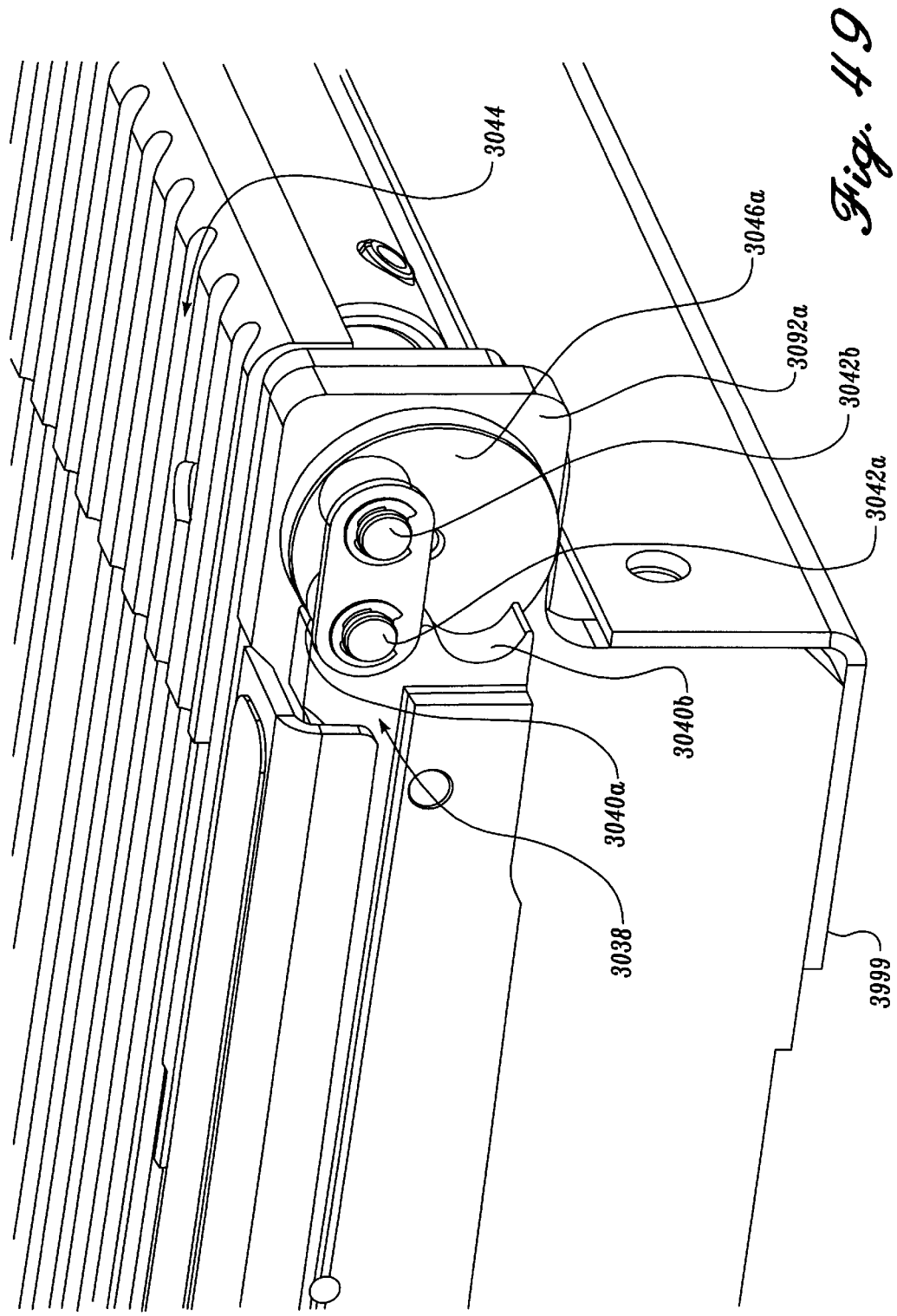
FIG. 49 is a perspective view of a flip out ramp formed in accordance with one embodiment of the present invention and showing a stub shaft.

As best seen in FIG. 49, the free end of the actuating arm 3038 has first and second saddles 3040a and 3040b. First and second bearings 3042a and 3042b are positioned on the end of first stub shaft 3046a and engage saddles 3040a and 3040b in the same general way as described in the previous embodiments. Similar to the previous embodiments described above, rotation of first stub shaft 3046a is keyed to the rotation of the ramp platform 3044, such that when the ramp is rotated through its range of motion, the bearings 3042a and 3042b engage the first and second saddles 3040a and 3040b, stroking the actuating arm 3038 and thereby causing the torsion arm 3036 to rotate and place a load upon the torsion bar 3034. As the end of the torsion bar 3034 is rotated by the torsion arm 3036, the torsion bar 3034 twists to counterbalance the weight of the ramp.

Figure 50:
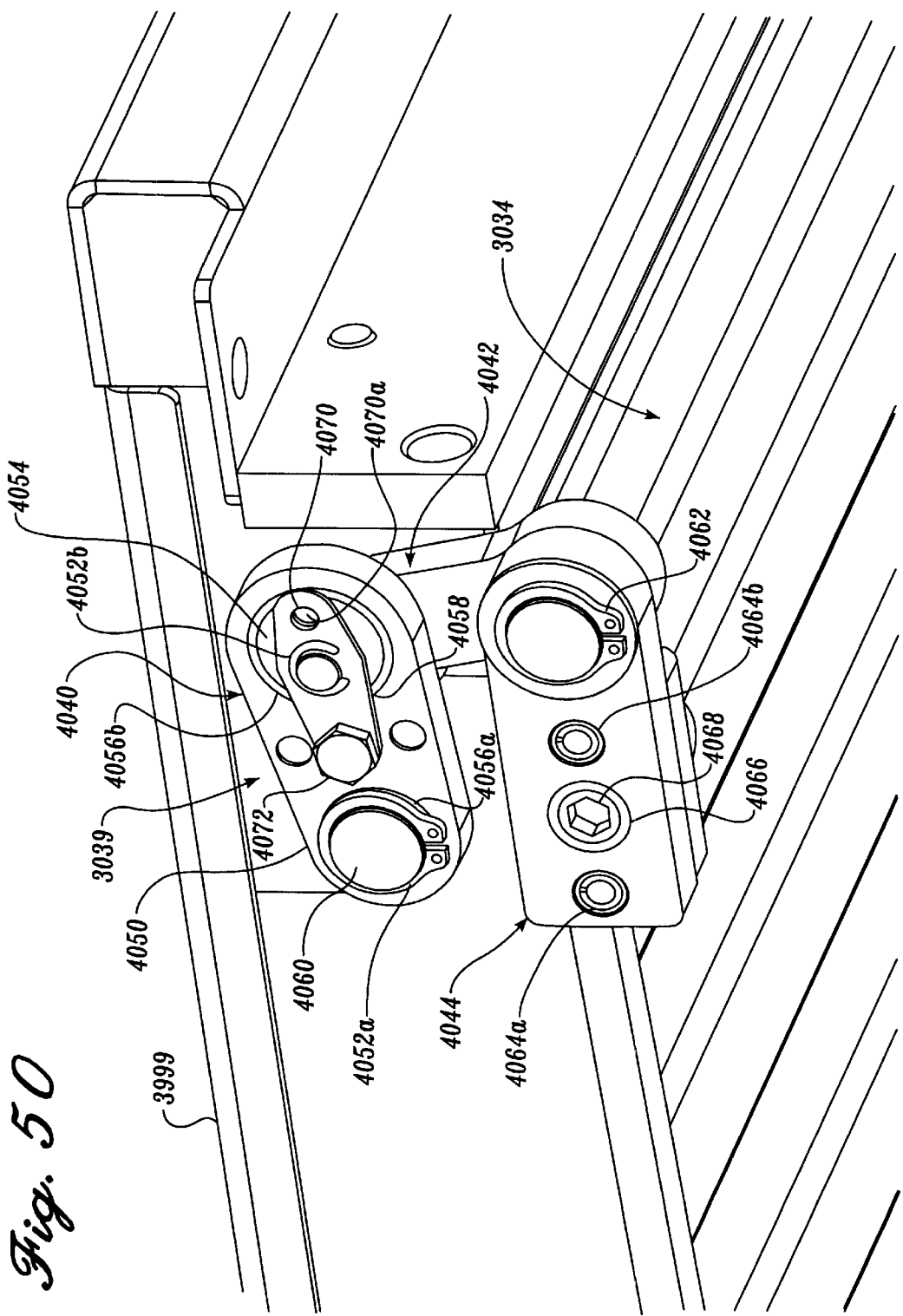
FIG. 50 is a perspective view of a flip out ramp formed in accordance with one embodiment of the present invention and showing an adjustment assembly to selectively preload the counterbalance assembly.

Referring now to FIG. 50, the adjustment assembly 3039 will now be described in greater detail. The adjustment assembly 3039 includes a torsion rod assembly 4040, a torsion lever weldment 4042, and a torsion anchor assembly 4044. The torsion rod assembly 4040 includes an anchor assembly 4050, first and second retaining rings 4052a and 4052b, and an anchor eccentric 4054. The anchor assembly 4050 is a substantially oblong link having a pair of sleeve bearings 4056a and 4056b disposed within opposite ends of the anchor assembly 4050. The torsion rod assembly 4040 is fastened to the frame assembly by a pin 4060 extending through the first sleeve bearing 4056a and fastened thereto by the first retaining ring 4052a.

Rotatably disposed within the second sleeve bearing 4056b is the anchor eccentric 4054. The anchor eccentric 4054 includes a lever arm 4058 fastened to the anchor eccentric 4054 by the second retaining ring 4052b. The anchor eccentric 4054 is attached to one end of the torsion lever weldment 4042. The other end of the torsion lever weldment 4042 is keyed to an end of the torsion bar 3034.

As attached, the torsion bar 3034 extends through the torsion lever weldment 4042. The torsion lever weldment 4042 extends through the torsion anchor assembly 4044 and is seated in one end of the torsion anchor assembly 4044. As seated within the torsion anchor assembly 4044, the torsion bar 3034 is retained therein by a retaining ring 4062. The torsion rod assembly 4040 includes a pair of spring pins 4064a and 4064b and is rigidly fastened to the ramp assembly by a well known lock nut 4066 and hex screw 4068.

To preload the torsion bar 3034, a hex wrench (not shown) is inserted through a bore 4070 located in one end of the lever arm 4058 and into hex bore 4070a of eccentric 4054. The lever arm 4058 and eccentric 4054 are rotated into the position illustrated in FIG. 50. A well known hex head cap screw 4072 is inserted into the other end of the lever arm 4058 and into an internally threaded bore (not shown) located substantially midway between the first and second sleeve bearings 4056a and 4056b of the anchor assembly 4050. To remove the preload from the torsion bar 3034, the hex head cap screw 4072 is removed, and the lever arm 4058 of the anchor eccentric 4054 is rotated substantially 180° from the position illustrated in FIG. 50.

Figure 51:
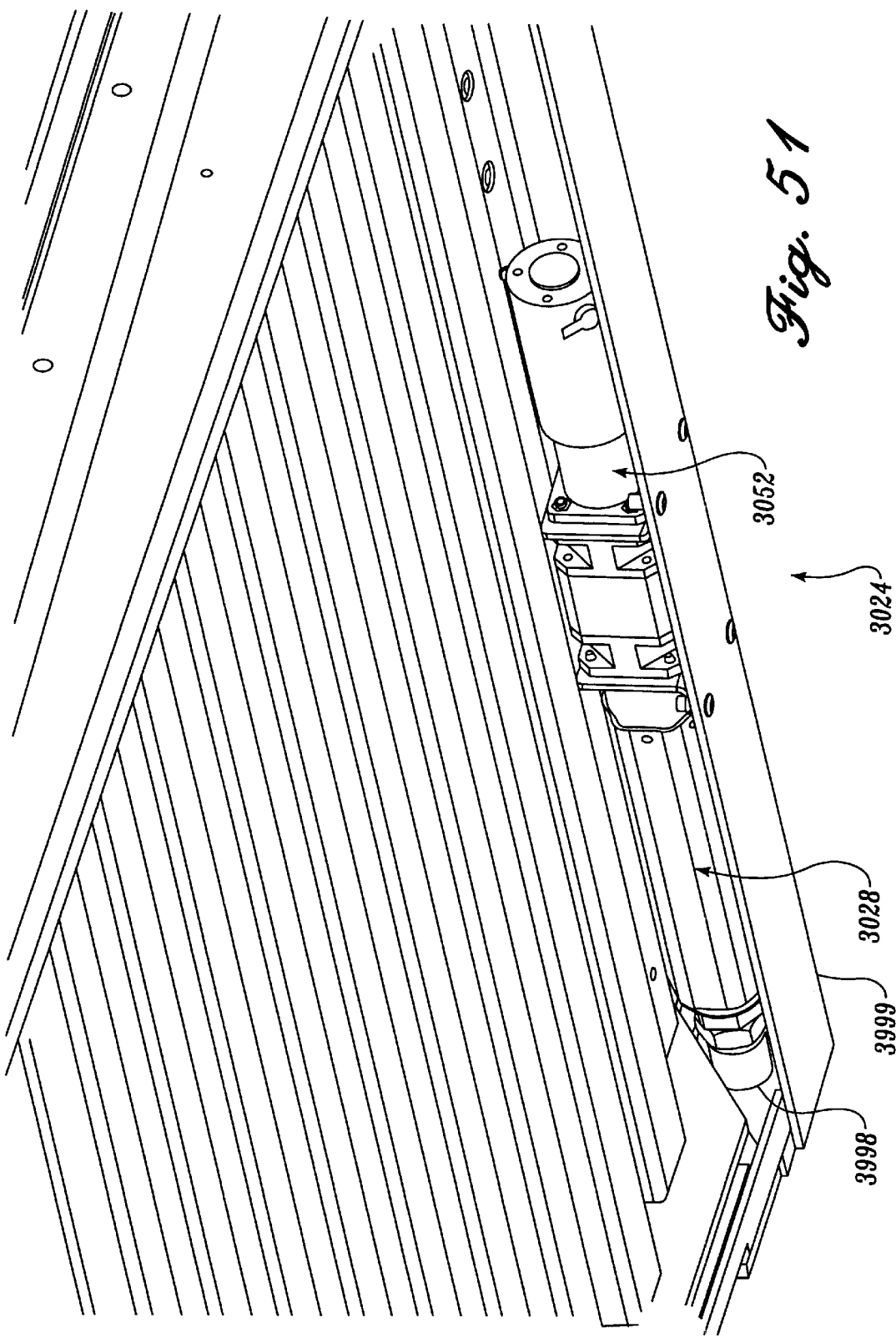
FIG. 51 is a perspective view of a drive assembly for a flip out ramp formed in accordance with the present invention.
Figure 52:
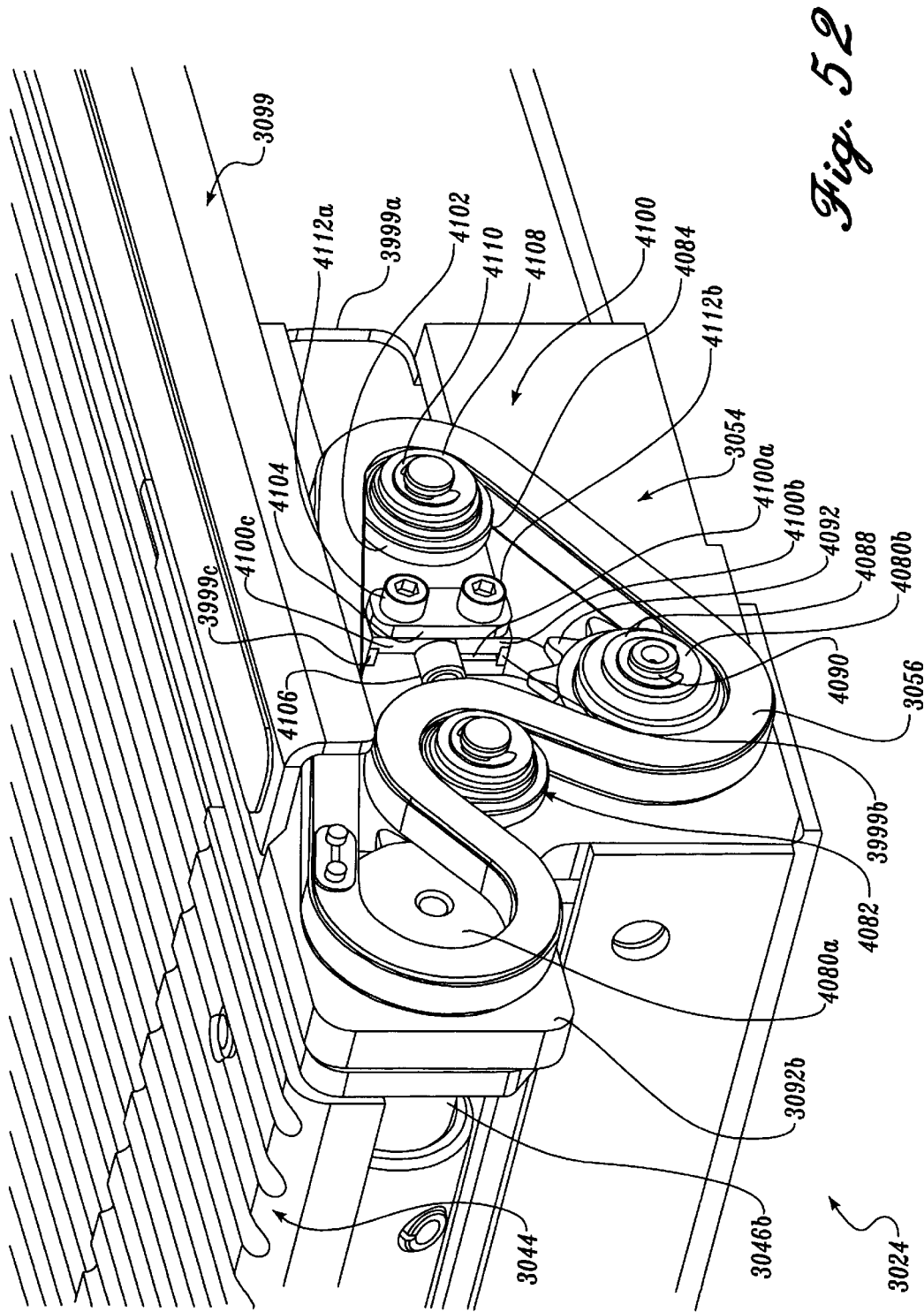
FIG. 52 is a perspective view of an idler and roller assembly for a drive assembly of a flip out ramp formed in accordance with one embodiment of the present invention and showing a chain tension assembly.
Figure 53:
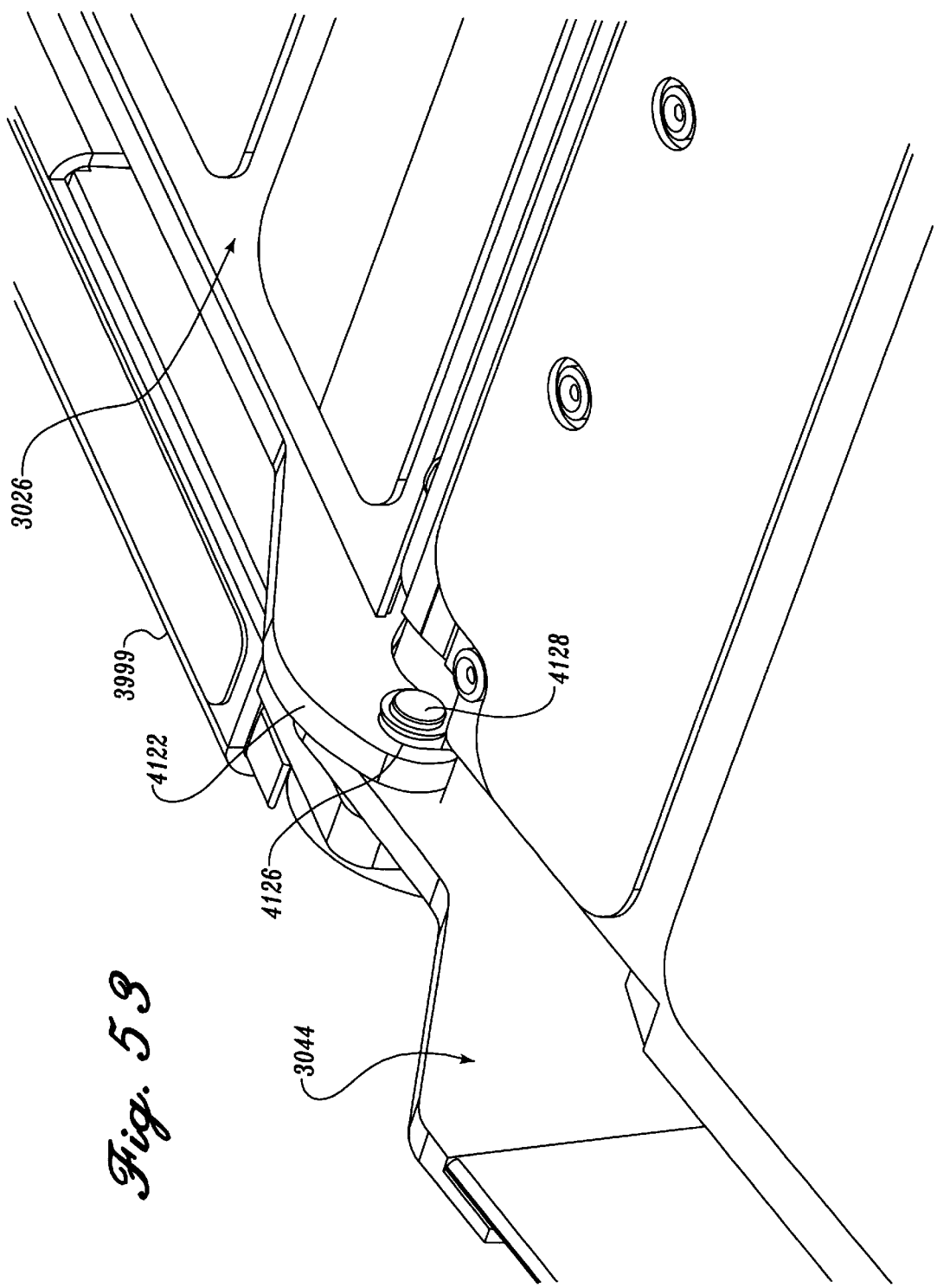
FIG. 53 is a perspective view of an attachment arm for a flip out ramp formed in accordance with one embodiment of the present invention.

Referring now to FIGS. 51 and 52, the drive assembly 3024 will be described in greater detail. The drive assembly 3024 includes a gear motor 3052 and an idler and roller chain assembly 3054. The well-known gear motor 3052 is connected to a clutch 3028 which is connected to the idler and roller chain assembly 3054. The gear motor 3052 is keyed to the rotation of the ramp platform 3044 by way of the idler and roller chain assembly 3054. A suitable gear motor 3052 is model number IM-15, manufactured by Globe Motor.

As best illustrated in FIG. 52, the idler and roller chain assembly 3054 includes first and second sprocket assemblies 4080a and 4080b, an idler assembly 4082, a chain tension assembly 4084, and a drive chain 3056. The first sprocket assembly 4080a is fixed to one end of the second stub shaft 3046b, which is in turn keyed to rotation of the ramp platform 3044. As an alternative, the first sprocket assembly 4080a may be integral with the second stub shaft 3046b. Rotation of the first sprocket 4080a is keyed to the rotation of the second sprocket 4080b by the drive chain 3056.

Figure 57:
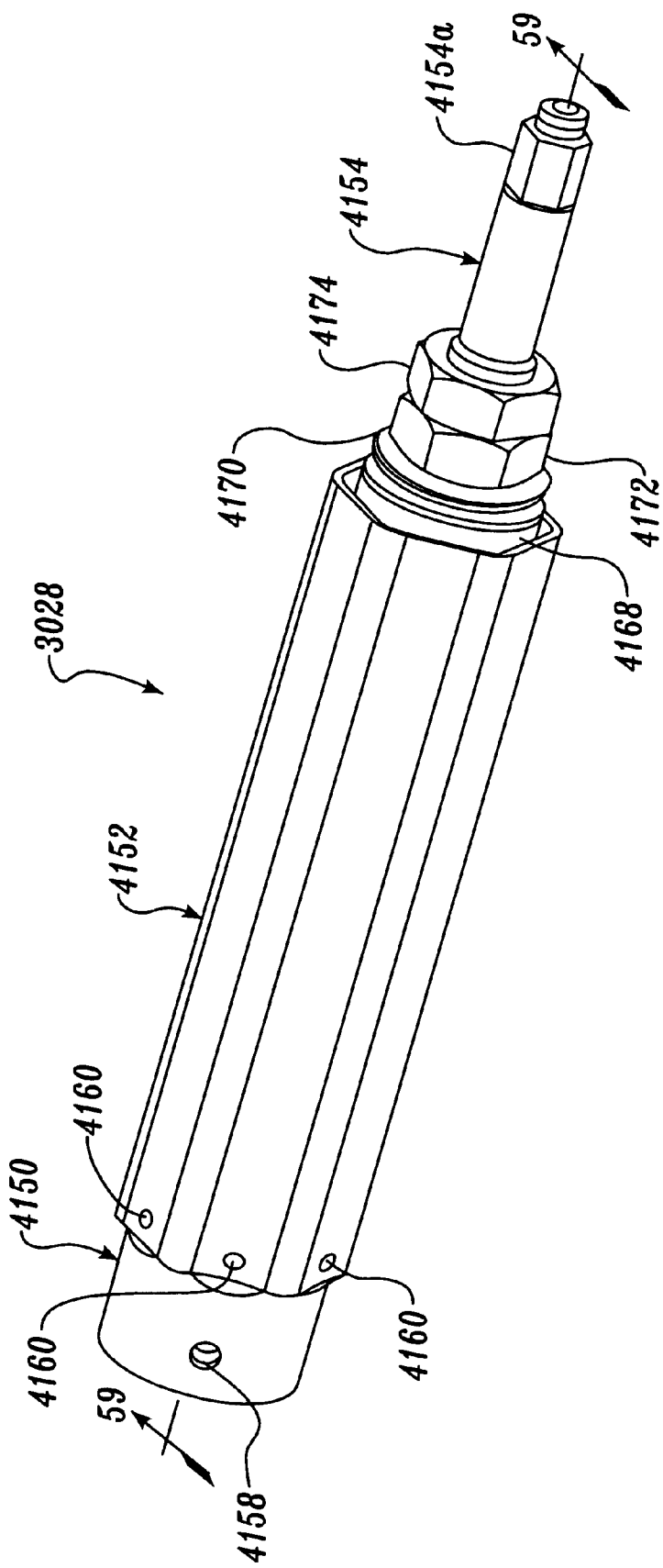
FIG. 57 is a perspective view of a clutch assembly for a flip out ramp formed in accordance with one embodiment of the present invention.

The second sprocket assembly 4080b includes a retainer 4088, a retaining ring 4090, and a sprocket 4092. The second sprocket assembly 4080b is keyed to the clutch shaft 4154 at hex key 4154a (FIG. 57).

Still referring to FIG. 52, the chain tension assembly 4084 will now be described in greater detail. The chain tension assembly includes a chain tension weldment 4100, an idler 4102, a spacer 4104 and a square head set screw 4106. The chain tension weldment 4100 is keyed to the drive chain 3056 and includes a torsion arm retainer 4108 and a retaining ring 4110. A pair of cap screws 4112a and 4112b extend through opposite ends of the spacer 4104 and are operatively coupled to the set screw 4106.

Chain tension weldment 4100 is keyed at 4100b and 4100c and moves slideably on frame 3999 at guides 3999b and 3999c respectively. Guides 3999b and 3999c form opposite sides of slot 3999a. The head of set screw 4106 rests against the end of slot 3999a. Chain tension weldment is also slotted along the axis of set screw 4106 to allow clamping action when capscrews 4112a and 4112b are tightened.

As coupled to the set screw 4106, the tension in the drive chain 3056 may be adjusted to increase or decrease the tension in the drive chain 3056 by unclamping setscrew 4106 by loosening capscrews 4112a and 4112b, turning setscrew 4106 which moves chain tension weldment 4100 and thus idler 4102 along guides 3999b and 3999c, then clamping setscrew 4106 by tightening capscrews 4112a and 4112b.

Referring now to FIGS. 53–56, the rising floor 3026 will now be described in greater detail. The rising floor 3026 is similar in material and operation to the moving floor 26 and 1026 (FIGS. 2 and 15), except that when the ramp assembly is in the deployed position, the rising floor 3026 is made substantially flush to the vehicle floor by way of a cam and roller assembly 3062 (FIG. 54) instead of a pivot and link assembly 46.

The rising floor 3026 includes a floor weldment 4120, attachment arms 4122, and roller assemblies 4124. The floor weldment 4120 is substantially rectangular and forms the outside perimeter frame structure for the rising floor 3026. The attachment arms 4122 are suitably integrally formed with the floor weldment 4120 and project upwardly from the planar area of the rising floor 3026. The free ends of the attachment arms 4122 include a notch 4126 formed in the lower surface of each attachment arm 4122. The notches 4126 are sized to be slidably received on a pin 4128 projecting inwardly from each side of the ramp platform 3044 in an opposing manner. Attachment arms 4122 are similar in material and operation of lugs 60 of the first embodiment.

Figure 54:
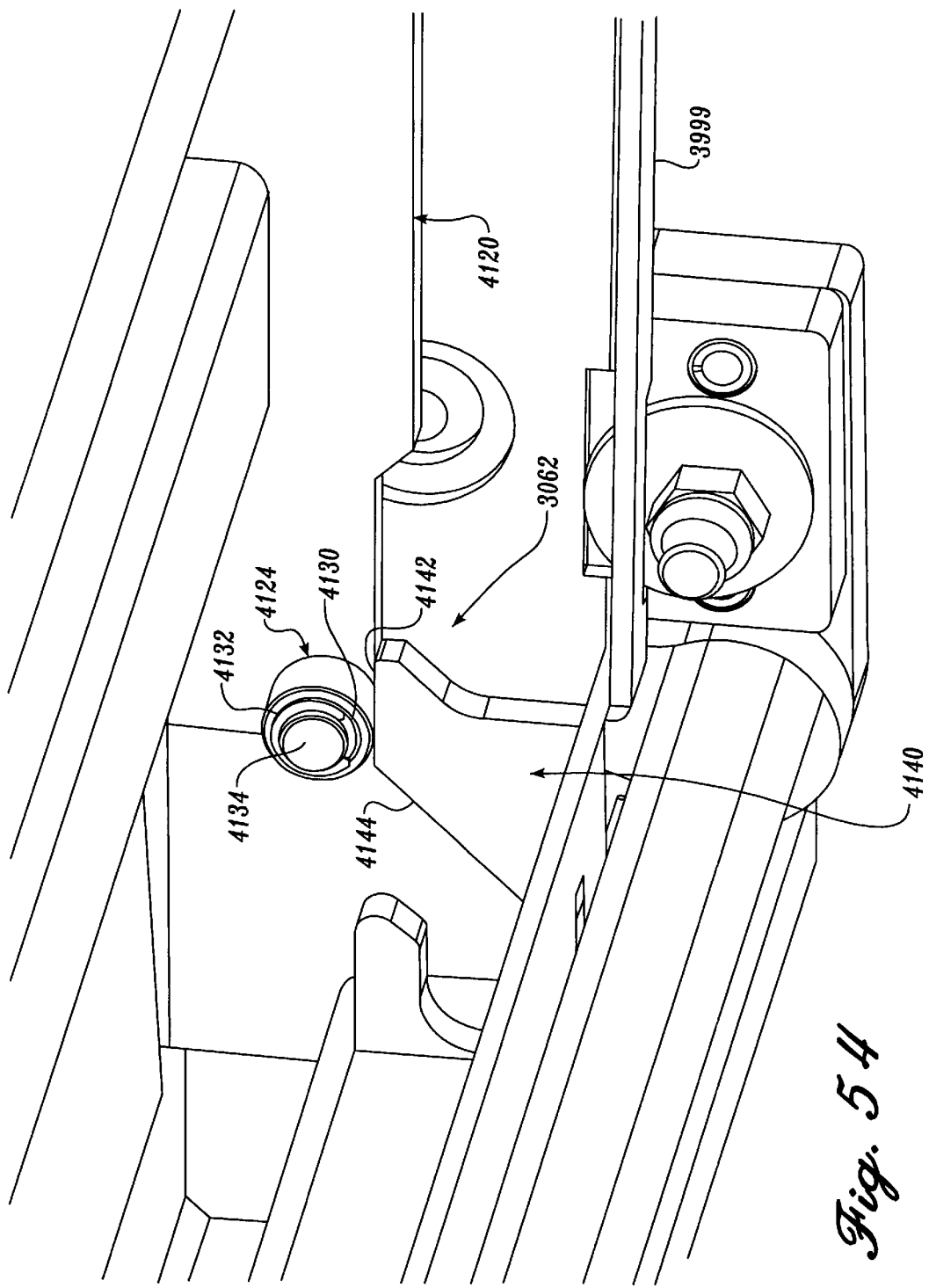
FIG. 54 is a perspective view of a cam and roller assembly for a flip out ramp formed in accordance with one embodiment of the present invention.

As seen best by referring to FIG. 54, the roller assembly 4124 includes a sleeve bearing 4130 and a retaining ring 4132. The roller assembly 4124 is coupled to the interior facing side of the frame weldment 4120 on a pin 4134. The roller assembly 4124 is fastened to the pin 4134 by the retaining ring 4132. As is described in greater detail below, the roller assembly 4124 is adapted to be received within a cam plate 4140. Although a single roller assembly 4124 is illustrated, it should be apparent that a second roller assembly identical to the first roller assembly 4124 is located on the opposite side of the frame weldment 4120, such that a pair of roller assemblies 4124 are located on opposite sides of the frame weldment 4120.

In operation, as the rising floor 3026 strokes with the rotation of the ramp platform 3044, it raises and is maintained at a level substantially flush with the adjacent vehicle floor (not shown), whether the ramp is deployed to a high curb or to ground level. To facilitate removal of the rising floor 3026, the cam plate 4140 is open above the roller and the lugs 4122 on the outboard end, which capture the trunnion pins 4128 on the ramp, are open on the bottom 4126. Therefore, there are no pins or fasteners to remove in order to remove the rising floor from the ramp assembly.

Figure 55:
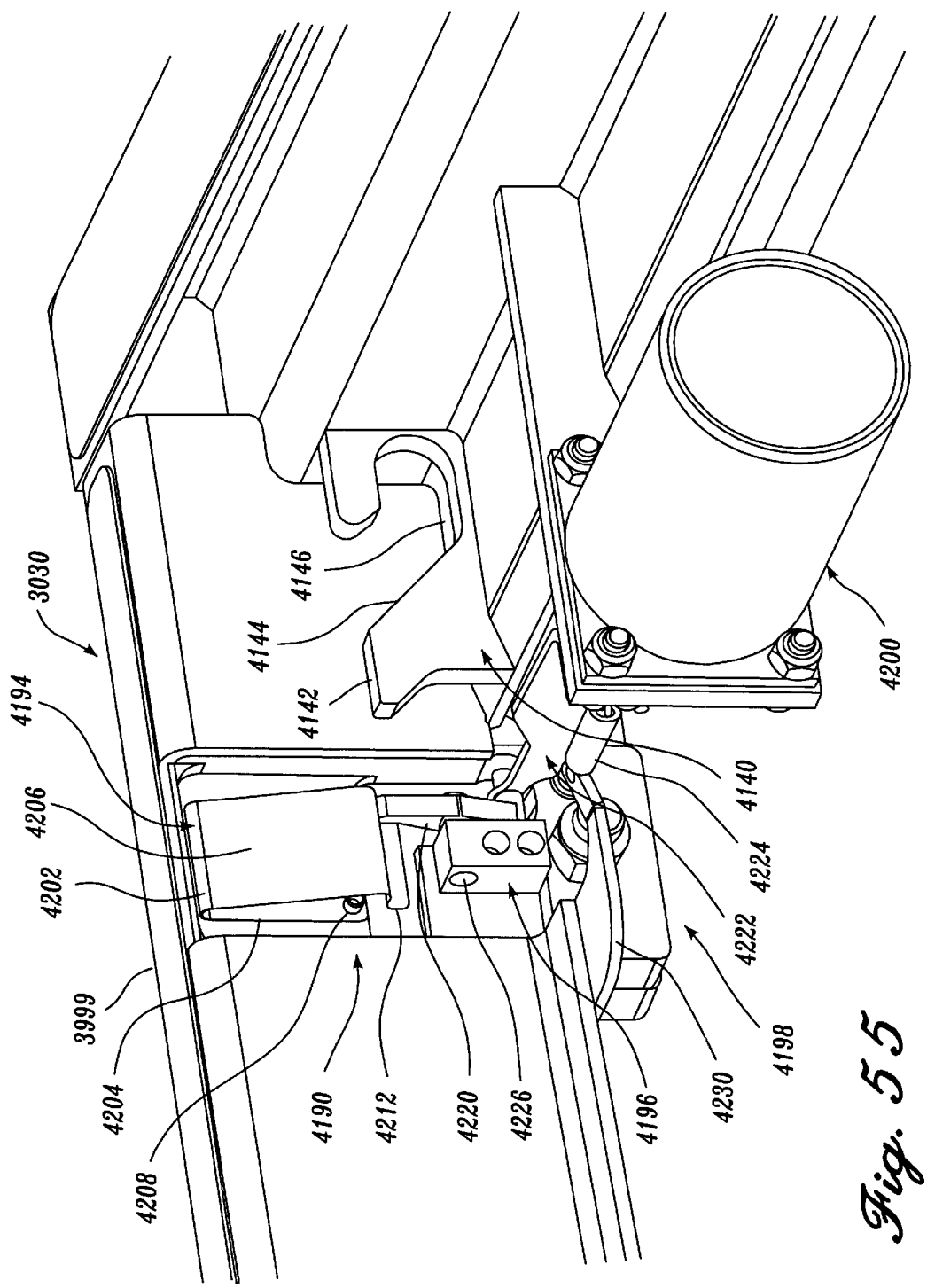
FIG. 55 is a perspective view of a portion of the cam and roller assembly for a flip out ramp formed in accordance with one embodiment of the present invention and showing one embodiment of a stow latch assembly in a locked position.
Figure 56:
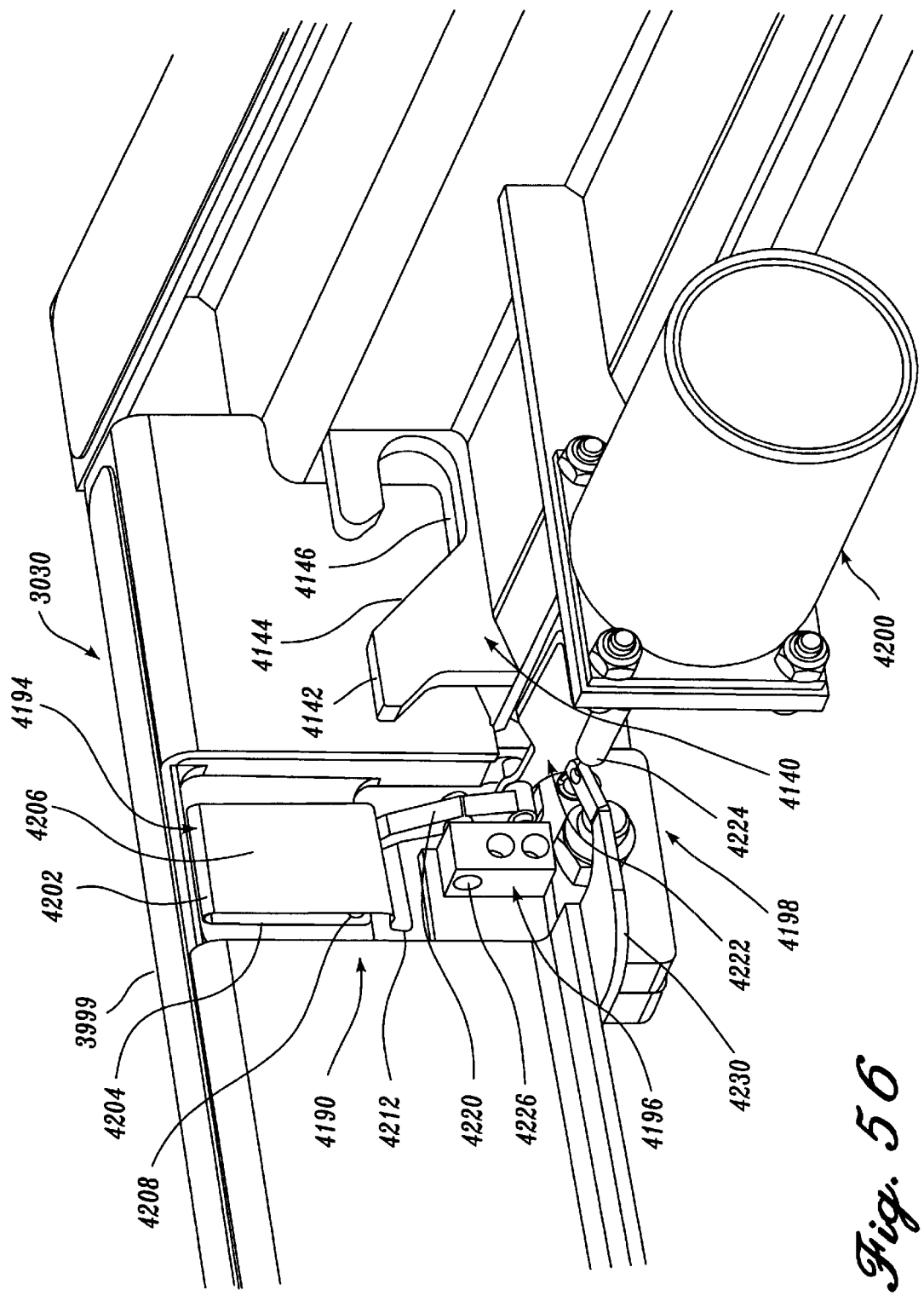
FIG. 56 is a perspective view of a portion of the cam and roller assembly for a flip out ramp formed in accordance with one embodiment of the present invention and showing one embodiment of a stow latch assembly in an unlocked position.

As best seen by referring to FIGS. 54–56, the cam plate 4140 is suitably formed from material, such as steel. The cam plate 4140 is contoured to position the rising floor 3026, such that it is either flush with the vehicle floor when the ramp assembly is in the deployed position or in a nested position when the ramp assembly is in the stowed position. In that regard, the cam plate 4140 includes a raised flat surface 4142, a sloping surface 4144, and a lower flat surface 4146.

As noted above, the roller assembly 4124 is sized to be received within the cam plate 4140, such that when the roller assembly 4124 is positioned on the raised flat surface 4142, the rising floor 3026 is flush with the vehicle floor. When the roller assembly 4124 is seated on the lower flat surface 4146 of the cam plate 4140, the rising floor 3026 is in a position below the vehicle floor, such that the articulating portion of the ramp platform 3044 is disposed on top of the rising floor 3026. As disposed on top of the rising floor 3026, the articulating portion of the ramp platform 3044 is flush with the vehicle floor, thereby providing a level floor within the vehicle. The sloped surface 4144 extends between the raised flat surface 4142 and the lower flat surface 4146 to provide a smooth transition between the deployed and stowed positions.

Figure 58:
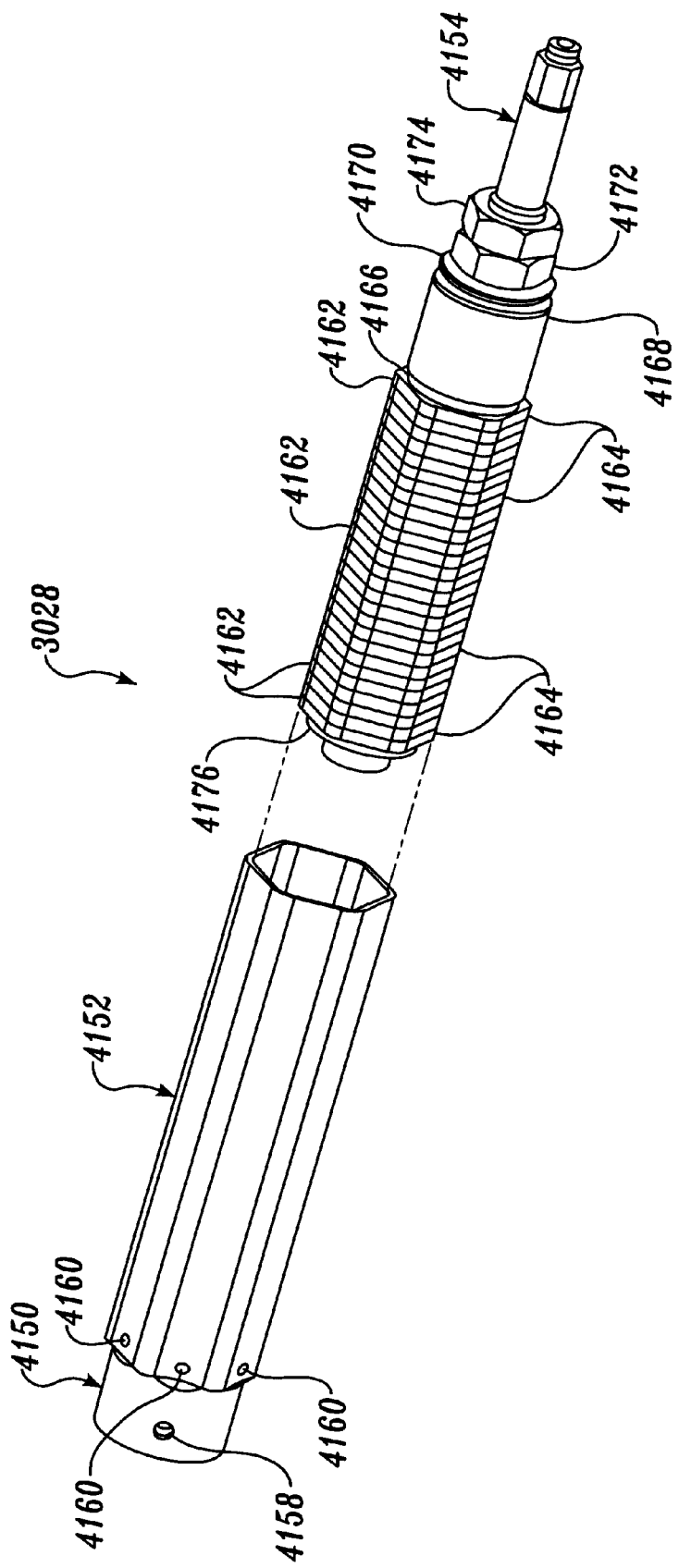
FIG. 58 is an exploded view of a clutch assembly for a flip out ramp formed in accordance with one embodiment of the present invention.
Figure 59:
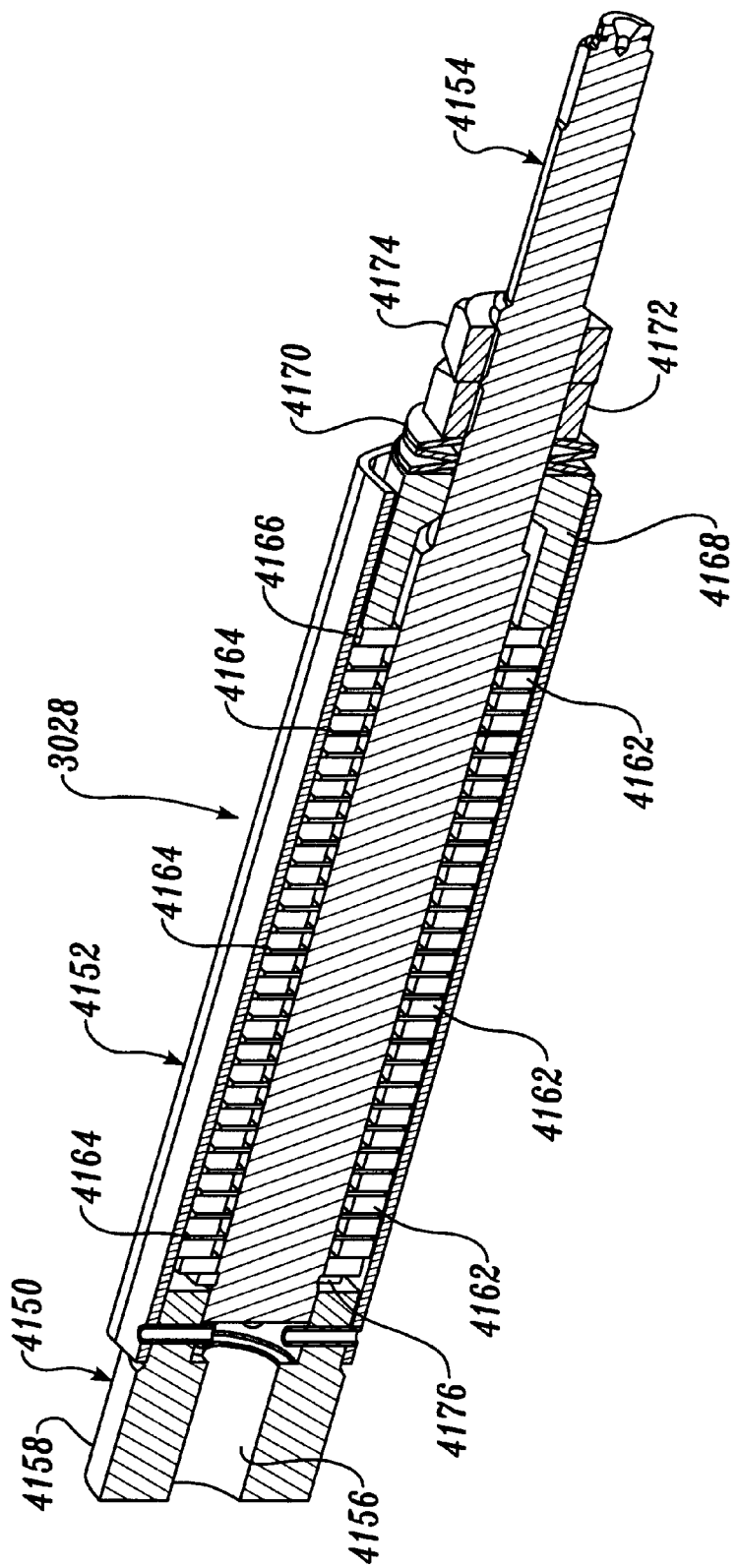
FIG. 59 is a cross-sectional perspective view of a clutch assembly for a flip out ramp formed in accordance with one embodiment of the present invention.
Figure 60:
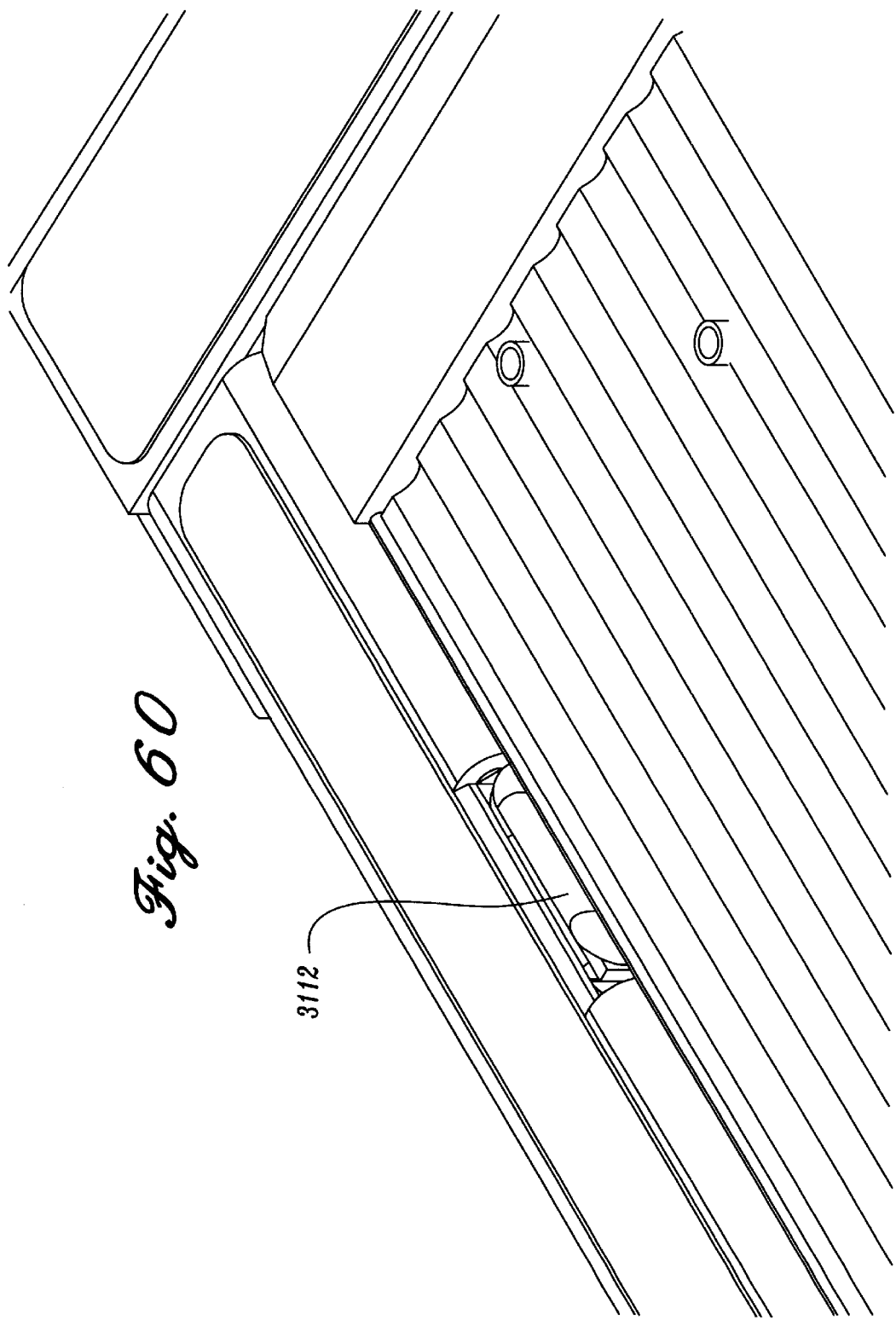
FIG. 60 is a partial perspective view of a handle assembly for a flip out ramp formed in accordance with one embodiment of the present invention and showing the handle assembly in a down position.
Figure 61:
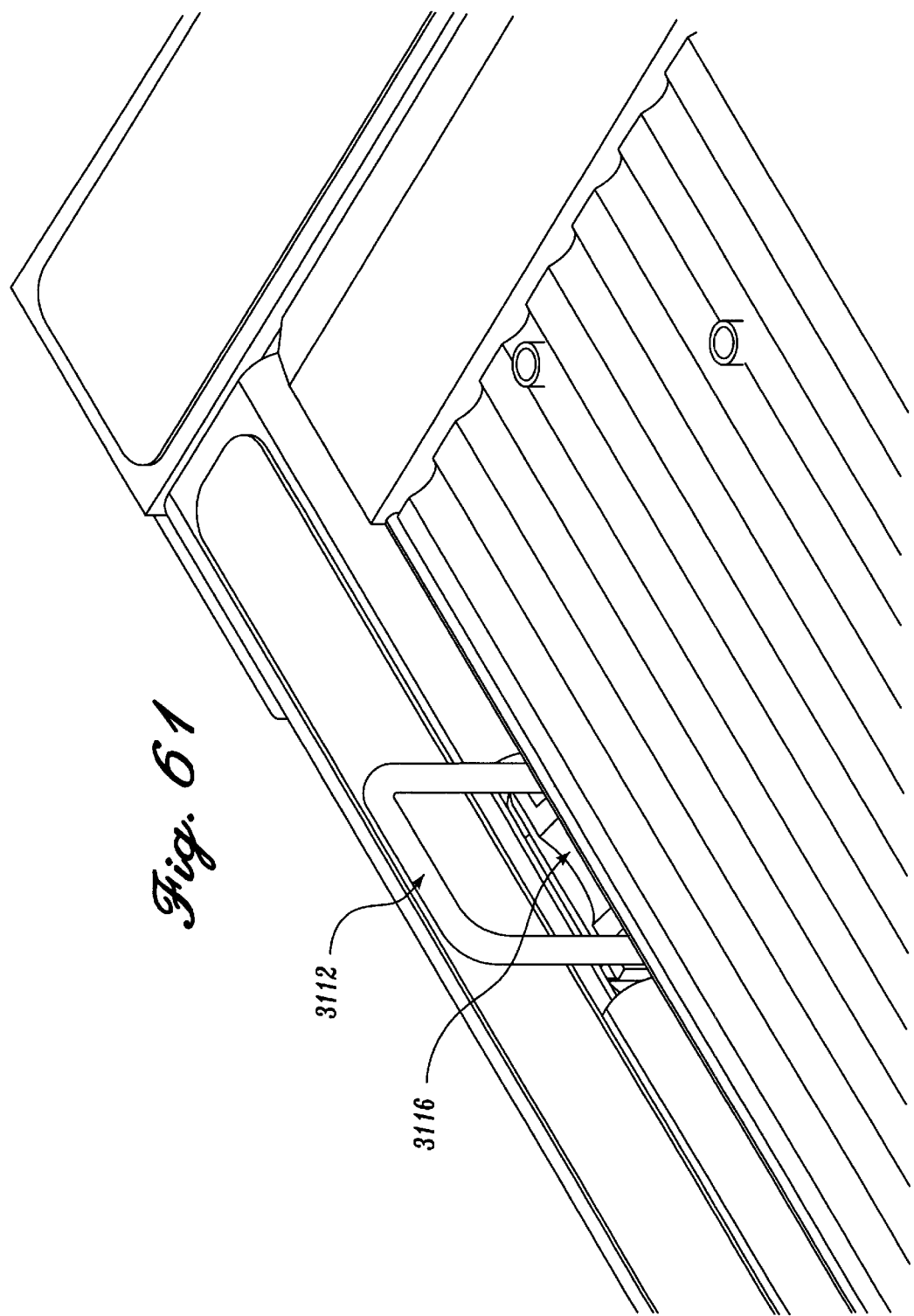
FIG. 61 is a partial perspective view of a handle assembly for a flip out ramp formed in accordance with one embodiment of the present invention and showing the handle assembly in an up position.

Referring now to FIGS. 57–59, the clutch assembly 3028 will now be described in greater detail. The clutch assembly 3028 includes a clutch hub 4150, a clutch housing 4152, and a clutch shaft 4154. The clutch hub 4150 is suitably a cylindrical member having a centrally located bore 4156 extending through the length of the clutch hub 4150. The bore 4156 is sized and adapted to receive the output shaft of the gear motor 3052, and is fastened to the output shaft by well-known fasteners, such as a key and set screw (not shown), extending through fastener holes 4158 located in the clutch hub 4150. The clutch hub 4150 is coupled to the clutch housing 4152 by well-known pins 4160 extending through the clutch housing 4152 and into the clutch hub 4150. As attached to the clutch housing 4152, torque is transferred from the clutch hub 4150 to the clutch housing 4152. Each pinhole of the clutch housing 4152 is sized to receive pins 4160 with sufficient clearance to allow the clutch assembly to center itself.

The clutch housing 4152 is hex shaped in cross-section and is suitably a tubular member sized to slidably receive the clutch shaft 4154 therein. The clutch shaft 4154 includes a plurality of friction disks 4162 and stainless steel shims 4164. The clutch assembly 3028 also includes a spacer 4166, a spring pad 4168, a spring washer 4170, and first and second hex jam nuts 4172 and 4174. The outside diameter of the friction discs 4162 are hex shaped to key with the interior of the clutch housing 4152 and, therefore, rotate with the clutch hub 4150 and the clutch housing 4152. The interior diameter of each shim 4164 is hex-shaped to key with the exterior of the clutch shaft 4154.

A retaining ring 4176 is disposed at one end of the clutch shaft 4154. Alternating friction discs 4162 and shims 4164 are slidably stacked on the clutch shaft 4154. The spacer 4166 is disposed between the spring pad 4168 and the last friction disc 4162. The spring washer 4170 is then slidably disposed on the clutch shaft 4154, and then the first and second hex jam nuts 4172 and 4174 are threadably fastened to the clutch shaft 4154, thereby fastening the structure to the clutch shaft 4154. As an alternative, a suitably sized compression spring may be used in lieu of spring washer 4170. The assembled clutch shaft 4154 is then slidably received within the clutch housing 4152, such that one end of the clutch shaft 4154 is radially seated within the clutch hub 4150. The other end of the clutch shaft 4154 extends outwardly from the clutch housing 4152 and is keyed for a drive sprocket 4092 (see FIG. 52). The other end of the clutch shaft 4154 also extends through frame 3999 at bearing 3998 (see FIG. 51).

Referring now to FIGS. 55, 56, and 60–68, the stow latch assembly 3030 will now be described in greater detail. The stow latch assembly 3030 includes a locking assembly 4190 and a handle assembly 3096. As best seen by referring to FIGS. 55 and 56, the locking assembly 4190 includes a latch plate 4194, a stop block 4196, a linkage assembly 4198, and a solenoid 4200. The latch plate 4194 is formed from a substantially flat rectangular plate of a thin gauge spring steel folded over onto itself, such that a live spring hinge 4202 is formed at the bend in the plate. As formed, the spring hinge 4202 extends between an attachment portion 4204 and a latch portion 4206.

The attachment portion 4204 is fixed to the ramp frame 3999 by well-known fasteners 4208, such as screws or rivets.

The free end of the latch portion 4206 is suitably bent to form a seat 4212. The seat 4212 is adapted to receive a portion of the linkage assembly 4198, as is described in greater detail below.

The stop block 4196 is suitably formed from a material, such as steel, and is a substantially rectangular member fastened to the ramp frame 3999 at a position below the locking assembly 4190. The stop block 4196 is rigidly attached to the ramp frame 3999 by well known fasteners, such as bolts or rivets. The stop block 4196 is adapted to support the ramp platform in the stowed position, wherein the handle block 3116 of handle assembly 3096 bears on stop block 4196 (see FIG. 64). A portion of the linkage assembly 4198 is pivotally attached to the stop block 4196.

Figure 62:
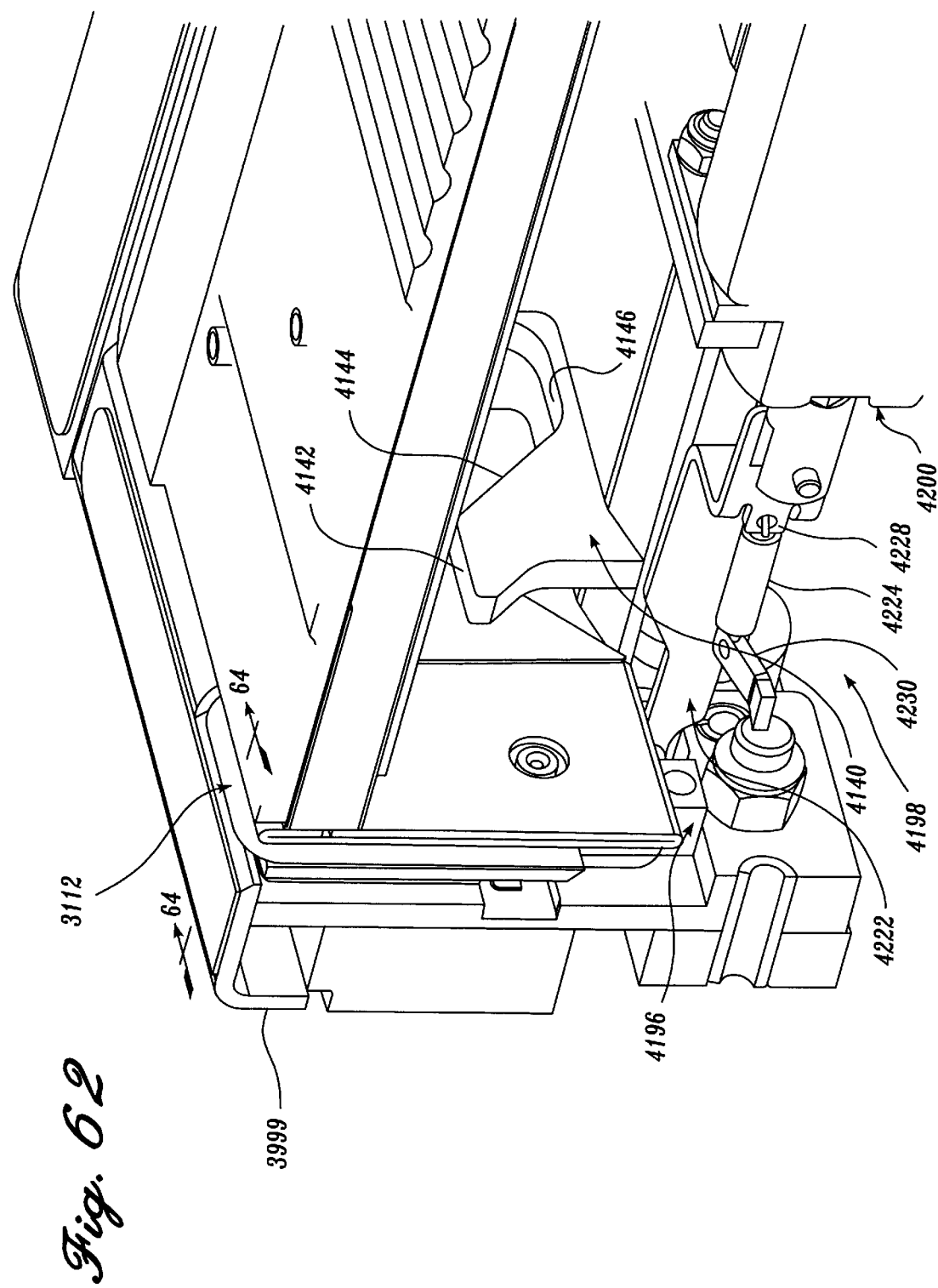
FIG. 62 is a partial perspective cutaway view of a handle assembly and stow latch assembly for a flip out ramp formed in accordance with one embodiment of the present invention.
Figure 63:
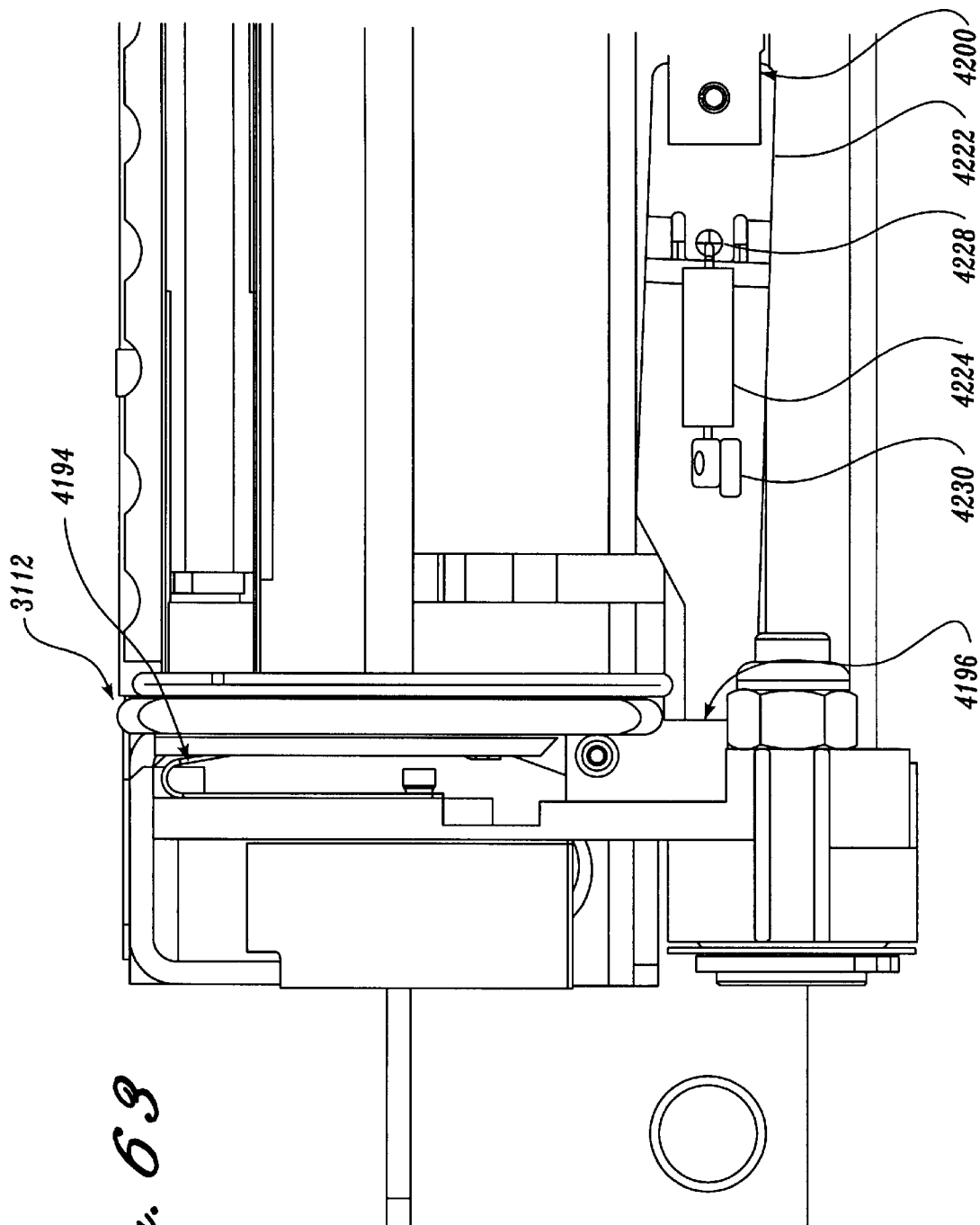
FIG. 63 is a partial side view of a handle assembly and stow latch assembly for a flip out ramp formed in accordance with one embodiment of the present invention.

As may be best seen by referring to FIGS. 55, 56, and 62, the linkage assembly 4198 includes a latch release lever 4220, an actuating link 4222, and a coil spring 4224. The latch release lever 4220 is a substantially rectangular member pivotally attached to the stop block 4196 by a pin 4226 extending laterally through the mid-section of the latch release lever 4220. One end of the latch release lever 4220 is disposed against the seat 4212 of the latch plate 4194. The other end of the latch release lever 4220 is coupled to one end of the actuating link 4222 by a pin (not shown). As attached to the latch release lever 4220, the actuating link 4222 pivots the latch release lever 4220 about the pin 4226 to displace the latch portion 4206 into an unlocked position (FIG. 56), such that the seat 4212 of latch plate 4194 disengages handle block 3116.

The other end of the actuating link 4222 is operatively connected to the solenoid 4200 and the coil spring 4224. As best seen by referring to FIG. 62, the actuating link 4222 is bent at two right angles, such that one end of the actuating link 4222 forms a substantially reverse S-shape. The coil spring 4224 extends between an attachment bore 4228 and an attachment arm 4230. The attachment arm 4230 is rigidly attached to the ramp frame 3999 in a manner well known in the art. As attached, the coil spring 4224 biases the stow latch assembly 3030 into the locked position, as seen best by referring to FIG. 55.

Figure 67:
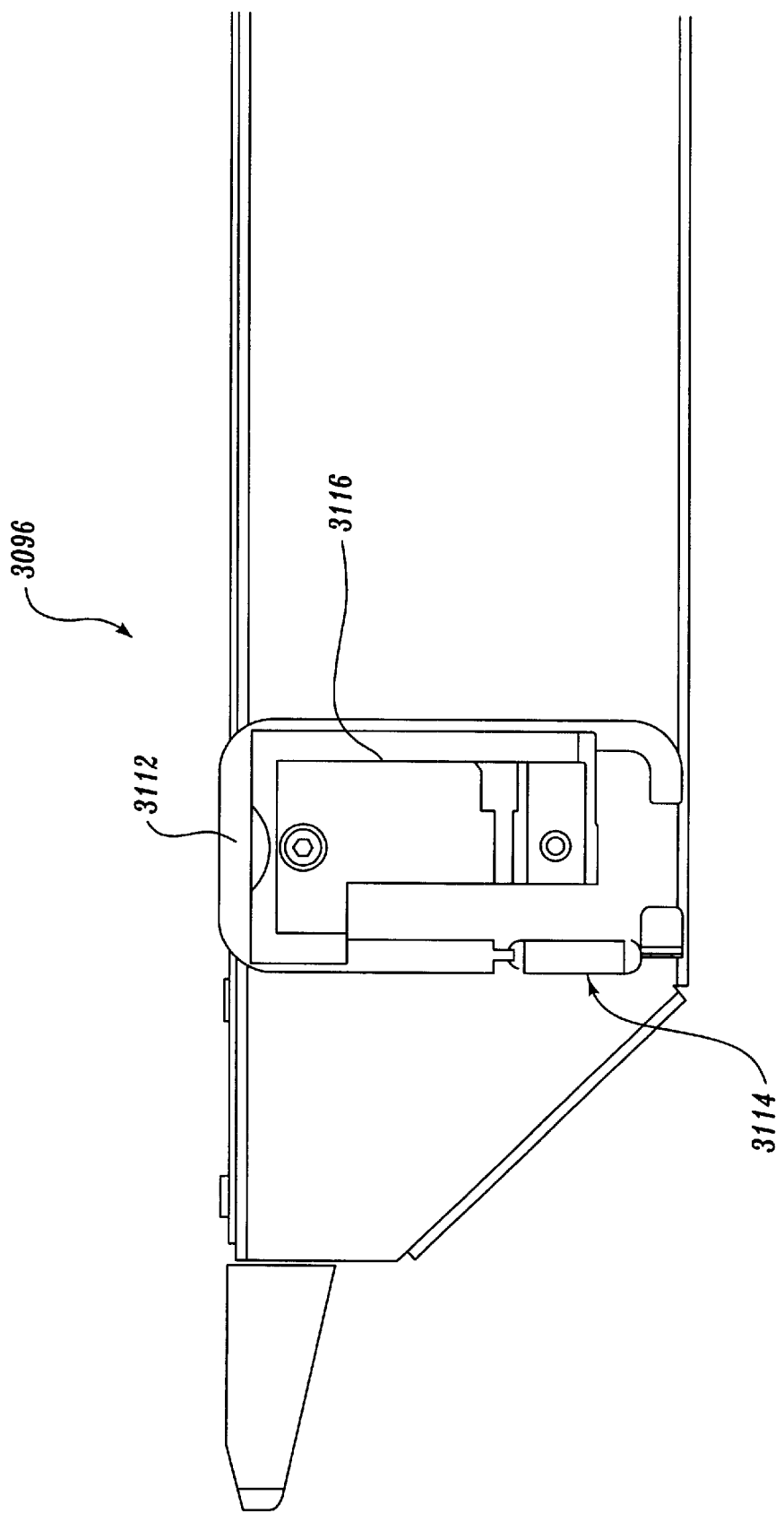
FIG. 67 is a partial cross-sectional view of a handle assembly for a flip out ramp formed in accordance with one embodiment of the present invention.
Figure 68:
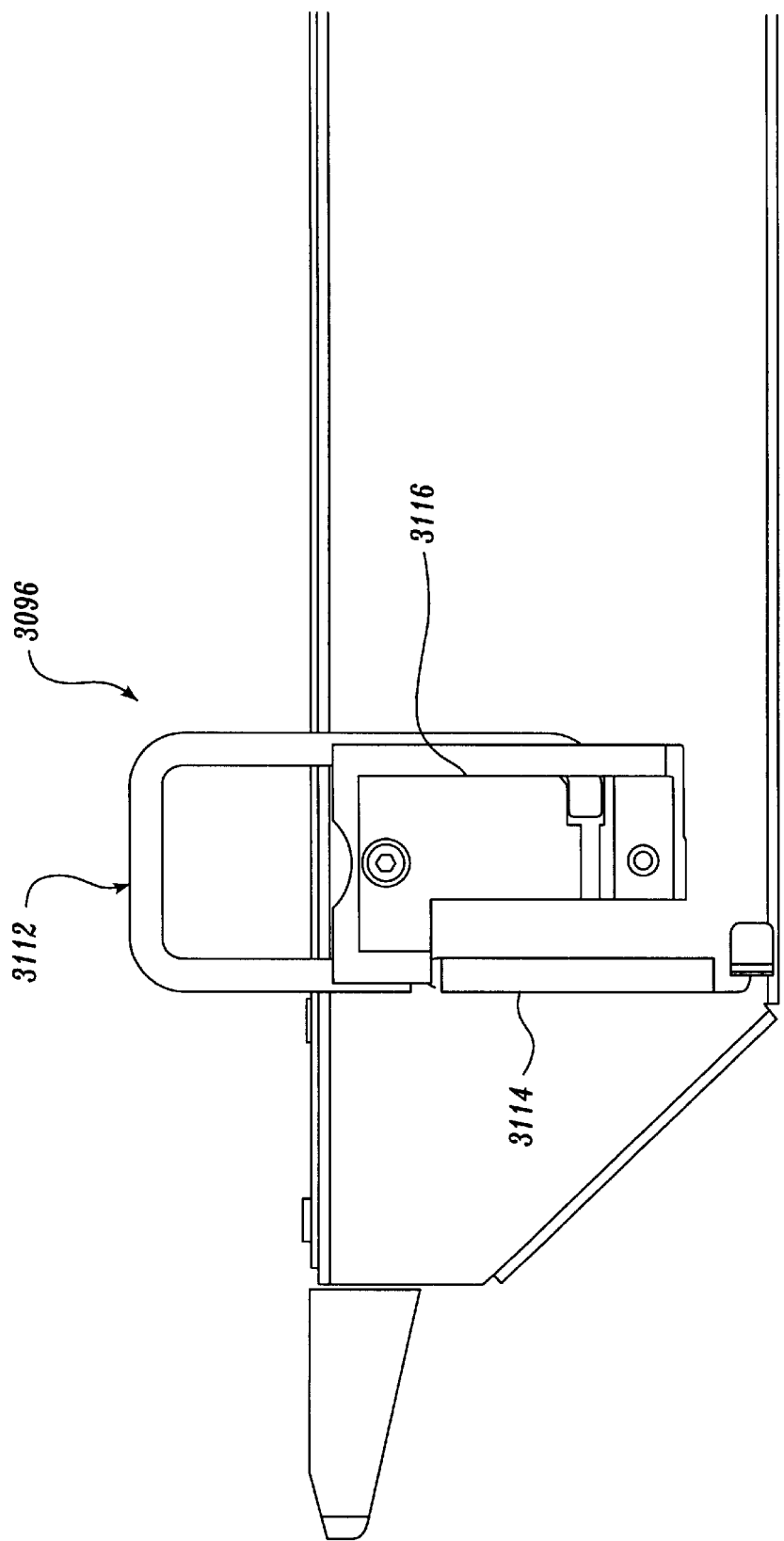
FIG. 68 is a partial cross-sectional view of a handle assembly for a flip out ramp formed in accordance with one embodiment of the present invention and showing the handle assembly in an up position.

Referring now to FIGS. 67 and 68, the handle assembly 3096 will now be described in greater detail. Attached to the outboard side of the ramp platform 3044, the handle assembly 3096 includes a pull handle 3112, handle bias spring 3114, and a handle block 3116.

Figure 64:
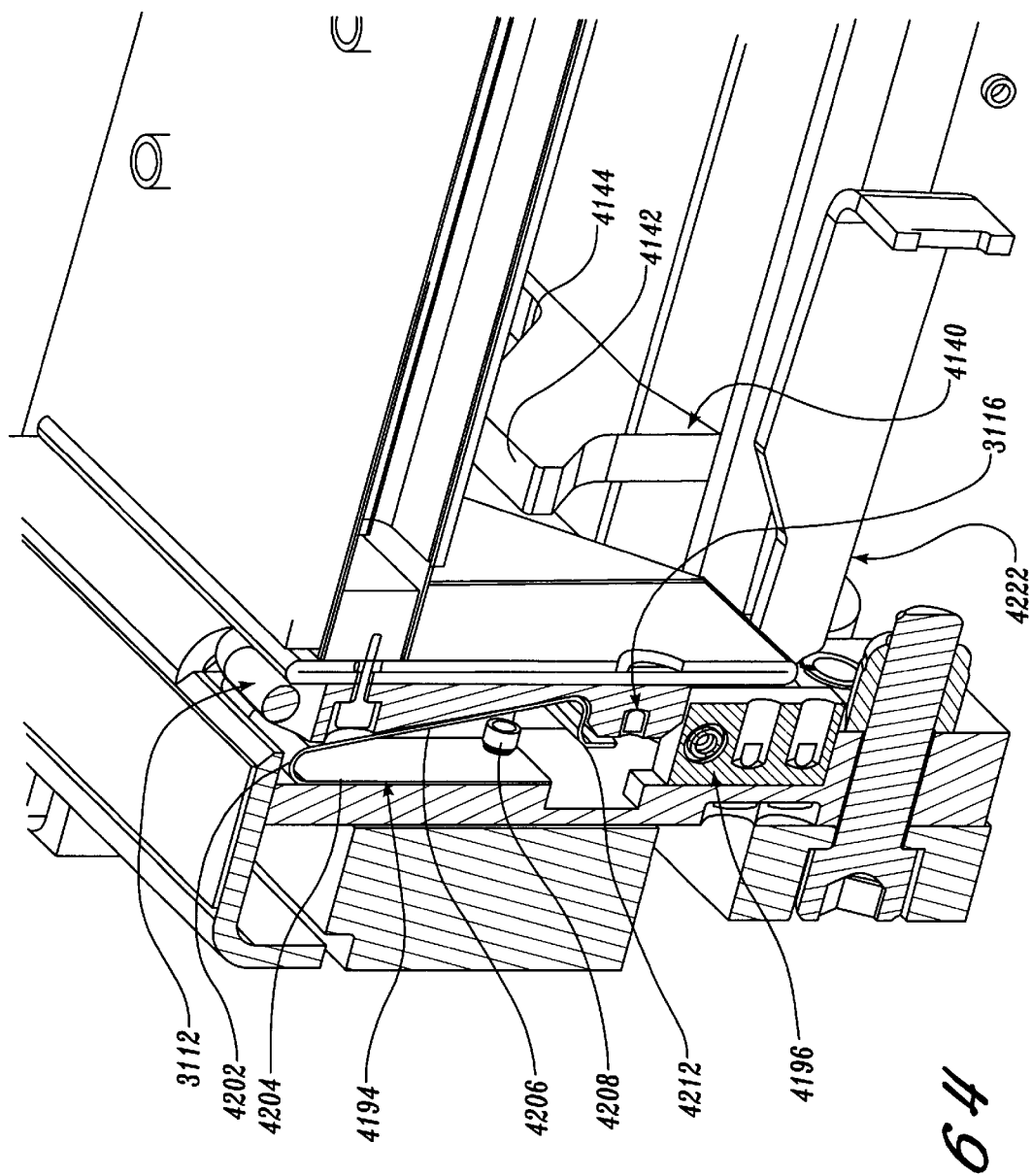
FIG. 64 is a partial cross-sectional perspective view of a stow latch assembly for a flip out ramp formed in accordance with one embodiment of the present invention.
Figure 65:
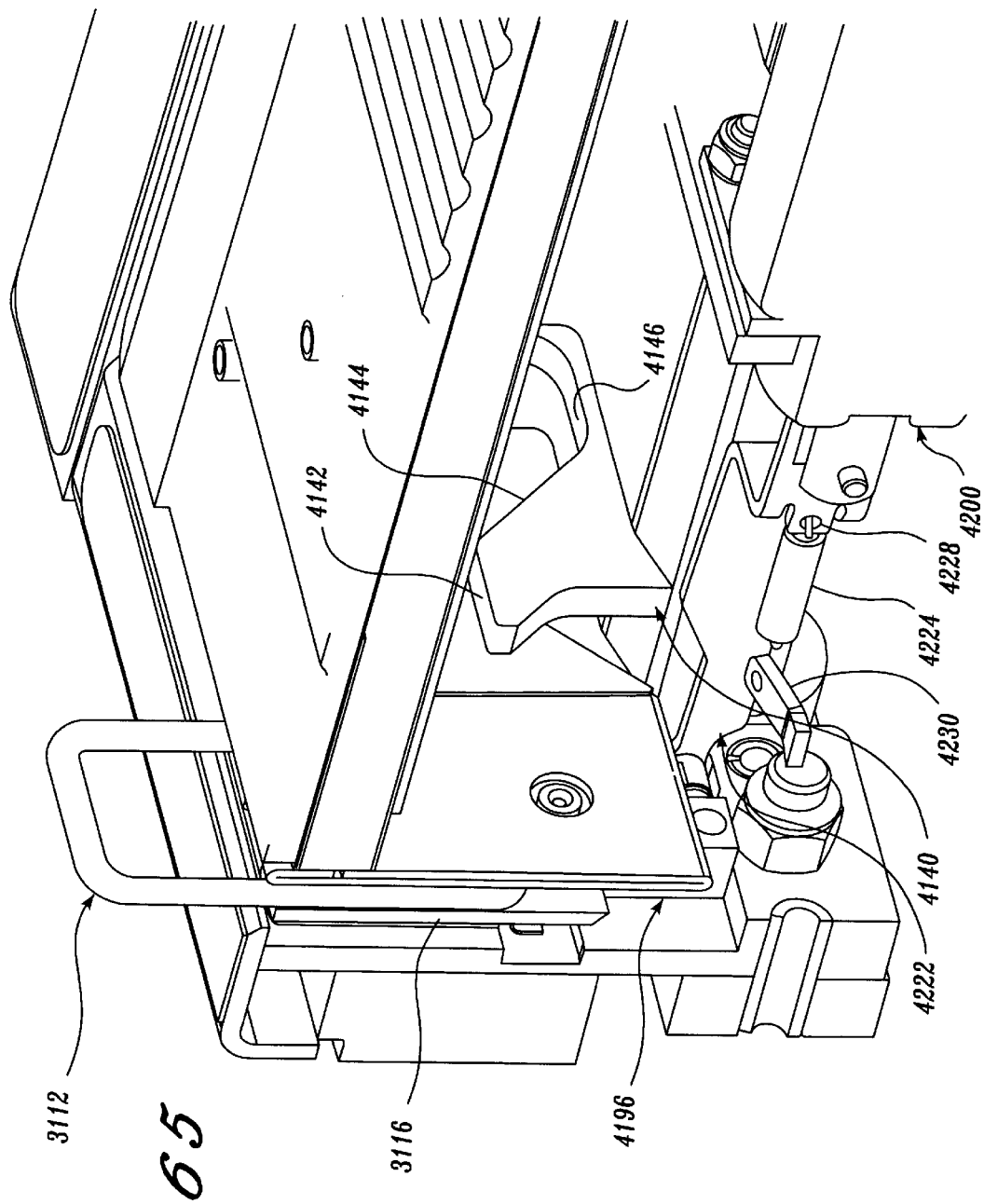
FIG. 65 is a partial perspective view of a handle assembly and stow latch assembly for a flip out ramp formed in accordance with one embodiment of the present invention and showing the handle assembly in an up position.
Figure 66:
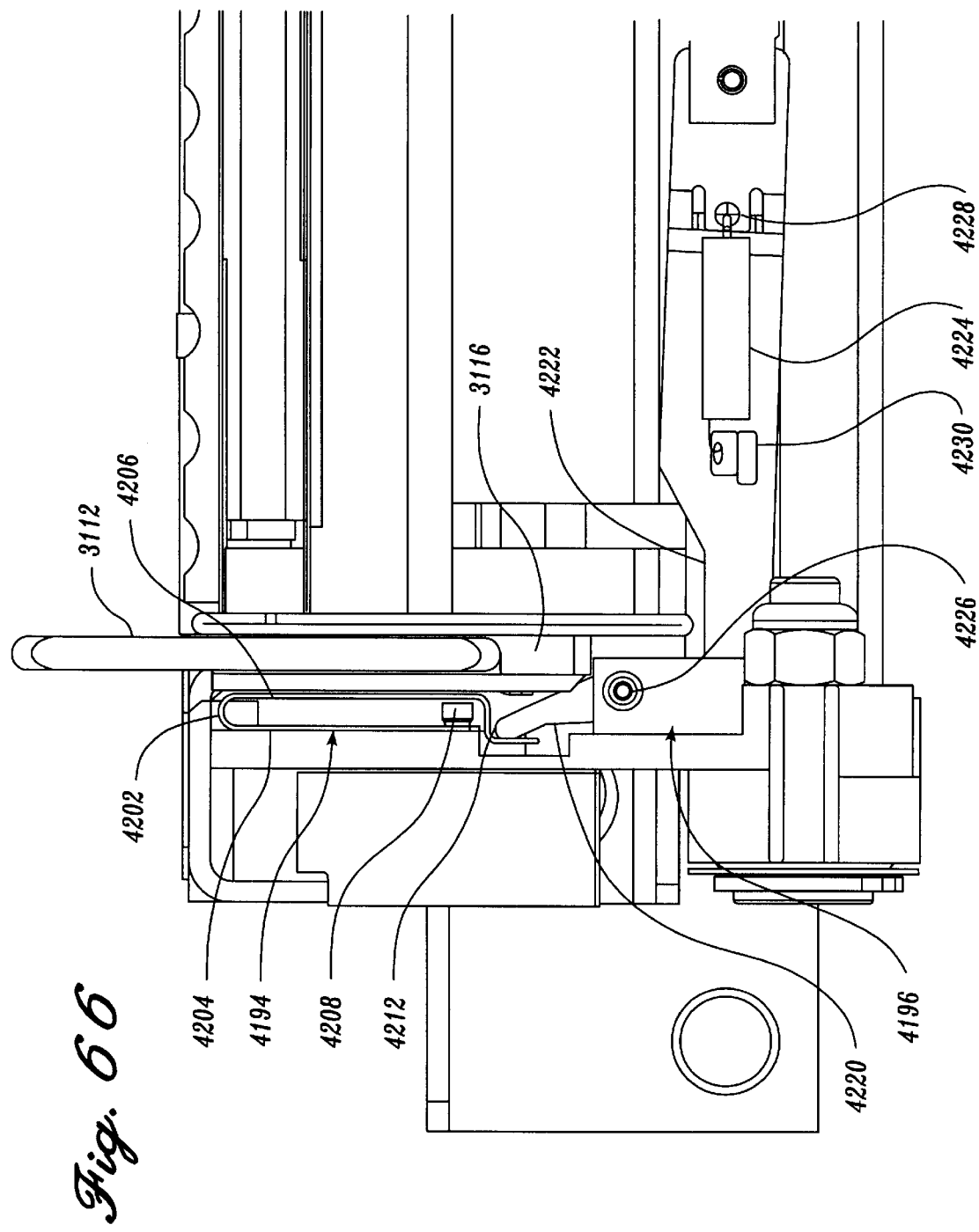
FIG. 66 is a side planar view showing a handle assembly and stow latch assembly for a flip out ramp formed in accordance with one embodiment of the present invention and showing the handle assembly in an up position.

The operation of the stow latch assembly 3030 is best seen in FIG. 64 where the latch plate 4194 engages the handle block 3116 when the ramp platform 3044 is in the stowed position. During normal powered operations, when deploy is selected, the solenoid 4200 actuates the latch release lever 4220 which in turn causes the latch plate 4194 to disengage the handle block 3116 (FIG. 66). When deploying the ramp manually from the stowed position, the operator lifts the pull handle 3112, which disengages the latch plate 4194 from the handle block 3116, enabling the operator to simply lift up the ramp platform 3044.

Although the preferred embodiments of the present invention have been described above, it should be apparent that changes may be made thereto and still be within the scope of the present invention. As a nonlimiting example, the cam pins may be integrally formed with the rear stub shaft. Further, a manually operated flip-out ramp is also within the scope of the present invention. In this regard, such a flip-out ramp may be manufactured without the drive assembly and, therefore, manually reciprocated between stowed and deployed positions. As another non-limiting example, the reciprocating mechanism could independently drive the ramp and the raising floor.

The embodiments of the invention in which an exclusive property or privilege is claimed are defined as follows:

1. A wheelchair ramp assembly, comprising;
   (a) a frame attachable to a vehicle having a floor;
   (b) a platform coupled to a portion of the frame;
   (c) a ramp coupled to at least one of the platform or the frame and having a weight; and
   (d) a reciprocating mechanism disposed between the ramp and platform for reciprocating the ramp between a deployed position, an intermediate position, and a stowed position in response to a force, the reciprocating mechanism counterbalancing the weight of the ramp during actuation of the ramp between the deployed and stowed positions to reduce the force required to reciprocate the ramp between the deployed and stowed positions, wherein at least a portion of the reciprocating mechanism reciprocates between a first direction when the ramp is moved from the stowed to the intermediate position and a second direction when the ramp is moved from the intermediate to the deployed position.

2. The wheelchair ramp assembly of claim 1, wherein the reciprocating mechanism includes a torsion assembly having a rotating end and a fixed end.

3. The wheelchair ramp assembly of claim 2, wherein the torsion assembly includes a torsion rod extending between the fixed and rotating ends of the torsion assembly, such that when the ramp is reciprocated between the deployed and stowed position, the weight of the ramp causes the torsion rod to twist about the fixed end to resist the weight of the ramp.

4. The wheelchair ramp assembly of claim 3, wherein the reciprocating mechanism further comprises an actuating arm rotatably attached to the torsion assembly and first and second bearing surfaces cooperatively coupled to the ramp, wherein the first and second bearing surfaces move in a predetermined path as the ramp reciprocates between the deployed and stowed positions to contact a portion of the actuating arm and cause the torsion rod to twist.

5. The wheelchair ramp assembly of claim 4, wherein one end of the actuating arm includes a cammed surface, wherein the cammed surface is positioned for engagement with at least one of the bearing surfaces, such that as the ramp is reciprocated between the deployed and stowed positions, at least one of the bearing surfaces engages a portion of the cammed surface, thereby twisting the torsion rod to counterbalance the weight of the ramp.

6. The wheelchair ramp assembly of claim 5, further comprising a preload assembly coupled to the torsion assembly, the preload assembly twists the torsion rod from a neutral position to assist in reciprocating the ramp between the deployed and stowed positions.

7. The wheelchair ramp assembly of claim 3, further comprising a preload assembly coupled to the torsion assembly, the preload assembly twists the torsion rod from a neutral position to assist in reciprocating the ramp between the deployed and stowed positions.

8. The wheelchair ramp assembly of claim 1, wherein the platform is coupled to the frame by a lifting assembly to reciprocably lift the platform into and out of a position substantially flush with the floor of the vehicle when the ramp is reciprocated between the deployed and stowed positions.

9. The wheelchair ramp assembly of claim 8, wherein the lifting assembly comprises a cam attached to a portion of the wheelchair ramp assembly and a cam follower fastened to at least one of the frame or the platform.

10. The wheelchair ramp assembly of claim 8, wherein the lifting assembly is a pivot link assembly extending between the wheelchair assembly and the platform to at least lift the platform into a position flush with the floor of the vehicle.

11. The wheelchair ramp assembly of claim 1, wherein the first direction is opposite the second direction.

12. The wheelchair ramp assembly of claim 1, wherein the ramp is in a substantially vertical orientation when the ramp is in the intermediate position.

13. A wheelchair ramp assembly, comprising:
   (a) a frame attachable to a vehicle having a floor;
   (b) a platform coupled to a portion of the frame;
   (c) a ramp coupled to at least one of the platform or the frame and having a lower surface and a weight;
   (d) a reciprocating mechanism disposed between the ramp and platform for reciprocating the ramp between a deployed position and a stowed position in response to a force, wherein at least a portion of the reciprocating mechanism reciprocates between a first direction when the ramp is moved from the stowed to an intermediate position and a second direction when the ramp is moved from the intermediate to the deployed position; and
   (e) a lifting assembly disposed between the platform and the frame to reciprocably displace the platform into and out of a position substantially flush with the floor as the ramp is reciprocated between the deployed and stowed positions.

14. The wheelchair ramp assembly of claim 13, further comprising a counterbalance assembly attached to the ramp to counterbalance the weight of the ramp during actuation of the ramp between the deployed and stowed positions, thereby reducing the force required to reciprocate the ramp between the deployed and stowed positions.

15. The wheelchair ramp assembly of claim 14, further comprising a preload assembly coupled to the counterbalance assembly, the preload assembly adapted to selectively apply a load to the counterbalance assembly to assist in reciprocating the ramp between the deployed and stowed positions.

16. The wheelchair ramp assembly of claim 13, wherein when the ramp is in the stowed position, the platform is displaced into a predetermined position below the floor by the lifting assembly and the lower surface of the ramp is substantially flush with the floor.

17. The wheelchair ramp assembly of claim 13, wherein the first direction is opposite the second direction.

18. The wheelchair ramp assembly of claim 13, wherein the ramp is in a substantially vertical orientation when the ramp is in the intermediate position.

19. A wheelchair ramp assembly, comprising:
(a) a frame attachable to a vehicle having a floor;
(b) a platform coupled to a portion of the frame;
(c) a ramp reciprocably coupled to at least one of the frame or the platform and having a weight;
(d) an energy storage apparatus coupled to the ramp for counterbalancing the weight of the ramp during reciprocation of the ramp between a deployed position, an intermediate position, and a stowed position, wherein at least a portion of the energy storage apparatus reciprocates between a first direction when the ramp is moved from the stowed to the intermediate position and a second direction when the ramp is moved from the intermediate to the deployed position; and
(e) a lifting assembly disposed between the platform and the frame to reciprocably displace the platform into and out of a position substantially flush with the floor as the ramp is reciprocated between the deployed and stowed positions.

20. The wheelchair ramp assembly of claim 19, wherein the energy storage apparatus includes a torsion assembly having a torsion rod extending between a rotating end and a fixed end of the torsion assembly.

21. The wheelchair ramp assembly of claim 20, further comprising a preload assembly coupled to the torsion assembly, the preload assembly adapted to selectively apply a load to the torsion assembly to assist in reciprocating the ramp between the deployed and stowed positions.

22. The wheelchair ramp assembly of claim 19, wherein the first direction is opposite the second direction.

23. The wheelchair ramp assembly of claim 19, wherein the ramp is in a substantially vertical orientation when the ramp is in the intermediate position.

24. A wheelchair ramp assembly, comprising;
(a) a platform adapted to be coupled to a vehicle;
(b) a ramp coupled to at least one of the platform or the frame and having a weight; and
(c) a reciprocating mechanism disposed between the ramp and platform for reciprocating the ramp between a deployed position, an intermediate position, and a stowed position in response to a force, the reciprocating mechanism comprising an energy storage apparatus for counterbalancing the weight of the ramp during actuation of the ramp between the deployed and stowed positions to reduce the force required to reciprocate the ramp between the deployed and stowed positions, wherein at least a portion of the energy storage apparatus reciprocates between a first direction when the ramp is moved from the stowed to the intermediate position and a second direction when the ramp is moved from the intermediate to the deployed position.

25. The wheelchair ramp assembly of claim 24, wherein the energy storage apparatus includes a torsion assembly having a rotating end and a fixed end.

26. The wheelchair ramp assembly of claim 25, wherein the torsion assembly includes a torsion rod extending between the fixed and rotating ends of the torsion assembly, such that when the ramp is reciprocated between the deployed and stowed positions, the weight of the ramp causes the torsion rod to twist about the fixed end and resist the weight of the ramp.

27. The wheelchair ramp assembly of claim 26, wherein the reciprocating mechanism further comprises an actuating arm rotatably attached to the torsion assembly and first and second bearing surfaces cooperatively coupled to the ramp, wherein the first and second bearing surfaces move in a predetermined path as the ramp reciprocates between the deployed and stowed positions to contact a portion of the actuating arm and cause the torsion rod to twist.

28. The wheelchair ramp assembly of claim 27, further comprising a preload assembly coupled to the torsion assembly, the preload assembly twists the torsion rod from a neutral position to assist in reciprocating the ramp between the deployed and stowed positions.

29. The wheelchair ramp assembly of claim 28, wherein the platform is coupled to the vehicle by a lifting assembly to reciprocably lift the platform into and out of a position substantially flush with the floor of the vehicle when the ramp is reciprocated between the deployed and stowed positions.

30. The wheelchair ramp assembly of claim 29, wherein the lifting assembly is a pivot link assembly extending between a portion of the vehicle and the platform to at least lift the platform into a position flush with the floor of the vehicle.

31. The wheelchair ramp assembly of claim 24, wherein the first direction is opposite the second direction.

32. The wheelchair ramp assembly of claim 24, wherein the ramp is in a substantially vertical orientation when the ramp is in the intermediate position.

33. A wheelchair ramp assembly, comprising;
(a) a frame attachable to a vehicle having a floor;
(b) a platform coupled to a portion of the frame;
(c) a ramp coupled to the platform and having a weight; and
(d) energy storage means coupled to the ramp for counterbalancing the weight of the ramp during actuation of the ramp between a deployed position, an intermediate position, and a stowed position, wherein at least a portion of the energy storage means reciprocates between a first direction when the ramp is moved from the stowed to the intermediate position and a second direction when the ramp is moved from the intermediate to the deployed position.

34. The wheelchair ramp assembly of claim 33, wherein the energy storage means includes a torsion assembly having a rotating end and a fixed end.

35. The wheelchair ramp assembly of claim 34, wherein the torsion assembly includes a torsion rod extending between the fixed and rotating ends of the torsion assembly, such that when the ramp is reciprocated between the deployed and stowed position, the weight of the ramp causes the torsion rod to twist about the fixed end to resist the weight of the ramp.

36. The wheelchair ramp assembly of claim 35, further comprising an actuating arm rotatably attached to the torsion assembly and first and second bearing surfaces cooperatively coupled to the ramp, wherein the first and second bearing surfaces move in a predetermined path as the ramp reciprocates between the deployed and stowed positions to contact a portion of the actuating arm and cause the torsion rod to twist.

37. The wheelchair ramp assembly of claim 36, wherein one end of the actuating arm includes a cammed surface, wherein the cammed surface is positioned for engagement with at least one of the bearing surfaces, such that as the ramp is reciprocated between the deployed and stowed positions, at least one of the bearing surfaces engages a portion of the cammed surface, thereby twisting the torsion rod to counterbalance the weight of the ramp.

38. The wheelchair ramp assembly of claim 35, further comprising a preload assembly coupled to the torsion assembly, the preload assembly twists the torsion rod from a neutral position to assist in reciprocating the ramp between the deployed and stowed positions.

39. The wheelchair ramp assembly of claim 33, wherein the platform is coupled to the frame by a lifting assembly to reciprocably lift the platform into and out of a position substantially flush with the floor of the vehicle when the ramp is reciprocated between the deployed and stowed positions.

40. The wheelchair ramp assembly of claim 33, wherein the first direction is opposite the second direction.

41. The wheel chair ramp assembly of claim 33, wherein the ramp is in a substantially vertical orientation when the ramp is in the intermediate position.

42. A wheelchair ramp assembly, comprising:
(a) a platform mounted to a vehicle having a floor, the platform reciprocably mounted to the vehicle to reciprocate the platform between a raised position, wherein the platform is substantially flush with the floor, and a recessed position;
(b) a ramp having a weight, the ramp coupled to a reciprocating mechanism for selective actuation between a deployed position and a stowed position in response to a force, wherein when the ramp is in the stowed position, the platform is in a plane located below the floor; and
(c) a counterbalance assembly cooperatively coupled to the ramp to counterbalance the weight of the ramp during actuation of the ramp between the deployed and stowed positions to reduce the force required to reciprocate the ramp between the deployed and stowed positions, wherein the counterbalance assembly further comprises a torsion assembly having a rotating end and fixed end, wherein the torsion assembly comprises a torsion rod extending between the rotating and fixed ends of the torsion assembly, wherein the weight of the ramp causes the torsion rod to twist about the fixed end of the torsion assembly when the ramp is reciprocated between the deployed and stowed positions to resist the weight of the ramp, wherein the counterbalance assembly further comprises an actuating arm rotatably attached to the torsion assembly and first and second bearing surfaces cooperatively coupled to the ramp, wherein the first and second bearing surfaces move in a predetermined path as the ramp reciprocates between the deployed and the stowed positions to contact a portion of the actuating arm and cause the torsion rod to twist, wherein one end of the actuating arm includes a cammed surface, wherein the cammed surface is positioned for engagement with at least one of the bearing surfaces, such that as the ramp is reciprocated between the deployed and stowed positions, at least one of the bearing surfaces engages a portion of the cammed surface, thereby twisting the torsion rod to counterbalance the weight of the ramp.

43. The wheelchair ramp assembly of claim 42, wherein the platform is mounted to the vehicle by a frame.

44. The wheelchair ramp assembly of claim 42, further comprising a preload assembly coupled to the counterbalance assembly, the preload assembly adapted to selectively apply a load to the counterbalance assembly to assist in reciprocating the ramp between the deployed and stowed positions.

45. The wheelchair ramp assembly of claim 42, further comprising a preload assembly coupled to the torsion assembly, the preload assembly twists the torsion rod from a neutral position to assist in reciprocating the ramp between the deployed and stowed positions.

* * * * *